US009276700B2

(12) United States Patent
Faurie et al.

(10) Patent No.: US 9,276,700 B2
(45) Date of Patent: Mar. 1, 2016

(54) METHODS AND APPARATUS TO REPORT LINK QUALITY MEASUREMENTS FOR DOWNLINK DUAL CARRIER OPERATION

(75) Inventors: René Faurie, Versailles (FR); David Philip Hole, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 767 days.

(21) Appl. No.: 13/399,691

(22) Filed: Feb. 17, 2012

(65) Prior Publication Data

US 2012/0213153 A1    Aug. 23, 2012

(30) Foreign Application Priority Data

Feb. 18, 2011   (EP) ..................................... 11305174

(51) Int. Cl.
*H04J 1/16* (2006.01)
*H04L 1/00* (2006.01)
*H04W 72/12* (2009.01)
(Continued)

(52) U.S. Cl.
CPC ............ *H04L 1/0026* (2013.01); *H04L 1/0028* (2013.01); *H04L 43/067* (2013.01); *H04W 24/10* (2013.01); *H04W 72/0413* (2013.01); *H04W 72/1284* (2013.01); *H04L 43/06* (2013.01); *H04W 72/0486* (2013.01)

(58) Field of Classification Search
CPC ..... H04L 43/06; H04L 43/067; H04L 1/0028; H04L 1/0026; H04W 24/10; H04W 72/0413; H04W 72/0486; H04W 72/1284
USPC .......................................... 370/328, 252, 254
See application file for complete search history.

(56) References Cited

U.S. PATENT DOCUMENTS 8,594,060 B2   11/2013 Sebire et al.
8,797,889 B2 *  8/2014 Parkvall et al. ............... 370/252
(Continued)

FOREIGN PATENT DOCUMENTS

CN    101132588    2/2008
CN    101505194    8/2009
(Continued)

OTHER PUBLICATIONS

"3GPP TS 44.060 V10.3.0 (Dec. 2010); Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol", Release 10.*

(Continued)

*Primary Examiner* — Peter Cheng
(74) *Attorney, Agent, or Firm* — Fish & Richardson P.C.

(57) ABSTRACT

Methods and apparatus to report link quality measurements for downlink dual carrier operation are disclosed. Example methods and apparatus disclosed herein implement one or more example techniques for reporting link quality measurements involving, for example, modifying measurement reporting messages to increase the number and/or types of link quality measurements that can be reported, permitting mobile stations, when appropriate, to use different reporting messages capable of supporting more link quality measurements, and/or prioritizing certain link quality measurements to be reported when the reporting messages do not contain sufficient space to report all requested and/or specified link quality measurements.

21 Claims, 19 Drawing Sheets

(51) Int. Cl.
*H04L 12/26* (2006.01)
*H04W 24/10* (2009.01)
*H04W 72/04* (2009.01)

(56) References Cited

U.S. PATENT DOCUMENTS

| | | | |
|---|---|---|---|
| 2009/0175246 A1* | 7/2009 | Koo | 370/336 |
| 2012/0213088 A1 | 8/2012 | Faurie et al. | |
| 2012/0230290 A1 | 9/2012 | Seo et al. | |
| 2013/0170396 A1 | 7/2013 | Dinan | |

FOREIGN PATENT DOCUMENTS

| | | |
|---|---|---|
| CN | 101917221 | 12/2010 |
| EP | 1672815 | 6/2006 |
| WO | 2010147403 | 12/2010 |

OTHER PUBLICATIONS

"3rd Generation Partnership Project; Technical Specification Group Core Network and Terminals; Mobile radio interface Layer 3 specification; Core network protocols; Stage 3 (Release 7)," 3GPP TS 24.008 V7.15.0, Mar. 2010, (550 pages).

"3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 7)," 3GPP TS 44.060 V7.22.0, Dec. 2010, (568 pages).

"3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 7)," 3GPP TS 44.060 V10.3.0, Dec. 2010, (623 pages).

"3rd Generation Partnership Project; Technical Specification Group GSM/EDGE Radio Access Network; Multiplexing and multiple access on the radio path (Release 7)," 3GPP TS 45.002 V7.7.0, May 2008, (105 pages).

"3rd Generation Partnership Project; Technical Specification Group GSM/EDGE Radio Access Network; Radio subsystem link control (Release 7)," 3GPP TS 45.008 V7.19.0, Nov. 2011, (120 pages).

Nokia Siemens Networks, "Dual Carrier Measurement Report Handling," 3GPP TSG GERAN#34, GP-070746, Agenda Item 7.2.5.3.3, Shenzhen, China, May 14-18, 2007, (3 pages).

European Patent Office, "Extended European Search Report," issued in connection with corresponding EP Patent Application No. 11305173 on Aug. 19, 2011 (8 pages).

European Patent Office, "Extended European Search Report," issued in connection with corresponding EP Patent Application No. 11305174 on Nov. 21, 2011 (10 pages).

PCT, "International Search Report and Written Opinion," issued in connection with PCT Application No. PCT/EP2012/052432, mailed on Apr. 18, 2012 (12 pages).

PCT, "International Search Report and Written Opinion," issued in connection with PCT Application No. PCT/EP2012/052433, mailed on Apr. 12, 2012 (17 pages).

IP Australia, "Patent Examination Report No. 1", issued in connection with Australian Patent Application No. 2012217146, dated Oct. 20, 2014 (4 pages).

Canadian Intellectual Property Office, "Office Action", issued in connection with Canadian Patent Application No. 2,768,322, dated Dec. 19, 2013 (3 pages).

State Intellectual Property Office of China, "First Office Action", issued in connection with Chinese Patent Application No. 201210041825.9, dated Mar. 7, 2014 (23 pages).

State Intellectual Property Office of China, "Notice of Allowance", issued in connection with Chinese Patent Application No. 201210041825.9, dated Nov. 3, 2014 (4 pages).

European Patent Office, "Intention to Grant", issued in connection with European Patent Application No. 11305173.4, dated Nov. 27, 2013 (97 pages).

European Patent Office, "Exam Report", issued in connection with European Patent Application No. 11305173.4, dated Mar. 19, 2013 (6 pages).

Korean Intellectual Property Office, "Office Action", issued in connection with Korean Patent Application No. 102013-7024588, dated Nov. 12, 2014 (5 pages).

IP Australia, "Patent Examination Report No. 1", issued in connection with Australian Patent Application No. 2012217147, dated Oct. 22, 2014 (2 pages).

Canadian Intellectual Property Office, "Office Action", issued in connection with Canadian Patent Application No. 2,768,274, dated Oct. 28, 2013 (2 pages).

Canadian Intellectual Property Office, "Office Action", issued in connection with Canadian Patent Application No. 2,768,274, dated Sep. 8, 2014 (3 pages).

State Intellectual Property Office of China, "First Office Action", issued in connection with Chinese Patent Application No. 201210041809.X, dated Apr. 2, 2014 (8 pages).

State Intellectual Property Office of China, "Office Action", issued in connection with Chinese Patent Application No. 201210041809.X, dated Nov. 15, 2014 (4 pages).

European Patent Office, "Intention to Grant", issued in connection with European Patent Application No. 11305174.2, dated May 27, 2013 (106 pages).

European Patent Office, "Partial European Search Report", issued in connection with European Patent Application No. 11305174.2, dated Aug. 17, 2011 (6 pages).

European Patent Office, "European Search Report", issued in connection with European Patent Application No. 13187085.9, dated Nov. 11, 2013 (6 pages).

Korean Intellectual Property Office, "Office Action", issued in connection with Korean Patent Application No. 10-2013-7024590, dated Nov. 11, 2014 (4 pages).

United States Patent and Trademark Office, "Office Action", issued in connection with U.S. Appl. No. 13/399,676, dated Mar. 31, 2014 (7 pages).

United States Patent and Trademark Office, "Office Action", issued in connection with U.S. Appl. No. 13/399,676, dated Sep. 4, 2014 (9 pages).

* cited by examiner

METHODS AND APPARATUS TO REPORT LINK QUALITY MEASUREMENTS FOR DOWNLINK DUAL CARRIER OPERATION

FIELD OF THE DISCLOSURE

This disclosure relates generally to measurement reporting and, more particularly, to methods and apparatus to report link quality measurements for downlink dual carrier operation.

BACKGROUND

In a global system for mobile communications (GSM) system supporting enhanced general packet radio service (EGPRS), the network can utilize different modulation coding schemes for downlink and uplink packet data transmissions to, for example, adjust to changes in link quality. While the network can directly measure link quality of the uplink packet data transmissions, the network uses link quality measurements reported from mobile stations to determine link quality of the downlink packet data transmissions. An EGPRS-capable mobile station can report link quality measurements to the network using different types of packet downlink ack/nack messages, such as an EGPRS PACKET DOWNLINK ACK/NACK message (for EGPRS mode) or an EGPRS PACKET DOWNLINK ACK/NACK TYPE 2 message (for EGPRS2 mode). In the case of downlink dual carrier operation in which the EGPRS-capable mobile station is receiving packet data transmission on both a primary carrier and a secondary carrier, link quality measurements for the secondary carrier are reported in an extension information element of the EGPRS PACKET DOWNLINK ACK/NACK message or the EGPRS PACKET DOWNLINK ACK/NACK TYPE 2 message.

DETAILED DESCRIPTION

Figure 1:
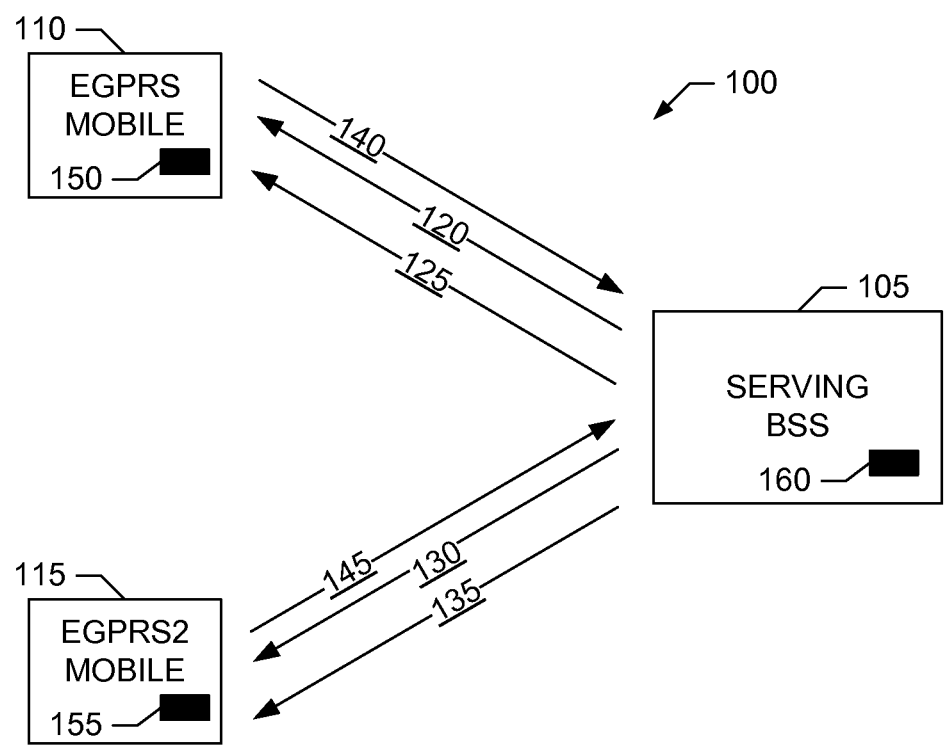
FIG. 1 is block diagram of an example communication system in which link quality measurements for downlink dual carrier operation are reported by example mobile stations to an example base station subsystem.

Methods and apparatus to report link quality measurements for downlink dual carrier operation are disclosed herein. As noted above, in current GSM networks supporting EGPRS (also referred to as EGPRS networks), link quality measurements for the secondary carrier of a dual carrier configuration are reported by a mobile station in an extension information element of an EGPRS PACKET DOWNLINK ACK/NACK or an EGPRS PACKET DOWNLINK ACK/NACK TYPE 2 message. However, the size of the extension information element in the EGPRS PACKET DOWNLINK ACK/NACK message is limited, which can restrict the number and/or types of link quality measurements that can be reported for the secondary carrier. Additionally, the overall size constraints for the EGPRS PACKET DOWNLINK ACK/NACK and EGPRS PACKET DOWNLINK ACK/NACK TYPE 2 messages can impose further restrictions on the number and/or types of link quality measurements that can be reported for both carriers supporting dual carrier operation.

Example methods, apparatus and articles of manufacture disclosed herein implement one or more example techniques that can reduce or eliminate the prior restrictions on the number and/or types of link quality measurements that can be reported for dual carrier operation in an EGPRS network. A first example technique disclosed herein involves recoding a length field representing a length of the extension information element in the EGPRS PACKET DOWNLINK ACK/NACK message to support larger lengths and, thus, reporting of more link quality measurements for the secondary carrier during EGPRS dual carrier operation. A second example technique disclosed herein involves prioritizing link quality measurements to, for example, ensure that a desired number of link quality measurements of a particular type are able to be reported during dual carrier operation. A third example technique disclosed herein involves modifying the contents of the EGPRS PACKET DOWNLINK ACK/NACK TYPE 2 message to enable reporting of more link quality measurements for both the primary and secondary carriers during EGPRS2 dual carrier operation. A fourth example technique disclosed herein involves permitting a mobile station operating in EGPRS mode to use an EGPRS PACKET DOWNLINK ACK/NACK TYPE 2 message, instead of an EGPRS PACKET DOWNLINK ACK/NACK message, to enable reporting of more link quality measurements than can be supported by the EGPRS PACKET DOWNLINK ACK/NACK message. A fifth example technique disclosed herein involves prioritizing link quality measurements when a combination of different link quality measurement types are requested to, for example, ensure that a desired number of link quality measurements of a particular type are able to be reported for both carriers during dual carrier operation. In general, at least some of the example techniques disclosed herein are backwards compatible with existing EGPRS networks, and/or utilize little to no additional signaling or bandwidth relative to existing dual carrier operation in EGPRS networks.

Turning to the figures, a block diagram of an example mobile communication system 100 in which link quality measurements for downlink dual carrier operation are reported in accordance with example techniques described herein is illustrated in FIG. 1. The mobile communication system 100 of the illustrated example is a GSM network supporting EGPRS. The mobile communication system 100 includes an example network element 105, which is illustrates as an example base station subsystem (BSS) 105, that may be implemented by, for example, one or more of a base station transceiver (BTS), a base station controller (BSC), a packet control unit (PCU), a network cell, etc. The mobile communication system 100 also includes example mobile stations 110 and 115. The mobile stations 110 and 115 may be implemented by any type of mobile station or user endpoint equipment, such as smartphone, a mobile telephone device that is portable, a mobile telephone device implementing a stationary telephone, a personal digital assistant (PDA), etc. Furthermore, although only one network element 105 and two mobile stations 110-115 are illustrated in FIG. 1, the mobile communication system 100 can support any number of network elements and mobile stations.

As shown in FIG. 1, the network element 105 and mobile stations 110-115 exchange information by way of one or more downlink radio frequency channels (also referred to as downlink carriers) 120, 125, 130 and 135, and one or more uplink radio frequency channels (also referred to as uplink carriers) 140 and 145, each comprising a respective set of timeslots. In each direction, each timeslot is associated with a packet data channel (PDCH), which can carry various logical channels. For example, the network element 105 can establish a downlink temporary block flow (TBF) with the mobile station 110 to send downlink packet data from the network element 105 to the mobile station 110. The downlink TBF can be assigned a single slot (e.g., single PDCH) or multiple slots (e.g., corresponding to a multislot configuration) on, for example, the radio frequency channel 120. Similarly, the network element 105 can establish an uplink TBF with the mobile station 110 to enable the mobile station 110 to send uplink packet data to the network element 105 over the uplink radio frequency channel 140.

Figure 2:
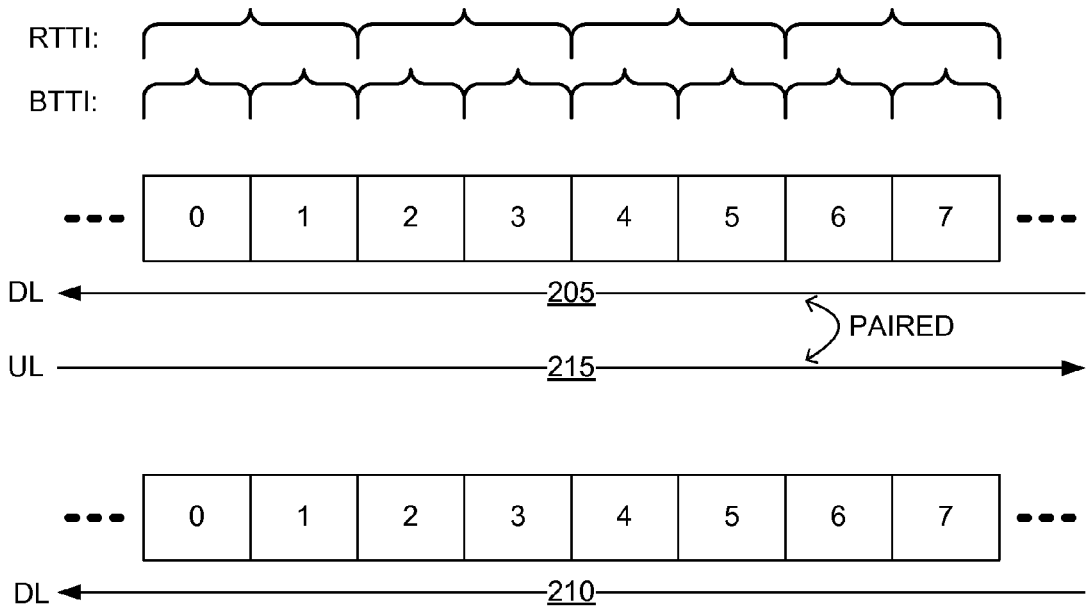
FIG. 2 illustrates example downlink dual carrier channels for which link quality measurements are to be determined.

The mobile communication system 100 of the illustrated example supports downlink dual carrier operation in which the mobile stations 110-115 can receive data on carriers having different carrier frequencies (or different radio frequency channel sequences). In other words, the mobile station 110 of the illustrated example can be assigned downlink TBFs having PDCHs on both of two carriers implementing dual carrier operation. For example, in FIG. 1 the downlink carriers 120 and 125 have different carrier frequencies (or different radio frequency channel sequences), and the downlink carriers 130 and 135 have different carrier frequencies (or different radio frequency channel sequences). In downlink dual carrier operation, each of the downlink carriers (e.g., such as the downlink carrier 120) is paired with a corresponding uplink carrier (e.g., such as the uplink carrier 140). The downlink carrier paired with the uplink carrier via which one or more of the reporting messages described below are to be sent is referred to herein as the primary carrier, whereas the other carrier not paired with this uplink carrier (e.g., such as the downlink carrier 125) is referred to as the secondary carrier. An example of a pair of primary and secondary downlink carriers that may correspond to the downlink carriers 120-125 or 130-135 is illustrated in FIG. 2. The primary carrier (for the purposes of link quality reporting) is determined by the carrier on which the poll was received and whether or not the mobile station is operating in dual transfer mode (DTM) configuration, and so may vary throughout the duration of the TBF.

The network element 105 and the mobile stations 110-115 support one or more of the example techniques disclosed herein for reporting link quality measurements for downlink dual carrier operation. To support the example techniques disclosed herein, the mobile stations 110 and 115 include respective example mobile station measurement reporting processors 150 and 155, and the network element 105 includes an example measurement report receiver 160. As described in greater detail below, during dual carrier operation, the measurement reporting processor 150 of the illustrated example determines requested and specified link quality measurements for the respective primary and secondary carriers 120-125 for mobile station 110. Similarly, during dual carrier operation, the measurement reporting processor 155 of the illustrated example determines requested and specified link quality measurements for the respective primary and secondary carriers 130-135 for mobile station 115. Then, in accordance with one or more of the example techniques disclosed herein, the measurement reporting processors 150 and 155 include the determined link quality measurements in one or more uplink messages to be sent by the respective mobile stations 110 and 115 to the network element 105. The measurement report receiver 160 of the network element 105 processes, in accordance with one or more of the example techniques disclosed herein, the received uplink messages reporting the link quality measurements to extract the link quality measurements reported by the mobile stations 110 and 115.

Figure 3:
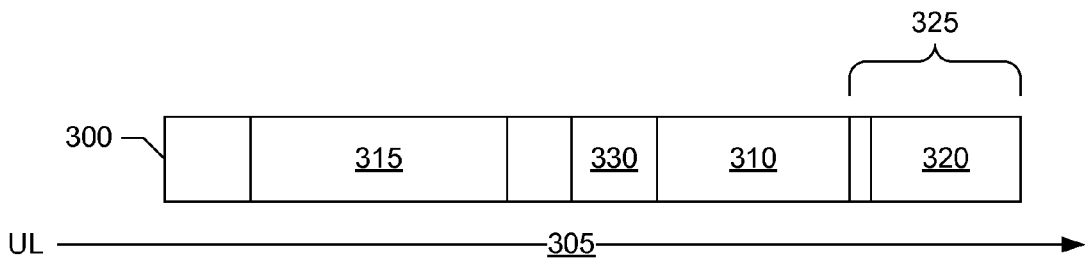
FIG. 3 illustrates a first example uplink message for reporting link quality measurements for downlink dual carrier operation.
Figure 4:
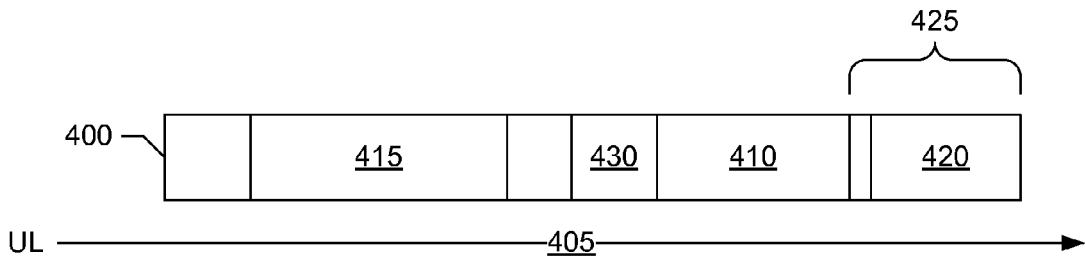
FIG. 4 illustrates a second example uplink message for reporting link quality measurements for downlink dual carrier operation.

In the illustrated example of FIG. 1, the mobile station 110 is operating in a downlink dual carrier configuration using EGPRS, whereas the mobile station 115 is operating in a downlink dual carrier configuration using (at least, for a downlink TBF) EGPRS2. (As described in greater detail below, EGPRS2 provides additional modulation coding schemes (MSCs) not available in EGPRS.) As such, and as described in greater detail below, the mobile station 115 uses an EGPRS PACKET DOWNLINK ACK/NACK TYPE 2 message as the uplink message for reporting link quality measurements to the network element. The mobile station 110, however, uses an EGPRS PACKET DOWNLINK ACK/ NACK message or, in some circumstances, an EGPRS PACKET DOWNLINK ACK/NACK TYPE 2 message as the uplink message for reporting link quality measurements to the network element. The EGPRS PACKET DOWNLINK ACK/NACK and EGPRS PACKET DOWNLINK ACK/ NACK TYPE 2 messages are sent on packet associated control channels (PACCHs) mapped on the uplink carriers 140 and 145. For convenience, the EGPRS PACKET DOWN-LINK ACK/NACK and EGPRS PACKET DOWNLINK ACK/NACK TYPE 2 messages are referred to collectively as packet downlink ack/nack messages herein. An example EGPRS PACKET DOWNLINK ACK/NACK message is illustrated in FIG. 3. An example EGPRS PACKET DOWN-LINK ACK/NACK TYPE 2 message is illustrated in FIG. 4.

Although example techniques to report link quality measurements for downlink dual carrier operation are described in the context of the example system 100 being a GSM system supporting EGPRS, the example disclosed techniques are not limited thereto. For example, one or more of the example techniques to report link quality measurements for downlink dual carrier operation disclosed herein can be used in other types of communication systems in which a device is to report measurement information for multiple different carriers or channels.

FIG. 2 illustrates an example primary downlink carrier 205 and an example secondary downlink carrier 210 that may be used to implement downlink dual carrier operation in the example mobile communication systems of FIG. 1. In the example of FIG. 2, the primary downlink carrier 205 is paired with an example uplink carrier 215. The pair of primary and secondary downlink carriers 205-210 may correspond to the downlink carriers 120-125 and/or 130-135 illustrated in FIG. 1. As illustrated in FIG. 2, the primary and secondary downlink carriers 205-210 each implement time division multiple access (TDMA) frames, where each TDMA frame has eight (8) timeslots. The 8 timeslots of a TDMA frame are labeled with timeslot numbers 0 through 7. Furthermore, as described above, each timeslot corresponds to a respective PDCH. In a basic transmission time interval (BTTI) configuration, a radio block is sent using one PDCH in each of four consecutive TDMA frames defining a basic radio block period (e.g., corresponding to a 20 millisecond time interval). In a reduced transmission time interval (RTTI) configuration, a radio block is sent using two PDCHs (or, in other words, a PDCH pair) in either the first two TDMA frames or the last two TDMA frames (e.g., corresponding to a 10 millisecond time interval) of a basic radio block period.

FIG. 3 is an example illustration of an EGPRS PACKET DOWNLINK ACK/NACK message 300. The EGPRS PACKET DOWNLINK ACK/NACK message 300, like other packet downlink ack/nack messages, is sent on a PACCH 305 from a mobile station (e.g., such as the mobile station 110 or 115) to the network to indicate the positive or negative acknowledgement status of downlink radio link control (RLC) data blocks received during a downlink TBF (e.g., in the form of ack/nack information) and/or to report the measured channel quality of one or more downlink channels in the serving cell. The EGPRS PACKET DOWNLINK ACK/ NACK message 300 was introduced in Release 99 for EGPRS, and includes an EGPRS Ack/Nack Description information element (IE) 310 for EGPRS acknowledgement reporting, as well as an EGPRS Channel Quality Report IE 315. The EGPRS Channel Quality Report IE 315 supports, for example, reporting of bit error probability (BEP) link quality measurements, as well as differentiated measurement reporting for GMSK (Gaussian minimum shift keying) and 8PSK (where PSK refers to phase shift keying) modulations.

In releases subsequent to Release 99, the EGPRS PACKET DOWNLINK ACK/NACK message 300 has been extended in a backward compatible manner to support additional features. For example, in Release 5, Iu mode support was introduced with the addition of the Iu mode Channel Request Description, the RB Id and the Timeslot Number IEs to the EGPRS PACKET DOWNLINK ACK/NACK message 300 (not shown in FIG. 3). In Release 6, support for multiple TBFs was introduced with the addition of the Extended Channel Request Description IE to the EGPRS PACKET DOWN-LINK ACK/NACK message 300 (not shown in FIG. 3). In Release 7, support for downlink dual carrier operation was introduced with the addition of the Secondary Dual Carrier Channel Report IE 320. The Secondary Dual Carrier Channel Report IE 320 is included in an extension information portion 325 (referred to as EPD A/N Extension Info 325) of the EGPRS PACKET DOWNLINK ACK/NACK message 300 having a length specified by an EPD A/N Extension Length field 330. As described above, in a downlink dual carrier configuration, the secondary carrier (e.g., the secondary carrier 210) for which the Secondary Dual Carrier Channel Report IE 320 is used, is the carrier which is not paired with the uplink carrier on which the EGPRS PACKET DOWN-LINK ACK/NACK message 300 is sent. Also, the link quality for the primary downlink carrier (e.g., the primary carrier 205), which is the carrier paired with the uplink carrier on which the EGPRS PACKET DOWNLINK ACK/NACK message 300 is sent, is indicated in the EGPRS Channel Quality Report IE 315. Some of the IEs included in the EGPRS PACKET DOWNLINK ACK/NACK message 300 are listed and further described in Table 1.

TABLE 1

| Information Element | Contents |
| --- | --- |
| EGPRS Channel Quality Report | Overall MEAN_BEP and CV_BEP for either/both of GMSK/8PSK modulation (CV_BEP refers to the coefficient of variation of the BEP) Per-timeslot/timeslot pair MEAN_BEP (for either GMSK or 8PSK modulation) Per-timeslot interference values |
| Secondary Dual Carrier Channel Report (contained in EPD A/N Extension Info) | Identical structure to EGPRS Channel Quality Report for measurements on the secondary carrier |
| EGPRS Ack/Nack Description | ACK/NACK bitmap providing acknowledgement status of previously received RLC data blocks |

FIG. 4 is an example illustration of an EGPRS PACKET DOWNLINK ACK/NACK TYPE 2 message 400. The EGPRS PACKET DOWNLINK ACK/NACK TYPE 2 message 400, like other packet downlink ack/nack messages, is sent on a PACCH 405 from a mobile station (e.g., such as the mobile station 110 or 115) to the network to indicate the positive or negative acknowledgement status of downlink RLC data blocks received during a downlink TBF (e.g., in the form of ack/nack information) and/or to report the measured channel quality of one or more downlink channels in the serving cell. The EGPRS PACKET DOWNLINK ACK/NACK TYPE 2 message 400 was defined as part of Release 7 for reporting during downlink TBFs using EGPRS2, and includes an EGPRS Ack/Nack Description information element (IE) 410 for EGPRS acknowledgement reporting, as well as an EGPRS Channel Quality Report Type 2 IE 415. It is noted that the presence of the EGPRS Ack/Nack Description IE 410 is mandatory and shall be included even if no acknowledgement status is reported, which in this case would waste at least the amount of space required for encoding a valid form of the EGPRS Ack/Nack Description IE 410 (i.e. a form compliant with the GSM specification). The EGPRS Channel Quality Report Type 2 IE 415 supports reporting for the modulations introduced for EGPRS2-A and EGPRS2-B, such as 16QAM (where QAM refers to quadrature amplitude modulation), 32QAM, quadrature phase shift keying (QPSK), etc.

The EGPRS PACKET DOWNLINK ACK/NACK TYPE 2 message 400 natively supports downlink dual carrier operation by inclusion of the Secondary Dual Carrier Channel Report IE 420 to enable reporting of link quality associated with the secondary carrier during dual carrier operation. The Secondary Dual Carrier Channel Report IE 420 is included in an extension information portion 425 (referred to as EPD A/N Extension Info Type 2 425) of the EGPRS PACKET DOWNLINK ACK/NACK TYPE 2 message 400 having a length specified by an EPD A/N Extension Type 2 length field 430. Some of the IEs included in the EGPRS PACKET DOWNLINK ACK/NACK TYPE 2 message 400 are listed and further described in Table 2.

TABLE 2

| Information Element | Contents |
| --- | --- |
| EGPRS Channel Quality Report Type 2 | Overall MEAN_BEP and CV_BEP for any combination of up to two modulation schemes/symbol rates (from the set of GMSK/8PSK/16QAM/32QAM) Per-timeslot/timeslot pair MEAN_BEP measurements (for any one modulation scheme) Per-timeslot interference values |
| Secondary Dual Carrier Channel Report (contained in EPD A/N Extension Info Type 2) | Identical structure to EGPRS Channel Quality Report Type 2 for measurements on the secondary carrier |
| EGPRS Ack/Nack Description | ACK/NACK bitmap providing acknowledgement status of previously received RLC data blocks |

With reference to FIGS. 1-4, restrictions on the number and/or types of link quality measurements that can be reported using the existing forms of the packet downlink ack/nack message 300/400 (prior to any modification as described herein) can be identified as follows. Recall that the packet downlink ack/nack messages 300/400 are sent by a mobile station (such as the mobile station 110 or 115) to report ack/nack information and/or link quality measurements. No segmentation is possible for uplink RLC/MAC control messages (where RLC refers to radio link control, and MAC refers to medium access control) and, therefore, the packet downlink ack/nack messages must fit in a single RLC/MAC control block (e.g., having a maximum size of 22 octets). However, the information requested to be sent by the mobile station in response to a poll may exceed this maximum size depending, for example, on the number of data blocks whose ack/nack status needs to be reported, on the types of link quality measurements (interference, BEP) to be reported, on the number or carriers and timeslots involved in the TBF, etc., and/or combinations thereof.

The present GSM specifications specify the information that is to be provided by the mobile station in response to a poll. For example, when the network polls the mobile station for an EGPRS PACKET DOWNLINK ACK/NACK message 300 during a downlink EGPRS TBF in a BTTI configuration and not using EGPRS2, a 2-bit ES/P field in the RLC/MAC header of the EGPRS downlink RLC data blocks (e.g., when fast ack/nack reporting (FANR) is not used) indicates the type of ack/nack bitmap to be used and the conditions for including channel quality reports in the packet downlink ack/nack by the mobile station. The meaning of the 2-bit ES/P is as follows:

{0 0}: no polling;

{0 1}: EGPRS PACKET DOWNLINK ACK/NACK message 300 is to be sent containing the FPB (first partial bitmap) and, if there is enough room left in the RLC/MAC block, the channel quality report(s);

{1 0}: EGPRS PACKET DOWNLINK ACK/NACK message 300 is to be sent containing the NPB (next partial bitmap) and, if there is enough room left in the RLC/MAC block, the channel quality report(s); and {1 1}: EGPRS PACKET DOWNLINK ACK/NACK message 300 is to be sent containing the channel quality report(s) and, if there is enough room left in RLC/MAC block, the NPB(s).

Similar conditions can be specified by the network using the CES/P field provided in EGPRS downlink RLC data blocks headers when FANR is used, or in EGPRS2 downlink RLC data block headers.

Additionally, a LINK_QUALITY_MEASUREMENT_MODE field is provided to the mobile station at downlink TBF (re)assignment and determines the measurements to be included within an EGPRS Timeslot Link Quality Measurements IE of the packet downlink ack/nack message 300/400. The meanings of the different values of the LINK_QUALITY_MEASUREMENT_MODE field are provided in Table 3.

TABLE 3

| Value | Interference measurements (γ) | Per slot mean BEP measurements |
|---|---|---|
| 00 | None | None |
| 01 | Those available for timeslots 0-7 | None |
| 10 | None | For each assigned time slot, the mean BEP for the modulation scheme for which the mobile station has received the larger number of blocks since the previous report |
| 11 | Measurements for no more than four timeslots | For each assigned time slot, the mean BEP for the modulation scheme for which the mobile station has received the larger number of blocks since the previous report |

Furthermore, the present GSM specifications specify that for each modulation scheme (GMSK and/or 8PSK) with which mobile station received one or more blocks since it last sent a measurement report, the mobile station is to report overall BEP values (e.g., the MEAN_BEP and CV_BEP values) calculated for all blocks (independent of the timeslot on which they were received) that were received using that modulation. (Because the overall BEP values specified to be reported do not depend on any specific instruction, such as the LINK_QUALITY_MEASUREMENT_MODE field, from the network, the overall BEP values are referred to as specified link quality measurements, whereas the per slot measurements are referred to as requested link quality measurements.) The overall BEP values are calculated and signaled separately for each modulation scheme and, in the case of a dual carrier configuration, for each carrier. Thus, it is possible to have up to four such sets of overall BEP measurements to report, corresponding to two modulation schemes on each of two carriers to be reported.

It is noted that the previously mentioned requirements are applicable to TBFs using EGPRS in a BTTI configuration. Specifications particular to TBF using EGPRS2 and/or RTTI configurations are mentioned below, where applicable.

The multislot capability of a mobile station (such as the mobile station 110 or 115) also affects the number and/or types of link quality measurements that can be reported. The multislot capability of the mobile station defines the maximum number of timeslots, up to 8 in each direction (uplink and downlink), of a TDMA frame the mobile station is able to use for receiving (in the downlink) or transmitting (in the uplink), and the required switching times between reception and transmission. The multislot capability of a mobile station is identified by its multislot class. The GSM specifications define two types of mobile stations (and the corresponding multislot classes). A Type 1 mobile station is not required to transmit and receive at the same time, whereas a Type 2 mobile station is required to be able to transmit and receive at the same. In the description that follows, the mobile station (such as the mobile station 110 or 115) is assumed, but not restricted, to be a Type 1 mobile station.

A given mobile station may signal different multislot classes that may be applicable depending on the features, such as GPRS, enhanced data rates for GSM evolution (EDGE), DTM, etc., supported and being used by the mobile station. Also, particular multislot class types may apply features such as equivalent multislot class for a dual carrier capable mobile station, alternative multislot class for an enhanced flexible timeslot assignment (EFTA) capable mobile station, etc. The multislot class(es) of a mobile station applicable to the packet switched domain are signaled to the network using the MS Radio Access capability information element.

The number of timeslots for which a mobile station (such as the mobile station 110 or 115) is to report interference measurements is derived as follows. Per the present GSM specifications, in packet transfer mode, the mobile station is to measure the interference signal level on the same radio frequency channel as its assigned PDCHs. Additionally, the mobile station is to perform interference signal measurements on as many of the channels (timeslots) as possible and, at a minimum, on the PDCH timeslot numbers TSmin to TSmax. Here, TSmin is the lowest numbered timeslot assigned (on the respective radio frequency channel in the case of a downlink dual carrier assignment) for uplink or downlink transfer, including downlink PACCH associated with an uplink transfer. TSmax is equal to MIN(TSmin+Rx−1, 7), where Rx is the maximum number of receive timeslots that the mobile station can use, per TDMA frame, according to its multislot class, or its equivalent multislot class in the case of a downlink dual carrier assignment. Furthermore, in case of DTM, the GSM specifications provide that the mobile station is to also perform interference measurements on the traffic channel (TCH) timeslot. Interference measurements need not be supported on PDCH timeslot numbers above the TCH timeslot plus one.

Also, in the case of a downlink dual carrier assignment, the measurements shall be made separately on both radio frequency channels supporting downlink dual carrier operation.

To ascertain existing restrictions on the number and/or types of link quality measurements that can be reported for downlink dual carrier operation using the EGPRS PACKET DOWNLINK ACK/NACK message 300, a review of the detailed structure of the EGPRS PACKET DOWNLINK ACK/NACK message 300 is provided. The structure of the contents of the EGPRS PACKET DOWNLINK ACK/NACK message 300 is listed in Table 4.

TABLE 4

```
< EGPRS Packet Downlink Ack/Nack message content > ::=
    < DOWNLINK_TFI : bit (5) >
    < MS OUT OF MEMORY : bit(1)>
    { 0 | 1 < EGPRS Channel Quality Report : < EGPRS Channel Quality Report IE > >}
    { 0 | 1 < Channel Request Description : <Channel Request Description IE > >}
    { 0 | 1 < PFI : bit(7) > }
    { 0 | 1 < EPD A/N Extension length : bit (6) >
        < bit (val(EPD A/N Extension length) + 1)
        & { < EPD A/N Extension Info > ! { bit** = <no string> }} > }
    < EGPRS Ack/Nack Description : < EGPRS Ack/Nack Description IE >>
```

TABLE 4-continued

```
   <padding bits > } ;
< EPD A/N Extension Info > ::=
   { {                      -- Rel-5 extension
       { 0 | 1 < Iu mode Channel Request Description : < Iu mode Channel Request Description IE
>>}
       { 0 | 1 < RB Id : bit (5) > }
       { 0 | 1 < Timeslot Number : bit (3) > } }
   {                        -- Rel-6 extension
       { 0 | 1 < Extended Channel Request Description : < Extended Channel Request Description
IE >>}}
   {                        -- Rel-7 extension
       < EARLY_TBF_ESTABLISHMENT : bit (1) >
       { 0 | 1 < Secondary Dual Carrier Channel Report : < EGPRS Channel Quality Report IE > } }
   < spare bit >** } // ;    -- Truncation may occur between released versions of the protocol
                             -- The receiver shall assume the value zero of any truncated bits
```

The layout of the EGPRS Channel Quality Report IE listed in Table 4, which is used to encode both the EGPRS Channel Quality Report 315 and the Secondary Dual Carrier Channel Report 320 of FIG. 3, which are also listed in Table 4, is shown in Table 5.

TABLE 5

```
< EGPRS Channel Quality Report IE> ::=
   < EGPRS BEP Link Quality Measurements : < EGPRS BEP Link
   Quality Measurements IE>>
   < C_VALUE : bit (6) >
   < EGPRS Timeslot Link Quality Measurements : <EGPRS Timeslot
   Link Quality Measurements IE >> ;
<EGPRS BEP Link Quality Measurements IE> ::=
   { 0 | 1         < GMSK_MEAN_BEP : bit (5) >
       < GMSK_CV_BEP : bit (3) >}
   { 0 | 1         < 8PSK_MEAN_BEP : bit (5) >
       < 8PSK_CV_BEP : bit (3) > };
<EGPRS Timeslot Link Quality Measurements IE> ::=
{ 0 | 1< BEP_MEASUREMENTS : BEP Measurement Report Struct >}
{ 0 | 1 < INTERFERENCE_MEASUREMENTS : Interference
Measurement Report Struct >};
< BEP Measurement Report Struct > ::=
   { 0 | 1        { 0 <GMSK_MEAN_BEP_TN0 : bit (4) >
        | 1 < 8PSK_MEAN_BEP_TN0 : bit (4) >}}
   { 0 | 1        { 0 <GMSK_MEAN_BEP_TN1 : bit (4) >
        | 1 < 8PSK_MEAN_BEP_TN1 : bit (4) >}}
   { 0 | 1        { 0 <GMSK_MEAN_BEP_TN2 : bit (4) >
        | 1 < 8PSK_MEAN_BEP_TN2 : bit (4) >}}
   { 0 | 1        { 0 <GMSK_MEAN_BEP_TN3 : bit (4) >
        | 1 < 8PSK_MEAN_BEP_TN3 : bit (4) >}}
   { 0 | 1        { 0 <GMSK_MEAN_BEP_TN4 : bit (4) >
        | 1 < 8PSK_MEAN_BEP_TN4 : bit (4) >}}
   { 0 | 1        { 0 <GMSK_MEAN_BEP_TN5 : bit (4) >
        | 1 < 8PSK_MEAN_BEP_TN5 : bit (4) >}}
   { 0 | 1        { 0 <GMSK_MEAN_BEP_TN6 : bit (4) >
        | 1 < 8PSK_MEAN_BEP_TN6 : bit (4) >}}
   { 0 | 1        { 0 <GMSK_MEAN_BEP_TN7 : bit (4) >
        | 1 < 8PSK_MEAN_BEP_TN7 : bit (4) >} };
< Interference Measurement Report Struct > ::=
{ 0 | 1 < I_LEVEL_TN0 : bit (4) > }
{ 0 | 1 < I_LEVEL_TN1 : bit (4) > }
{ 0 | 1 < I_LEVEL_TN2 : bit (4) > }
{ 0 | 1 < I_LEVEL_TN3 : bit (4) > }
{ 0 | 1 < I_LEVEL_TN4 : bit (4) > }
{ 0 | 1 < I_LEVEL_TN5 : bit (4) > }
{ 0 | 1 < I_LEVEL_TN6 : bit (4) > }
{ 0 | 1 < I_LEVEL_TN7 : bit (4) > };
```

It is noted that the fields that have been added to the EGPRS PACKET DOWNLINK ACK/NACK message 300 from Release 5 onwards (which were discussed above) are included within the EPD A/N Extension Info IE 325, which is also listed in Table 4, and which is one of the generic extension mechanisms specified for GPRS signaling messages. The maximum size of the EPD A/N Extension Info IE 325 is 64 bits, with the actual size being represented by the EPD A/N Extension Length field 330 of FIG. 3, which is also listed in Table 4. EPD A/N Extension Length 330 is a 6 bit field encoding values from 1 to 64, where 64 is the maximum size of the EPD A/N Extension Info IE 325. In addition to the maximum message length of the EGPRS PACKET DOWNLINK ACK/NACK message 300 itself, the maximum size of the EPD A/N Extension Info IE 325 is another factor constraining the information and, in particular, the number and types of link quality measurements that can be included in the EGPRS PACKET DOWNLINK ACK/NACK message 300.

Based on the foregoing discussion, the link quality measurement reporting capacity of the EPD A/N Extension Info IE 325 of the EGPRS PACKET DOWNLINK ACK/NACK message 300 can be determined. For different reporting conditions, Table 6 lists the maximum number of per slot measurements (e.g., per-slot mean BEP and/or interference) for a secondary carrier in a downlink dual carrier configuration that can be reported (e.g., signaled) within the EPD A/N Extension Info IE 325 of an existing EGPRS PACKET DOWNLINK ACK/NACK message 300. The values in Table 6 assume that Release 5 (Iu mode) and Release 6 (Multiple TBF) optional IEs are not present in the EGPRS PACKET DOWNLINK ACK/NACK message 300, and that the only constraint on the number of per slot measurements is the length limit of 64 bits for the EPD A/N Extension Info IE 325. As such, the values listed in the Table 6 are exemplary and may change under different assumptions and/or depending upon the ways in which the values are estimated.

TABLE 6

|  | Two (both GMSK & 8PSK) overall BEP reported | One (either GMSK or 8PSK) overall BEP reported | No overall BEP reported |
| --- | --- | --- | --- |
| Only per slot mean BEP reports | 4 | 6 | 8 |
| Only interference measurements reports | 6 | 8 | 8 |
| Per slot mean BEP + interference measurements | e.g., 3 + 0, 2 + 1, 1 + 2, 0 + 4 | e.g., 4 + 1, 3 + 2, 2 + 3, 1 + 4 | e.g., 6 + 0, 5 + 1, 4 + 3, 3 + 4 |

At least the following observation can be made from Table 6. When both GMSK and 8PSK overall BEP are reported, only four (4) per slot mean BEP values can be reported (with no interference measurements reported) values, which can be a significant limitation considering that downlink dual carrier assignments can include 4 or more timeslots per carrier, and up to 8 timeslots per carrier.

Next, the sizes of the EPD A/N Extension Info IE 325 that would be required to allow a particular number of per slot measurements (e.g., per-slot mean BEP and/or interference) to be reported using the EGPRS PACKET DOWNLINK ACK/NACK message 300 is determined. Table 7 lists the resulting sizes of the EPD A/N Extension Info IE 325 of an EGPRS PACKET DOWNLINK ACK/NACK message 300 that are or would be required if 4 or more per slot mean BEP measurements were to be reported without any interference measurement reporting. It is noted that any size values above 64 exceed the existing size limitation of the EPD A/N Extension Info IE 325 and cannot be used according to the present specification. The values in Table 7 assume the same assumptions employed to determine the values of Table 6. As such, the values listed in the Table 7 are exemplary and may change under different assumptions and/or depending upon the ways in which the values are estimated.

TABLE 7

|  | Both GMSK & 8PSK overall BEP reported | Single overall BEP reported | No overall BEP reported |
| --- | --- | --- | --- |
| 4 per slot mean BEP | 60 | 52 | 44 |
| 5 per slot mean BEP | 65 | 57 | 49 |
| 6 per slot mean BEP | 70 | 62 | 54 |
| 7 per slot mean BEP | 75 | 67 | 59 |
| 8 per slot mean BEP | 80 | 72 | 64 |

Table 8 lists the sizes of the EPD A/N Extension Info IE 325 that are or would be required if 4 or more per slot interference measurements were to be reported without any per slot mean BEP reporting. Again, it is noted that any size values above 64 exceed the existing size limitation of the EPD A/N Extension Info IE 325 and cannot be used according to the present GSM specification. The values in Table 8 assume the same assumptions employed to determine the values of Table 6. As such, the values listed in the Table 8 are exemplary and may change under different assumptions and/or depending upon the ways in which the values are estimated.

TABLE 8

|  | Both GMSK & 8PSK overall BEP reported | Single overall BEP reported | No overall BEP reported |
| --- | --- | --- | --- |
| 4 per slot interference meas. | 56 | 48 | 40 |
| 5 per slot interference meas. | 60 | 52 | 44 |
| 6 per slot interference meas. | 64 | 56 | 48 |
| 7 per slot interference meas. | 68 | 60 | 52 |
| 8 per slot interference meas. | 72 | 64 | 56 |

At least the following observations can be made from Table 7 and Table 8. The rightmost column of Table 7 indicates that not including any overall BEP report would allow up to 8 per slot mean BEP measurements to be reported, whereas the middle column of Table 7 indicates that including a single overall BEP report (either for 8PSK or GMSK) would allow up to 6 per slot mean BEP measurements to be reported (without the EPD A/N Extension Info IE 325 exceeding 64 bits), whereas Table 8 indicates that these same conditions would both allow reporting up to a full 8 per slot interference measurements. Also, increasing the maximum size of the EPD A/N Extension Info IE 325 to 80 bits would allow reporting up to 8 per slot mean BEP measurements, and increasing maximum size of the EPD A/N Extension Info IE 325 to 72 bits would allow reporting up to 8 per slot interference measurements, without restricting the per modulation overall BEP reporting.

Next, the reporting capacity limitations due to the size of the EGPRS PACKET DOWNLINK ACK/NACK message 300 itself are evaluated. Table 9 lists the maximum number of per slot measurements per carrier that can be included when reporting two carriers of a downlink dual carrier configuration within an EGPRS PACKET DOWNLINK ACK/NACK message 300, allowing for an EPD A/N Extension Info IE 325 of arbitrary length (i.e. not limited to 64 bits). As such, only the constraint on the maximum size of the EGPRS PACKET DOWNLINK ACK/NACK message 300 itself affects the values listed in Table 9. Also, the results in Table 9 correspond to reporting either per slot mean BEP or interference measurements, but not both. The values in Table 9 assume that: (i) Release 5 (Iu mode) and Release 6 (Multiple TBF) optional IEs are not present in the EGPRS PACKET DOWNLINK ACK/NACK message 300; (ii) the Channel Request Description and PFI IEs are not included in the EGPRS PACKET DOWNLINK ACK/NACK message 300; (iii) the EGPRS PACKET DOWNLINK ACK/NACK message 300 is in response to a poll requesting measurements with higher priority than ack/nack information (as per the ES/P or CES/P field), such that the space required for the Ack/Nack bitmap is not a constraining factor, therefore allowing that (iv) the minimum size is assumed for the EGPRS Ack/Nack Description IE 310. As such, the values listed in the Table 9 are exemplary and may change under different assumptions and/or depending upon the ways in which the values are estimated. In Table 9, examples listed in the format of "i+j" represent that "i" such measurement reports can be included for the primary carrier of the dual carrier configuration, and "j" such measurement reports can be included for the secondary carrier of the dual carrier configuration.

TABLE 9

|  | Both GMSK & 8PSK overall BEP reported per carrier (4 LQM reports) | 3 overall BEP reported | 2 or fewer overall BEP reported |
| --- | --- | --- | --- |
| Maximum number of per slot mean BEP reports | 12 (e.g. 6 + 6, 7 + 5, etc.) | 14 (e.g. 7 + 7, 8 + 6, etc.) | 16 |
| Maximum number of per slot interference meas. reports | 16 | 16 | 16 |

At least the following observations can be made from Table 9. With both GMSK and 8PSK overall BEP reported for each carrier (e.g., yielding 4 overall BEP in total to be reported), a maximum of 12 per slot mean BEP measurement values (from either carrier) can be reported for a dual carrier configuration. If 3 overall BEP values are reported, a maximum of 14 per slot mean BEP measurement values can be included. Table 9 indicates there is no limitation regarding the number of interference measurements that can be reported. Additionally, when the mobile station reports at most one of GMSK or 8PSK overall BEP values for each carrier, 16 per slot mean BEP measurement values can be reported for a dual carrier configuration. In other words, the maximum size of the EGPRS PACKET DOWNLINK ACK/NACK message 300 is not a constraint on the number of per slot BEP measurement values that can be reported under this circumstance.

To ascertain existing restrictions on the number and/or types of link quality measurements that can be reported for downlink dual carrier operation using the EGPRS PACKET DOWNLINK ACK/NACK TYPE 2 message 400, a review of the detailed structure of the EGPRS PACKET DOWNLINK ACK/NACK TYPE 2 message 400 is provided. The structure of the contents of the EGPRS PACKET DOWNLINK ACK/ NACK message 400 is listed in Table 10.

TABLE 10

```
< EGPRS Packet Downlink Ack/Nack Type 2 message content > ::=
    < DOWNLINK_TFI : bit (5) >
    < MS OUT OF MEMORY : bit(1)>
    { 0 | 1 < EGPRS Channel Quality Report Type 2 : < EGPRS Channel Quality Report Type 2 IE >
>}
    { 0 | 1 < Channel Request Description : < Channel Request Description IE > >}
    { 0 | 1 < PFI : bit(7) > }
    { 0 | 1 < EPD A/N Extension Type 2 length : bit (8) >
        < bit (val(EPD A/N Extension length) + 1)
        & { < EPD A/N Extension Info Type 2 > ! { bit** = <no string> }} > }
    < EGPRS Ack/Nack Description : < EGPRS Ack/Nack Description IE >>
    <padding bits > } ;
< EPD A/N Extension Type 2 Info > ::=
    {0 | 1 < Extended Channel Request Description : < Extended Channel Request Description IE
> >}
    < EARLY_TBF_ESTABLISHMENT : bit (1) >
    { 0 | 1 < Secondary Dual Carrier Channel Report : < EGPRS Channel Quality Report Type 2 IE
> }
    < spare bit >** // ;       -- Truncation may occur between released versions of the protocol
            -- The receiver shall assume the value zero of any truncated bits
```

The layout of the EGPRS Channel Quality Report Type 2 IE, which is used to encode both the EGPRS Channel Quality Report Type 2 IE 415 and the Secondary Dual Carrier Channel Report 420, which are also listed in Table 10, is shown in Table 11.

TABLE 11

```
< EGPRS Channel Quality Report Type 2 IE> ::=
    < EGPRS BEP Link Quality Measurements Type 2 : < EGPRS BEP
Link Quality Measurements Type 2 IE>>
        < C_VALUE : bit (6) >
    < EGPRS Timeslot Link Quality Measurements Type 2 : <EGPRS
Timeslot Link Quality Measurements Type 2 IE >> ;
EGPRS-2 BEP Link Quality Measurements IE> ::=
    { 0 | 1 < GMSK_MEAN_BEP : bit (5) >
        < GMSK_CV_BEP : bit (3) >}
    { 0 | 1 < 8PSK_MEAN_BEP : bit (5) >
        < 8PSK_CV_BEP : bit (3) > }
    { 0 | 1 < QPSK_MEAN_BEP : bit (5) >
        < QPSK_CV_BEP : bit (3) > }
    { 0 | 1 < 16QAM_NSR_MEAN_BEP : bit (5) >
        < 16QAM_NSR_CV_BEP : bit (3) > }
    { 0 | 1 < 32QAM_NSR_MEAN_BEP : bit (5) >
        < 32QAM_NSR_CV_BEP : bit (3) > }
    { 0 | 1 < 16QAM_HSR_MEAN_BEP : bit (5) >
        < 16QAM_HSR_CV_BEP : bit (3) > }
    { 0 | 1 < 32QAM_HSR_MEAN_BEP : bit (5) >
        < 32QAM_HSR_CV_BEP : bit (3) > };
<EGPRS Timeslot Link Quality Measurements Type 2 IE> ::=
    { 0 | 1 < BEP_MEASUREMENTS : BEP Measurement Report
Struct >}
    { 0 | 1 < INTERFERENCE_MEASUREMENTS : Interference
Measurement Report Struct >};
< BEP Measurement Report Struct > ::=
    { 0
    | 1 <REPORTED_MODULATION : bit (2) >
        <MEAN_BEP_TN0 : bit (4) > }
    { 0
    | 1 < REPORTED_MODULATION : bit (2) >
        <MEAN_BEP_TN1 : bit (4) > }
    { 0
    | 1 < REPORTED_MODULATION : bit (2) >
        <MEAN_BEP_TN2 : bit (4) > }
    { 0
    | 1 < REPORTED_MODULATION : bit (2) >
        <MEAN_BEP_TN3 : bit (4) > }
```

TABLE 11-continued

```
    { 0
    | 1 < REPORTED_MODULATION : bit (2) >
        <MEAN_BEP_TN4 : bit (4) > }
```

TABLE 11-continued

```
    { 0
    | 1 < REPORTED_MODULATION : bit (2) >
        <MEAN_BEP_TN5 : bit (4) > }
    { 0
    | 1 < REPORTED_MODULATION : bit (2) >
        <MEAN_BEP_TN6 : bit (4) > }
    { 0
    | 1 < REPORTED_MODULATION : bit (2) >
        <MEAN_BEP_TN7 : bit (4) > };
< Interference Measurement Report Struct > ::=
    { 0 | 1 < I_LEVEL_TN0 : bit (4) > }
    { 0 | 1 < I_LEVEL_TN1 : bit (4) > }
    { 0 | 1 < I_LEVEL_TN2 : bit (4) > }
    { 0 | 1 < I_LEVEL_TN3 : bit (4) > }
    { 0 | 1 < I_LEVEL_TN4 : bit (4) > }
    { 0 | 1 < I_LEVEL_TN5 : bit (4) > }
    { 0 | 1 < I_LEVEL_TN6 : bit (4) > }
    { 0 | 1 < I_LEVEL_TN7 : bit (4) > };
```

Due to the increased number of modulations available in EGPRS2, the rules for overall BEP reporting are more complex for EGPRS2 than for EGPRS. However, it is sufficient to note that, for EGPRS2, existing networks can expect overall BEP link quality measurements to be reported for 0, 1 or at most 2 modulations for each carrier in a downlink dual carrier configuration. However, example techniques disclosed herein to report link quality measurements can support reporting of overall BEP link quality measurements for a higher number of modulations. Also, it is to be noted that a number of fields that are present in the EGPRS PACKET DOWNLINK ACK/NACK message 300 (e.g., such as the fields related to Iu mode) have not been included in the EGPRS PACKET DOWNLINK ACK/NACK TYPE 2 message 400 due to the historical lack of commercial usage of these fields and/or their corresponding features, which can provide gains in terms of available space.

Based on the foregoing discussion, the link quality measurement reporting capacity of the EGPRS PACKET DOWNLINK ACK/NACK TYPE 2 message 400 can be determined. The EGPRS PACKET DOWNLINK ACK/ NACK TYPE 2 message 400 is currently specified for reporting measurements related to a downlink TBF using EGPRS2. For different reporting conditions, Table 12 lists the maximum number of per slot mean BEP measurements or interference measurements that can be included within an existing EGPRS PACKET DOWNLINK ACK/NACK TYPE 2 message 400 when reporting two carriers of a downlink dual carrier configuration. The values in Table 12 assume that: (i) (Extended) Channel Request Description and PFI IEs not included in the EGPRS PACKET DOWNLINK ACK/NACK TYPE 2 message 400; (ii) the EGPRS PACKET DOWNLINK ACK/NACK TYPE 2 message 400 is in response to a poll requesting measurements with higher priority than ack/nack information (as per the CES/P field), such that the space required for the Ack/Nack bitmap is not considered as a constraining element; therefore allowing that (iii) the minimum size is assumed for the EGPRS Ack/Nack Description IE 410. As such, the values listed in the Table 12 are exemplary and may change under different assumptions and/or depending upon the ways in which the values are estimated. In Table 12, examples listed in the format of "m+n" represent that, across both carriers of a dual carrier configuration, a total of "m" mean BEP measurement reports can be included, and "n" interference measurement reports can be included in the GPRS PACKET DOWNLINK ACK/NACK TYPE 2 message 400.

basis, instead of on a per timeslot basis. Thus, when interference measurements are not reported together with per slot mean BEP, the limits related to per slot mean BEP reporting discussed above may be less severe under RTTI configurations, because for RTTI there are no more than 4 timeslot pairs per carrier and 8 timeslot pairs for the two carriers of a downlink dual carrier configuration. The limits related to per slot interference reporting are the same for BTTI and RTTI configurations, as the mobile station is to report interference measurements on a per timeslot interval in either a BTTI or an RTTI configuration.

The foregoing description illustrates that the set of link quality measurements that a mobile station (such as the mobile station 110 or 115) can be requested to report to the network during a downlink TBF may not fully fit in the EGPRS PACKET DOWNLINK ACK/NACK message 300 (for EGPRS mode) or the EGPRS PACKET DOWNLINK ACK/NACK TYPE 2 message 400 (for EGPRS2 mode) when the mobile is involved in a downlink dual carrier configuration. The restrictions on the set of link quality measurements able to be included in these messages can be due to the maximum size of the message, or to the maximum size of an information element contained in the message, or both. The reasons these restrictions on link quality measurement reporting can become a significant issue in downlink dual carrier

TABLE 12

|  | 4 overall BEP reported | 3 overall BEP reported | 2 overall BEP reported | 1 overall BEP reported | No overall BEP reported |
|---|---|---|---|---|---|
| Only per slot mean BEP reports | 9 | 10 | 11 | 13 | 14 |
| Only interference meas. reports | 13 | 15 | 16 | 16 | 16 |
| Per slot mean BEP + interference meas. | e.g., 6 + 0, 5 + 2, . . . 2 + 6, 1 + 8 | e.g., 7 + 1, 6 + 2, . . . 3 + 7, 2 + 8 | e.g., 9 + 0, 8 + 1, . . . 4 + 7, 3 + 8 | e.g., 10 + 0, 9 + 2, . . . 6 + 6, 5 + 8 | e.g., 11 + 0, 10 + 2, . . . 7 + 7, 6 + 8 |

At least the following observations can be made from Table 12. The constraints on the number of link quality measurements able to be reported with the EGPRS PACKET DOWNLINK ACK/NACK TYPE 2 message 400 can be more substantial than for the EGPRS PACKET DOWNLINK ACK/NACK message 300. For example, when a single overall BEP is reported per carrier (corresponding to 2 overall BEP values in total), the EGPRS PACKET DOWNLINK ACK/NACK TYPE 2 message 400 can include 11 per slot mean BEP values, while 16 would be supported for the same conditions by EGPRS PACKET DOWNLINK ACK/NACK message 300. This is due to the additional overhead in the EGPRS PACKET DOWNLINK ACK/NACK TYPE 2 message 400 to allow for the possibility of encoding more modulations schemes. Furthermore, even if no ack/nack reporting is required (e.g. such as when the poll requests measurements as being highest priority as per CES/P field), there is an overhead (of 16 bits at least) for encoding the EGPRS Ack/Nack Description IE 410, which cannot be omitted under the existing GSM specifications.

The limits listed in Table 6, Table 7, Table 8, Table 9 and Table 12 on the number and/or types of per slot link quality measurements supported by the existing forms of the EGPRS PACKET DOWNLINK ACK/NACK message 300 and the existing EGPRS PACKET DOWNLINK ACK/NACK TYPE 2 message 400 assume a BTTI configuration on the downlink channels. In the case of an RTTI configuration, the mobile station is to report the mean BEP values on a per timeslot pair operation is that the overall number of timeslots to report in a dual carrier configuration can double relative to a single carrier configuration, and features such as EFTA may further increase the number of timeslots that can be used by a mobile station. For example, for some mobile stations, up to 8 downlink timeslots per carrier (for a total of 16 slots) can be assigned to a mobile station with EFTA, and up to 5 or 6 timeslots per carrier can be assigned without EFTA. It is therefore noted that the existing link quality measurement reporting requirements presently specified for the GPRS network radio interface are inconsistent, as they cannot be fulfilled for at least some relevant configurations.

Examining the existing restrictions on link quality measurement reporting in further detail, it can be observed from Table 6 to Table 8 and the associated description above that, for a mobile station in a downlink dual carrier configuration, the maximum size (64 bits) currently specified for the EPD A/N Extension Info IE 325 may not allow reporting of all of the requested per slot interference measurements and/or per slot mean BEP values. For example, from Table 6 it is not possible to report per slot mean BEP statistics for more than 4 timeslots on the secondary carrier (assuming two overall BEP measurements are to be reported, but with no interference measurement reporting). This represents a restriction preventing reporting of at least some requested per slot BEP measurements for mobile stations of multislot class 30 or above (and consequently for mobile stations of multislot classes 8, 10, 11, 12 with—and operating in accordance with—an equivalent multislot class 30 or above). Similarly, from Table 6 it is not possible to report more than 6 interference measurements on the secondary carrier (assuming two overall BEP measurements are to be reported, but with no per slot mean BEP reporting). However, per slot interference measurements should be reported for all timeslots of the corresponding carrier, or at a minimum for the number of timeslots from TSmin to TSmax as described above, independent of the assigned timeslots and the multislot class of the mobile station. Thus, this restriction preventing reporting of at least some per slot interference measurements may affect any class of mobile station supporting downlink dual carrier operation.

Also, it can be observed from Table 9 and the associated description above that a mobile station in a downlink dual carrier configuration would not be able to report more than 12 or 14 per slot mean BEP values in total (even with no interference measurement reporting) within the EGPRS PACKET DOWNLINK ACK/NACK message 300 depending on the number of overall BEP measurements to be included in the same message. Assuming the maximum size of the EPD A/N Extension Info IE 325 is increased (as described below), then the restrictions due the maximum size of the PACKET DOWNLINK ACK/NACK message 300 would affect mobile stations of multislot classes 24 through 29, which may be assigned up to 16 downlink slots (this is the case for EFTA capable mobile stations signaling such an alternative multislot class).

Furthermore, it can be observed from Table 12 and the associated description above that a mobile station in a downlink dual carrier configuration would not be able to report more than 9 per slot mean BEP values (e.g. 5 for the first carrier and 4 for the secondary carrier) within an EGPRS PACKET DOWNLINK ACK/NACK TYPE 2 message 400 if two overall BEP measurements per carrier are also included, because the maximum length of the message would be exceeded (even with no interference measurement reporting). This is restricting for mobile stations that could be assigned 10 downlink slots or more, such as for mobile stations of multislot class 30 or above (and consequently those of multislot classes 8, 10, 11, 12 with—and operating in accordance with—an equivalent multislot class 30 or above). Similarly, from Table 12 it can be observed that the maximum size of the EGPRS PACKET DOWNLINK ACK/NACK TYPE 2 message 400 prevents reporting more than 13 interference measurements if two overall BEP measurements per carrier are also included (even with no per slot mean BEP reporting).

Moreover, potentially significant message and IE size restrictions exist for reporting combinations of both mean BEP and interference measurements in the case of a downlink dual carrier configuration in prior networks supporting EGPRS and/or EGPRS2. For example, in an EGPRS dual carrier configuration, if two overall BEP values are to reported, then at most only 2 per slot mean BEP values plus 1 interference measurement would fit in the secondary carrier report of the EGPRS PACKET DOWNLINK ACK/NACK message 300 (see Table 6). As another example, in an EGPRS2 dual carrier configuration, if two overall BEP values are to be reported, then at most 5 per slot mean BEP values (e.g., 3 on the primary carrier plus 2 on the secondary carrier) plus 2 interference measurements (e.g., 1 for each carrier) would fit in the EGPRS PACKET DOWNLINK ACK/NACK TYPE 2 message 400 (see Table 12).

Presently the GSM specifications specify that the mobile station shall report interference measurements for no more than four time slots in the case that combined reporting (e.g., of both per slot BEP and per slot interference measurements) is requested. However, in the case of dual carrier operation, the present GSM specifications do not specify if the four timeslots limit applies individually for each carrier (which would make 8 timeslots in total, which is assumed herein), or if this limit should be considered globally for both carriers (e.g. 2 timeslots per carrier). Moreover, if all required (e.g., specified and requested) measurements cannot fit in the reporting message, the present 3GPP specifications do not specify, for example, whether priority should be given to the inclusion of one type of measurement (e.g., per slot mean BEP reports) relative to another type of measurement (e.g., per slot interference reports).

Figure 5:
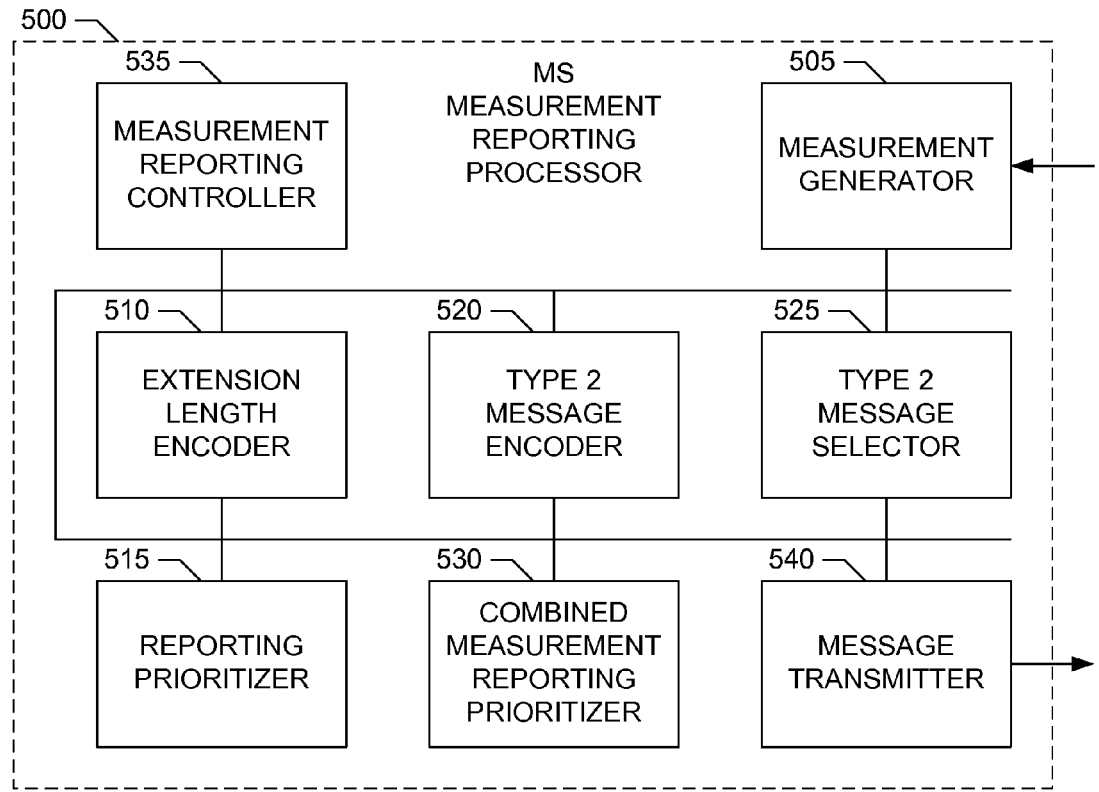
FIG. 5 is a block diagram of an example measurement reporting processor to support mobile station reporting of link quality measurements for downlink dual carrier operation.
Figure 6:
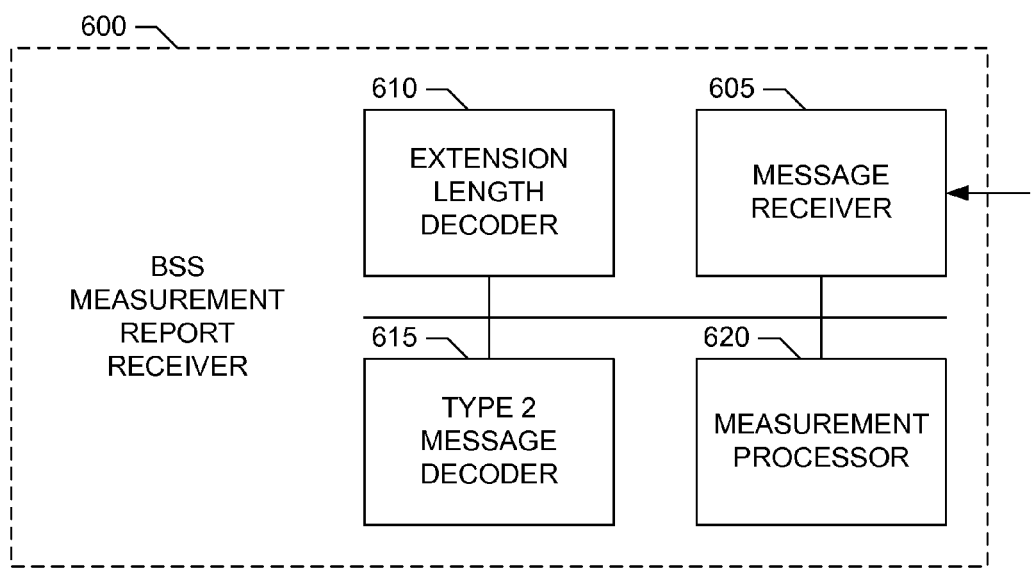
FIG. 6 is a block diagram of an example measurement report receiver to support base station subsystem processing of link quality measurements for downlink dual carrier operation.

FIG. 5 illustrates an example measurement reporting processor 500 that can be used by a mobile station (such as the mobile stations 110 and/or 115) to implement one or more example techniques disclosed herein to reduce or eliminate the prior restrictions described above on the number and/or types of link quality measurements that can be reported for dual carrier operation in an EGPRS network. For example, the measurement reporting processor 500 can be used to implement one or more of the measurement reporting processors 150 and/or 155 included in the respective mobile stations 110 and 115 of FIG. 1. On the network side, FIG. 6 illustrates an example measurement report receiver 600 that can be used by a network (such as by the network element 105) to implement one or more of these example techniques to reduce or eliminate the prior restrictions described above on the number and/or types of link quality measurements that can be reported for dual carrier operation in an EGPRS network. For example, the measurement report receiver 600 can be used to implement the measurement report receiver 160 included in the network element 105 of FIG. 1

In the description that follows, five different example techniques to reduce or eliminate the prior link quality measurement reporting restrictions for dual carrier operation are described. For clarity, the five example techniques disclosed herein a referred to as Techniques #1 though #5. Several example approaches for implementing some of these example techniques are also provided. Generally, the measurement reporting processor 500 and the measurement report receiver 600 can implement these different example techniques individually or in almost any combination. Examples of combining the different example techniques disclosed herein are provided throughout the following description.

At a high level, some example techniques disclosed herein reduce or eliminate the prior link quality measurement reporting restrictions for dual carrier operation by improving the coding of the packet downlink ack/nack messages for EGPRS (see Technique #1) and EGPRS2 (see Technique #3) so that more information than currently possible can be conveyed in these messages. Other example techniques disclosed herein help alleviate the prior link quality measurement reporting restrictions for dual carrier operation by prioritizing the selection and sending of only a subset of the candidate measurements if not all the candidates measurements could fit a single message instance (see Technique #2 for reporting per slot measurements of a single type, and see Technique #5 for combined reporting of different types of per slot measurements). Such prioritization provides consistent rules for reporting link quality measurements fully applicable to downlink dual carrier and ensures that the MS behavior is deterministic, which in turn enables the network to accurately interpret the received results. Yet another example technique disclosed herein reduces or eliminates the prior link quality measurement reporting restrictions for dual carrier operation by allowing the usage of the (existing or enhanced) EGPRS PACKET DOWNLINK ACK/NACK TYPE 2 message 400, today applicable only to EGPRS2, for EGPRS TBFs not using EGPRS2 (see Technique #4).

Turning to FIG. 5, the example measurement reporting processor 500 includes an example measurement generator 505 to generate link quality measurements, such as overall BEP measurement values, per slot mean BEP measurement values, and/or per slot interference measurement values, etc., using any appropriate technique. The measurement reporting processor 500 also includes one or more of an example extension length encoder 510, an example reporting prioritizer 515, an example type 2 message encoder 520, an example type 2 message selector 525 and an example combined measurement reporting prioritizer 530 to implement one or more of the example Techniques #1-#5 described herein. The measurement reporting processor 500 further includes an example measurement reporting controller 535 to, for example, invoke one or more of the example extension length encoder 510, the example reporting prioritizer 515, the example type 2 message encoder 520, the example type 2 message selector 525 and/or the example combined measurement reporting prioritizer 530 to implement one or more of the example Techniques #1-#5 individually or in combination. The measurement reporting processor 500 includes an example message transmitter 540 to prepare and send the packet downlink ack/nack messages 300 or 400 (possibly modified as described below), which include the requested and specified link quality measurements.

Turning to FIG. 6, the example measurement report receiver 600 includes an example message receiver 605 to receive, using any appropriate technique, packet downlink ack/nack messages 300 and/or 400 prepared and sent by mobile stations (such as the mobile stations 110 and 115) using the measurement reporting processor 500. The measurement report receiver 600 also includes one or more of an example extension length decoder 610, an example type 2 message decoder 615 and/or an example measurement processor 620 to implement one or more of the example Techniques #1-#5 described herein.

Examining the measurement reporting processor 500 and the measurement report receiver 600 of the illustrated examples in greater detail, the extension length encoder 510 and the extension length decoder 610 can be used to implement Technique #1 disclosed herein for reporting link quality measurements. Technique #1 involves enhanced coding allowing an increased maximum size of the EPD A/N Extension Info IE 325. For example, Technique #1 extends the maximum size of the EPD A/N Extension Info IE 325 in the EGPRS PACKET DOWNLINK ACK/NACK message 300 beyond the prior maximum value of 64 bits. As such, Technique #1 allows inclusion of more than, for example, 4 per slot mean BEP reports values (which is the current limitation) for the secondary carrier in a dual carrier configuration. Three example approaches for implementing Technique #1 are described in greater detail below.

The reporting prioritizer 515 and the measurement processor 620 of the illustrated examples can be used to implement Technique #2 disclosed herein for reporting link quality measurements. Technique #2 involves prioritizing selection and reporting of a subset of link quality measurements for the secondary carrier of a dual carrier configuration. Technique #2 introduces modifications to the prior rules for reporting link quality measurement for the cases where not all the requested measurement values can be included in the Secondary Dual Carrier Channel Report due to the current size limitation of the EPD A/N Extension Info IE 325, or cannot fit in the overall size of the EGPRS PACKET DOWNLINK ACK/NACK message 300. Technique #2 is also applicable to cases where not all the requested measurement values can be included in the EGPRS PACKET DOWNLINK ACK/NACK TYPE 2 message 400.

Several example approaches for implementing Technique #2 are described in greater detail below. The example approaches include a first example approach that involves sending the overall BEP only for the most relevant modulation when one or more per slot mean BEP value(s) and/or one or more per slot interference measurement(s) could not be reported otherwise. A second example approach involves omitting one or both overall BEP measurements when one or more per slot mean BEP value(s) and/or one or more per slot interference measurement(s) could not be reported otherwise. A third example approach involves alternating overall BEP measurements for each carrier over two consecutive reports when one or more per slot mean BEP value(s) and/or one or more per slot interference measurement(s) could not be reported otherwise. A fourth example approach involves alternating the overall BEP measurements between the two most relevant modulations over two consecutive reports when one or more per slot mean BEP value(s) and/or one or more per slot interference measurement(s) could not be reported otherwise. A fifth example approach involves reporting only a subset of per slot mean BEP and/or interference measurement value(s).

The type 2 message encoder 520 and the type 2 message decoder 615 of the illustrated examples implement Technique #3 disclosed herein for reporting link quality measurements. Technique #3 involves enhancing the EGPRS PACKET DOWNLINK ACK/NACK TYPE 2 message 400. Several example approaches for implementing Technique #3 are described in greater detail below. The example approaches include a first example approach that involves making the inclusion of the EGPRS Ack/Nack Description IE 410 optional in the EGPRS PACKET DOWNLINK ACK/NACK TYPE 2 message 400 when measurements are reported. A second example approach involves restructuring the EGPRS PACKET DOWNLINK ACK/NACK TYPE 2 message 400 such that the EPD A/N Extension Info Type 2 IE 425 would not be used for Release 7 information. A third example approach involves implementing either or both of the preceding two approaches in a new message type, referred to herein as an EGPRS PACKET DOWNLINK ACK/NACK TYPE 3 message.

The type 2 message selector 525 and the measurement processor 620 of the illustrated examples implement Technique #4 disclosed herein for reporting link quality measurements. Technique #4 involves allowing the usage of the EGPRS PACKET DOWNLINK ACK/NACK TYPE 2 message 400 for EGPRS TBFs not using EGPRS2. For example, Technique #4 extends the usage of the EGPRS PACKET DOWNLINK ACK/NACK TYPE 2 message 400 to EGPRS TBFs not using EGPRS2 when the requested measurement information cannot fit into the EGPRS PACKET DOWNLINK ACK/NACK message 300.

The combined measurement reporting prioritizer 530 and the measurement processor 620 of the illustrated examples implement Technique #5 disclosed herein for reporting link quality measurements. Technique #5 involves implementing a prioritization scheme for combined link quality measurement reporting. Technique #5 supplements the existing rules covering combined link quality measurements reporting when the requested measurement information cannot fit into the EGPRS PACKET DOWNLINK ACK/NACK message 300 or the EGPRS PACKET DOWNLINK ACK/NACK TYPE 2 message 400. Several example approaches for implementing Technique #5 are described in greater detail below. The basis of two of the approaches is to consider the interference measurements as having a lower priority than per slot mean BEP measurements, and either transmitting the interference measurements not fitting in the reporting message in next instances of the packet downlink ack/nack message 300 or 400, or omitting reporting of any interference measurements. Other example approaches are for the mobile station to alternate in consecutive reporting messages either between per slot mean BEP measurements and interference measurements reporting, or between per slot link quality measurements for the primary and secondary carriers.

While example manners of implementing the measurement reporting processor 500 and the measurement report receiver 600 have been illustrated in FIGS. 5-6, one or more of the elements, processes and/or devices illustrated in FIGS. 5-6 may be combined, divided, re-arranged, omitted, eliminated and/or implemented in any other way. Further, the example measurement generator 505, the example extension length encoder 510, the example reporting prioritizer 515, the example type 2 message encoder 520, the example type 2 message selector 525, the example combined measurement reporting prioritizer 530, the example measurement reporting controller 535, the example message transmitter 540, the example message receiver 605, the example extension length decoder 610, the example type 2 message decoder 615, the example measurement processor 620 and/or, more generally, the example measurement reporting processor 500 and/or the example measurement report receiver 600 of FIGS. 5-6 may be implemented by hardware, software, firmware and/or any combination of hardware, software and/or firmware. Thus, for example, any of the example measurement generator 505, the example extension length encoder 510, the example reporting prioritizer 515, the example type 2 message encoder 520, the example type 2 message selector 525, the example combined measurement reporting prioritizer 530, the example measurement reporting controller 535, the example message transmitter 540, the example message receiver 605, the example extension length decoder 610, the example type 2 message decoder 615, the example measurement processor 620 and/or, more generally, the example measurement reporting processor 500 and/or the example measurement report receiver 600 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example measurement reporting processor 500, the example measurement generator 505, the example extension length encoder 510, the example reporting prioritizer 515, the example type 2 message encoder 520, the example type 2 message selector 525, the example combined measurement reporting prioritizer 530, the example measurement reporting controller 535, the example message transmitter 540, the example measurement report receiver 600, the example message receiver 605, the example extension length decoder 610, the example type 2 message decoder 615 and/or the example measurement processor 620 are hereby expressly defined to include a tangible computer readable medium such as a memory, digital versatile disk (DVD), compact disk (CD), etc., storing such software and/or firmware. Further still, the example measurement reporting processor 500 and/or the example measurement report receiver 600 of FIGS. 5-6 may include one or more elements, processes and/or devices in addition to, or instead of, those illustrated in FIGS. 5-6, and/or may include more than one of any or all of the illustrated elements, processes and devices.

Flowcharts representative of example processes that may be executed to implement the example communication system 100, the example network element 105, the example mobile stations 110 and/or 115, the example measurement reporting processors 150, 155 and/or 500, the example measurement generator 505, the example extension length encoder 510, the example reporting prioritizer 515, the example type 2 message encoder 520, the example type 2 message selector 525, the example combined measurement reporting prioritizer 530, the example measurement reporting controller 535, the example message transmitter 540, the example measurement report receivers 160 and/or 600, the example message receiver 605, the example extension length decoder 610, the example type 2 message decoder 615 and/or the example measurement processor 620 are shown in FIGS. 7-24. In these examples, the process represented by each flowchart may be implemented by one or more programs comprising machine readable instructions for execution by a processor, such as the processor 2512 shown in the example processing system 2500 discussed below in connection with FIG. 25. Alternatively, the entire program or programs and/or portions thereof implementing one or more of the processes represented by the flowcharts of FIGS. 7-24 could be executed by a device other than the processor 2512 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 7-24, or one or more portion(s) thereof, may be implemented manually. Further, although the example processes are described with reference to the flowcharts illustrated in FIGS. 7-24, many other techniques for implementing the example methods and apparatus described herein may alternatively be used. For example, with reference to the flowcharts illustrated in FIGS. 7-24, the order of execution of the blocks may be changed, and/or some of the blocks described may be changed, eliminated, combined and/or subdivided into multiple blocks.

As mentioned above, the example processes of FIGS. 7-24 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-24 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 7:
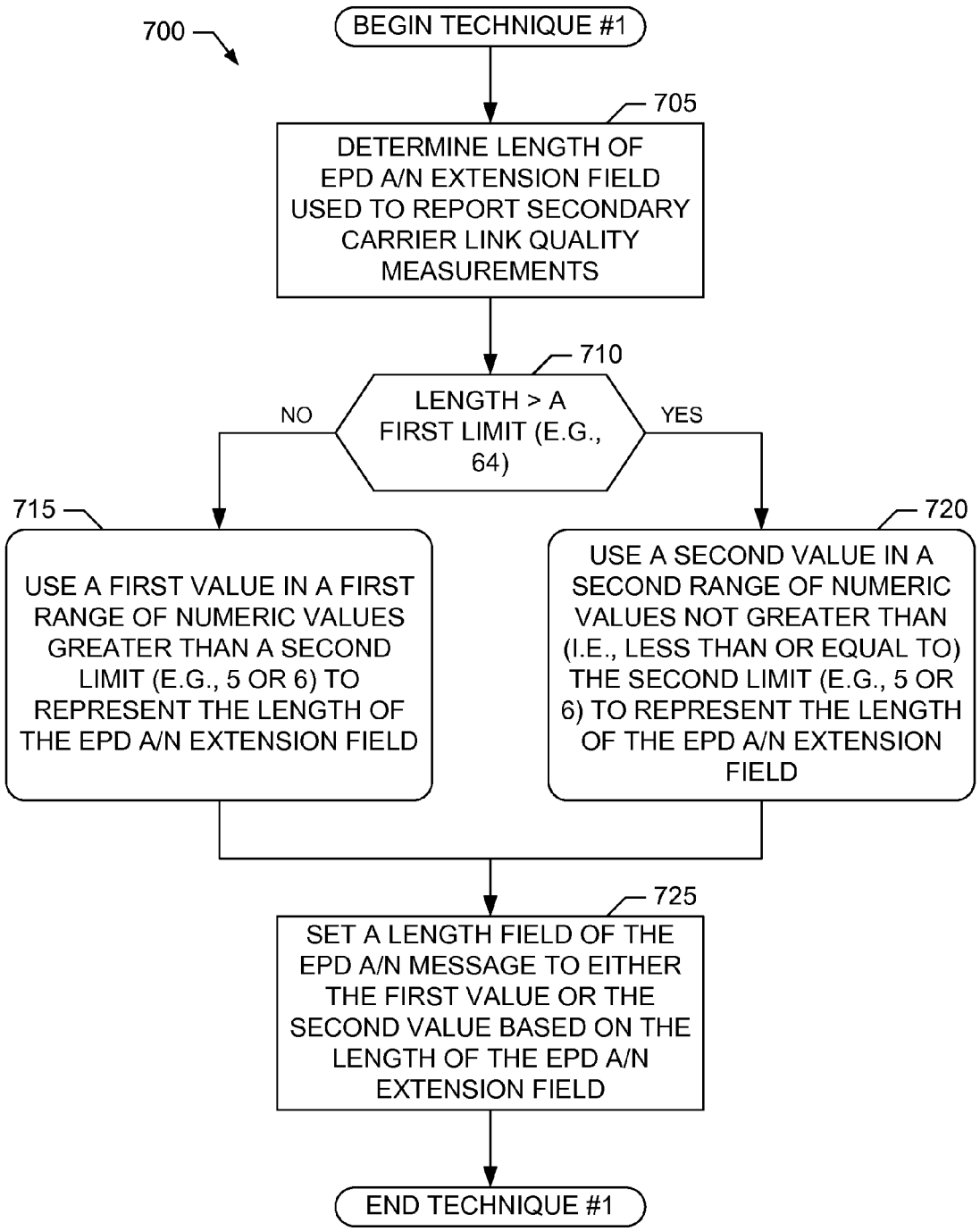
FIG. 7 is a flowchart representative of an example process to implement a first example technique, which involves message field coding, that may be used to perform link quality measurement reporting for downlink dual carrier operation.

An example process 700 that may be executed to implement example Technique #1 for link quality measurement reporting disclosed herein is illustrated in FIG. 7. Some or all of the example process 700 can be performed by the extension length encoder 510 and/or the extension length decoder 610. As mentioned above, Technique #1 involves enhanced coding to extend the maximum size of the EPD A/N Extension Info IE 325 in the EGPRS PACKET DOWNLINK ACK/NACK message 300 beyond the current value of 64 bits. This would allow for the inclusion of more than, for example, 4 per slot mean BEP reports values (which is the current limitation) for the secondary carrier. Based on Table 7 and Table 8 and the associated description above, desirable maximum values of the EPD A/N Extension Length field 330 could span a range between 65 bits (supporting 5 per slot mean BEP measurements and two overall BEP) and 80 bits (supporting 8 per slot mean BEP measurements and two overall BEP). Any increase in the size of the EPD A/N Extension Info IE 325 allowing the inclusion of a given number of per slot mean BEP values allows the alternative inclusion of a higher number of per slot interference level values or other information.

It is noted that the maximum size of the EGPRS PACKET DOWNLINK ACK/NACK message 300 restricts the total number of mean BEP report values (i.e. the total summed for the primary and secondary carriers in dual carrier operation) to 12 (see Table 9 and the associated description above).

Technique #1 involves extending the size of the EPD A/N Extension Info IE 325 such that backward compatibility is preserved or, such that no additional fields or information is required to unambiguously determine the length of the field. In general, this can be achieved by partitioning values of the EPD A/N Extension Length field 330 into different ranges such that each range of values is mapped differently to represent a different range of sizes of the EPD A/N Extension Info IE 325. For example, a first range of values of the EPD A/N Extension Length field 330 could use a first type of mapping (e.g., linear, nonlinear, lookup table, etc.) to represent a first range of sizes of the EPD A/N Extension Info IE 325, whereas a different second range of values of the EPD A/N Extension Length field 330 could use a different second type of mapping (e.g., linear, nonlinear, lookup table, etc.) to represent a different second range of sizes of the EPD A/N Extension Info IE 325, and so on over the number of range partitions of the EPD A/N Extension Length field 330. In some examples, the number of range partitions of the EPD A/N Extension Length field 330 could be increased (e.g., to allow even larger sizes of the EPD A/N Extension Info IE 325) as additional information is defined as being available for including in the A/N Extension Length field 330.

In an example of Technique #1, the size values associated with the lowest values of the EPD A/N Extension Length field 330 are redefined (e.g., re-mapped) to represent sizes of the EPD A/N Extension Info IE 325 greater than the current maximum size. For example, Table 13 illustrates an example enhanced coding of the EPD A/N Extension Length field 330 such that values less than or equal to a value I-max (e.g., a first range of values) are used to represent sizes of the EPD A/N Extension Info IE 325 greater than the current maximum size (i.e., 64 bits). The value I-max is specified to ensure that the bit values from 0 up to I-max in the EPD A/N Extension Length field 330 are not actually used in existing systems (e.g., using the existing interpretation of the EPD A/N Extension Length field 330) due to a minimum amount of information that is generally to be included within the EPD A/N Extension Info IE. The meaning of the length values greater than I-max (e.g., a second range of values) would be kept unchanged.

TABLE 13

| EPD A/N Extension Length | IE size (current) | IE size (proposed) |
|---|---|---|
| 0 | 1 | Size(0) > 64 |
| 1 | 2 | Size(1) > 64 |
| 2 | 3 | Size(2) > 64 |
| ... | ... | ... |
| I-max | I-max + 1 | Size(I-max) = Max size |
| I-max + 1 | I-max + 2 | Size(I-max + 1) = I-max + 2 |
| I-max + 2 | I-max + 3 | Size(I-max + 2) = I-max + 3 |
| ... | ... | ... |
| 63 | 64 | Size(63) = 64 |

In some examples, the value of I-max in Table 13 is set to be lower than the smallest value expected to be used in practice today according to the prior interpretation of the EPD A/N Extension Length field 330. In other words, I-max is selected based on the minimum amount of information expected to be included in the EPD A/N Extension Info IE 325. For example, considering that the Release 5 (Iu-mode) and Release 6 (Multiple TBFs) extensions discussed above are not generally used, a reason for including the EPD A/N Extension Info IE 325 would be because Release 7 information, such as the EARLY_TBF_ESTABLISHMENT field and optionally the Secondary Dual Carrier Channel Report IE, listed in Table 4, is to be included. In this case (i.e., where none of the optional fields are present) the minimum size of the EPD A/N Extension Info IE 325 would be of 6 bits (see Table 4.)

Furthermore, it is expected that an existing mobile station (or a mobile station not implementing Technique #1) in a downlink dual carrier configuration, when polled for reporting at least one of interference measurements or BEP measurements, would include the Secondary Dual Carrier Channel Report 320 comprising at least the C_VALUE field for this carrier as well as the presence indicators of the optional information (see Table 5), which would enforce a minimum size of 16 bits.

Assuming that the minimum size of the EPD A/N Extension Info IE is at least 6 bits and, thus, I-max equals 5 according to Table 13, a first example approach for implementing Technique #1 (referred to as Approach #1 for Technique #1) is to add a fixed offset of 65 to the lowest values of the EPD A/N Extension Length field 330 (e.g., corresponding to a linear mapping with an offset for this range of values). As shown in Table 14, Approach #1 for Technique #1 allows encoding values up to 70 bits for the size of the EPD A/N Extension Info IE 325, which enables reporting of up to 6 per slot mean BEP values or up to 7 per slot interference measurements in the Secondary Dual Carrier Channel Report (see Table 7 and Table 8).

TABLE 14

| EPD A/N Extension Length | EPD A/N Extension Info IE size value |
|---|---|
| 0 | Size(0) = 65 |
| 1 | Size(1) = 66 |
| 2 | Size(2) = 67 |
| ... | ... |
| 5 | Size(5) = 70 |
| 6 | Size(6) = 7 |
| 7 | Size(7) = 8 |
| ... | ... |
| 63 | Size(63) = 64 |

Assuming that the minimum size of the EPD A/N Extension Info IE is at least 8 bits and, thus, I-max equals 6 according to Table 13, a second example approach for implementing Technique #1 (referred to as Approach #2 for Technique #1) is to encode only the values above 64 that are required to represented the possible increased sizes of the EPD A/N Extension Info IE 325 (e.g., corresponding to a nonlinear or lookup table mapping), which can reduce the number of codepoints to be changed. Table 15 illustrates an example encoding of discrete (non contiguous) values up to 80 bits, which can support all link quality measurement reporting requests with up to 8 per slot mean BEP values or 8 per slot interference measurements in the Secondary Dual Carrier Channel Report.

TABLE 15

| EPD A/N Extension length | IE Size value |
|---|---|
| 0 | Size(0) = 65 |
| 1 | Size(1) = 67 |
| 2 | Size(2) = 68 |
| 3 | Size(3) = 70 |
| 4 | Size(4) = 72 |
| 5 | Size(5) = 75 |
| 6 | Size(6) = 80 |
| 7 | Size(7) = 8 |
| ... | ... |
| 63 | Size(63) = 64 |

In some examples, future extensions to the EPD A/N Extension Info IE 325 of the EGPRS PACKET DOWNLINK ACK/NACK message 300 to support new/additional features may allow a meaningful EPD A/N Extension Info IE 325 to be constructed without including the Secondary Dual Carrier Channel Report 320. In such examples, the minimum possible size of the EPD A/N Extension Info IE 325 may be less than or equal to the number I-max+1, corresponding to the EPD A/N Extension length field values whose meaning has been redefined as per Approach #1 or Approach #2 for implementing Technique #1. For example the minimum possible size of the EPD A/N Extension Info IE 325 could become only 7 bits if a single additional bit of information is used to indicate the support of the new/additional features and the Secondary Dual Carrier Channel Report 320 is not included (instead of the current minimum of 16 bits assuming the inclusion of the Secondary Dual Carrier Channel Report 320 with at least the C_VALUE field). In such a case, however, encoding methods could be used for preventing potential collisions with one or more length values that have been redefined as per Technique #1 or Technique #2.

For example, a number of spare bits could be introduced within the future extension to ensure a minimum size of the EPD A/N Extension Info IE 325 of I-max+2 bits (which is the minimum size that could be encoded in these approaches). For instance, consider an example in which Approach #2 for Technique #1 is employed such that the EPD A/N Extension Info IE 325 has been extended such that the meaning of the first I-max+1=7 values of EPD A/N Extension Length 330 have been redefined per Table 15. A new one bit field is added in the EPD A/N Extension Info IE 325 in Release 11 for signaling the support of a new feature, while the Secondary Dual Carrier Channel Report 320 is no longer required if this new feature is supported. This would reduce the minimum size of the EPD A/N Extension Info IE 325 to 7 bits, which cannot be encoded per Table 15. In this case, a Release 11 mobile station could append one spare bit to the EPD A/N Extension Info IE 325 so that the IE would be at least 8 bits in size, which can be encoded per Table 15. The subsequent introduction of new/additional features might specify a new field in place of (e.g., reuse) one or more of these spare bit(s) that were introduced to enable encoding of the EPD A/N Extension Length 330 per Technique #1, under the condition that, for backward compatibility, the spare pattern sent by earlier terminals and the field with all bits set to 0 would bring the same meaning and would not cause confusion for the network. If this cannot be the case, then the spare bits that could cause such confusion will not be reused and the new field can be appended afterwards.

With the foregoing description of Technique #1 in mind, the process 700 of FIG. 7 begins execution at block 705 at which the extension length encoder 510 determines the length of the EPD A/N Extension Info IE 325 to be used to report link quality measurements for the secondary carrier in dual carrier operation. At block 710, the extension length encoder 510 determines whether the length of the EPD A/N Extension Info IE 325 exceeds a first limit (e.g., 64 bits, which is the prior maximum size for the EPD A/N Extension Info IE 325). If the length does not exceed the first limit, then at block 715 the extension length encoder 510 uses a first value in a first range of numeric values greater than a second limit (e.g., the second limit being I-max discussed above) to represent the length of the EPD A/N Extension Info IE 325. This corresponds to a first range partition of the EPD A/N Extension Length 330. However, if the length does exceed the first limit, then at block 720 the extension length encoder 510 uses a second value in a second range of numeric values less than or equal to the second limit (e.g., the second limit being I-max discussed above) to represent the length of the EPD A/N Extension Info IE 325. This corresponds to a second range partition of the EPD A/N Extension Length 330. (If the EPD A/N Extension Length 330 includes additional range partitions, the number of decision points at block 710 could be increased accordingly.) At block 725, the extension length encoder 510 sets the EPD A/N Extension Length 330 to either the first value determined at block 715 or the second value determined at block 720 to represent the size of the EPD A/N Extension Info IE 325.

Figure 8:
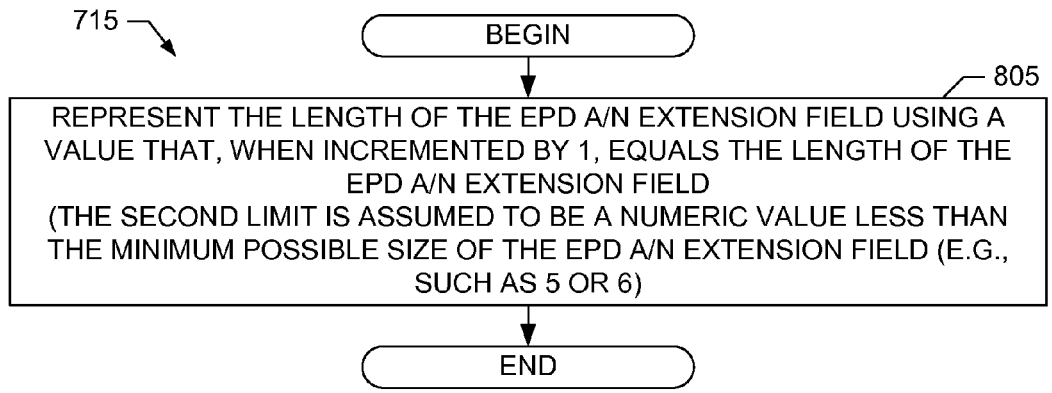
FIG. 8 is a flowchart representative of an example process for setting a field length to represent a size not greater than a limiting value that may be used to implement the process of FIG. 7.

An example process 715 that may be used to implement the processing at block 715 of FIG. 7 is illustrated in FIG. 8. At block 805 of the process 715 illustrated in FIG. 8, the extension length encoder 510 represents the size of the EPD A/N Extension Info IE 325 using a value that, when incremented by 1, equals the length of the EPD A/N Extension Info IE 325 (see Table 13 and the meaning of values of the EPD A/N Extension Length 330 greater than I-max, i.e., starting at I-max+1).

Figure 9:
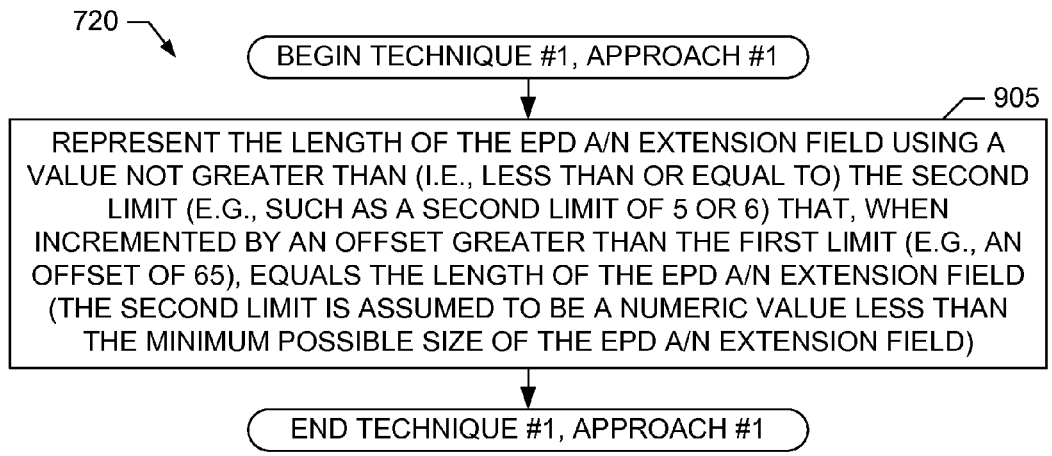
FIG. 9 is a flowchart representative of an example process to implement a first approach for setting a field length to represent a size greater than a limiting value that may be used to implement the process of FIG. 7.

A first example process 720 that may be used to implement the processing at block 720 of FIG. 7 is illustrated in FIG. 9. The example process 720 of FIG. 9 implements Approach #1 for Technique #1 and, thus, at block 905 employs encoding according to Table 14 to represent sizes of the EPD A/N Extension Info IE 325 greater than the first limit (e.g., greater than 64 bits).

Figure 10:
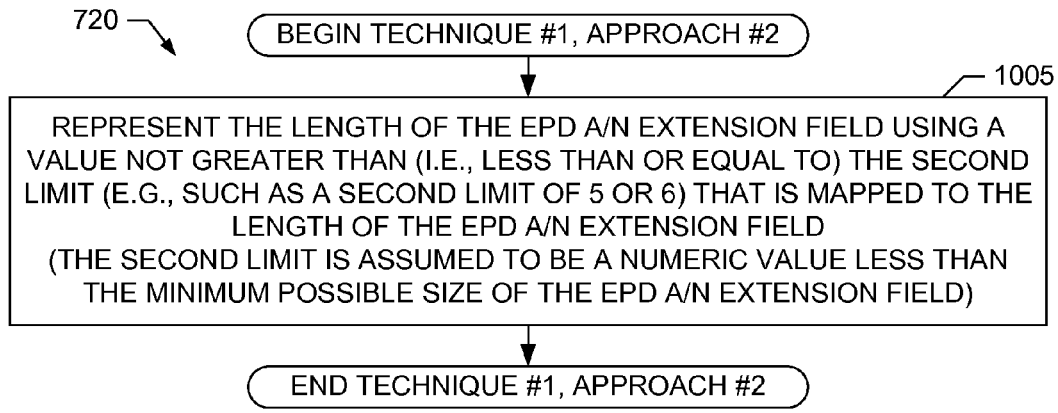
FIG. 10 is a flowchart representative of an example process to implement a second approach for setting a field length to represent a size greater than a limiting value that may be used to implement the process of FIG. 7.

A second example process 720 that may be used to implement the processing at block 720 of FIG. 7 is illustrated in FIG. 10. The example process 720 of FIG. 10 implements Approach #2 for Technique #1 and, thus, at block 1005 employs encoding according to Table 15 to represent sizes of the EPD A/N Extension Info IE 325 greater than the first limit (e.g., greater than 64 bits).

In some examples, the extension length decoder 610 decodes the EPD A/N Extension Length 330 in accordance with the encoding employed by the example processes 700, 715 and/or 720 described above.

Figure 11:
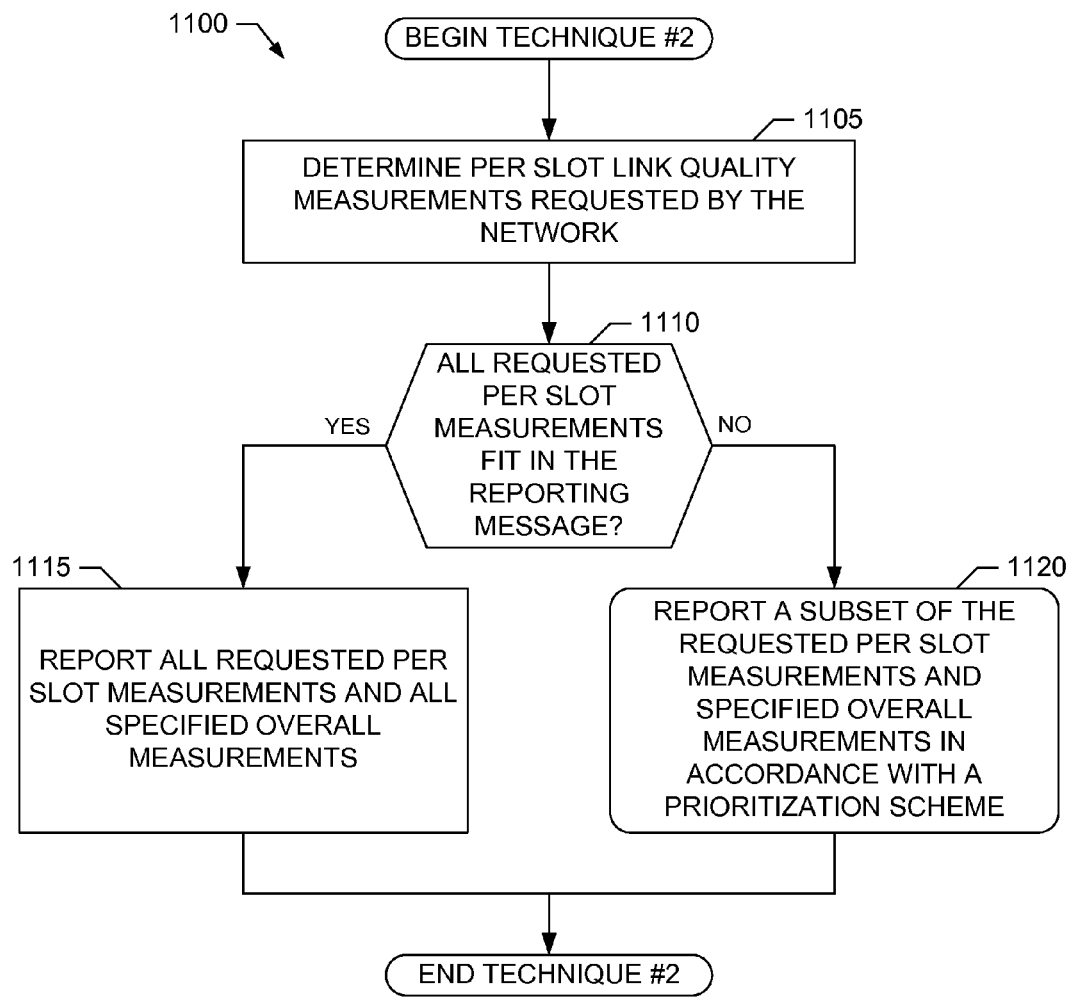
FIG. 11 is a flowchart representative of an example process to implement a second example technique, which involves prioritizing measurements for a secondary carrier, that may be used to perform link quality measurement reporting for downlink dual carrier operation.

An example process 1100 that may be executed to implement example Technique #2 for link quality measurement reporting disclosed herein is illustrated in FIG. 11. Some or all of the example process 1100 can be performed by the reporting prioritizer 515 and/or the measurement processor 620. Technique #2 involves prioritizing selection and reporting of a subset of link quality measurements to be sent by a mobile station operating in a dual carrier configuration. Technique #2 introduces rules for reporting link quality measurement for the cases where not all the requested measurement values can be included in the Secondary Dual Carrier Channel Report 320 due to the current size limitation of the EPD A/N Extension Info IE 325, or cannot fit in the overall size of the EGPRS PACKET DOWNLINK ACK/NACK message 300 to cover scenarios not addressed in the current specifications. Technique #2 is also applicable to cases where not all the requested measurement values can be included in the EGPRS PACKET DOWNLINK ACK/NACK TYPE 2 message 400.

Several example approaches for implementing Technique #2 are described in greater detail below. The example approaches include a first example approach (referred to as Approach #1 for Technique #2) that involves sending the overall BEP only for the most relevant modulation when one or more per slot mean BEP value(s) and/or one or more per slot interference measurement(s) could not be reported otherwise. A second example approach (referred to as Approach #2 for Technique #2) involves omitting one or both overall BEP measurements when one or more per slot mean BEP value(s) and/or one or more per slot interference measurement(s) could not be reported otherwise. A third example approach (referred to as Approach #3 for Technique #2) involves alternating overall BEP measurements for each carrier over two consecutive reports when one or more per slot mean BEP value(s) and/or one or more per slot interference measurement(s) could not be reported otherwise. A fourth example approach (referred to as Approach #4 for Technique #2) involves alternating, for a given carrier, the overall BEP measurements between the two most relevant modulations over two consecutive reports when one or more per slot mean BEP value(s) and/or one or more per slot interference measurement(s) could not be reported otherwise. A fifth example approach (referred to as Approach #5 for Technique #2) involves reporting only a subset of per slot mean BEP or interference measurement value(s).

Approach #1 for Technique #2 involves sending the overall BEP measurement for only the most relevant modulation. Under Approach #1, the mobile station may send an overall BEP value for only the single most relevant candidate modulation for the considered carrier and may omit the second candidate modulation when two candidate modulations have been determined. For example, for EGPRS or EGPRS2-A, the modulation reported is the one for which the mobile station has received the highest number of blocks, whereas for EGPRS2-B, the modulation reported is the one with the highest non zero value of N_BLOCKS_WEIGHTED. In some examples, when the (weighted) number of blocks is the same for the two considered modulations, the choice of the overall BEP to report may be either enforced by the specification (e.g., one type of modulation could have a default prioritization that is higher than another type of modulation) or left to be implementation dependent. For EGPRS (in which the EGPRS PACKET DOWNLINK ACK/NACK message 300 is used), Approach #1 would allow reporting per slot mean BEP measurements for up to 6 timeslots, or interference measurements for up to 8 timeslots, on the secondary carrier, with no limitation on the first carrier. For EGPRS2 (in which the EGPRS PACKET DOWNLINK ACK/NACK TYPE 2 message 400 is used), Approach #1 would allow reporting per slot mean BEP measurements for up to 11 timeslots or interference measurements for up to 16 timeslots (in total for the two carriers supporting dual carrier operation).

Another example way to implement Approach #1 for Technique #2 is to insert a new section 10.2.3.2.4 into 3GPP TS 45.008, version 7.19.0, to include, for example, the following text bounded by the >>>BEGIN<<< and >>>END<<<delimiters:

>>>BEGIN<<<

10.2.3.2.4 Measurement reporting—additional requirements for downlink dual carrier In case of a downlink dual carrier assignment, the $\gamma_{CH}$, C, MEAN_BEP (overall and per timeslot or timeslot pair measurements) and CV_BEP values may be reported for each of the radio frequency channels as specified in 3GPP TS 44.060.

If the required set of the measurements (overall MEAN_BEP and CV_BEP, MEAN_BEP_TNx measurements and/or $\gamma_{CH}$) to be reported for a given carrier as specified in sub-clause 10.2.3.2.3 does not fit in the message used for sending the measurements (see 3GPP TS 44.060) and would otherwise include the overall MEAN_BEP and CV_BEP for two candidate modulations, the mobile station shall, for the corresponding carrier, only send the overall MEAN_BEP and CV_BEP for a single modulation, selected as follows:

in case of EGPRS or EGPRS2-A, the modulation scheme for which it has received the highest number of blocks since it last sent a measurement report; if an equal number of blocks have been received for the two candidate modulation schemes, the selection of which of these modulation schemes to report is implementation dependent;

in case of EGPRS2-B, the modulation scheme with the highest non zero value of N_BLOCKS_WEIGHTED; if the two candidate modulation schemes have equal non zero value of N_BLOCKS_WEIGHTED, the modulation scheme with higher N_BLOCKS shall be reported in preference; if these two modulation schemes have also equal values of N_BLOCKS, the selection of which of these modulation schemes to report is implementation dependent.

In addition, when not all MEAN BEP_TNx measurements can be included in the message used for reporting the measurements, the selection of the timeslots for which MEAN BEP_TNx measurements are included is left implementation dependent.

>>>END<<<

Under Approach #2 for Technique #2, a mobile station may omit one or more overall BEP candidates, for example, depending on the available space in the packet downlink ack/nack message to be used and on the set of candidate measurements. If only one overall BEP has to be omitted out of two or more candidate modulations, the rules of Approach #1 for Technique #2 described above may be used for selecting the modulation to report. For EGPRS, Approach #2 would allow reporting per slot mean BEP measurements or interference measurements for up to 8 timeslots on the secondary carrier, with no limitation on the first carrier. For EGPRS2, Approach #2 would allow reporting per slot mean BEP measurements for up to 14 timeslots or interference measurements for up to 16 timeslots (in total for the two carriers supporting dual carrier operation).

Under Approach #3 for Technique #2, when the overall BEP measurements that are to be reported for both carriers cannot fit in the reporting message together with the requested per slot measurements, the mobile station is to alternate in consecutive reports (e.g., two consecutive packet downlink ack/nack messages containing link quality measurements sent by the mobile station to the network) the carrier for which overall BEP measurements are to be reported. For example, in a set of consecutive reports, the mobile station could report overall BEP measurements for the primary carrier (but not the secondary carrier) of the dual carrier configuration in the first report, and then report overall BEP measurements for the secondary carrier (but not the primary carrier) in the second report, or vice versa. It is noted that Approach #3 and Approach #1 for Technique #2 can be combined such that, for example, when multiple overall BEP measurements associated with different candidate modulations are to be reported for a particular carrier (as per Approach #3), one or more of the overall BEP measurements for that carrier are not reported (as per Approach #1) when it is that carrier's turn in the reporting sequence. Furthermore, in some examples, the measurement intervals for the link quality measurements may change when Approach #3 for Technique #2 is activated for measurement reporting. For example, the measurement intervals may be increased to extend over two reporting periods because link quality measurements for a particular carrier are reported via only every other reporting message. Also, because the reporting messages for each of the carriers in a dual carrier configuration are staggered across consecutive reporting periods, the measurement intervals for each carrier's link quality measurements may be staggered accordingly.

Under Approach #4 for Technique #2, when the overall BEP values corresponding to two (or more) modulations are to be sent for a given carrier but both cannot fit in the reporting message together with the requested per slot measurements, the mobile station is to alternate in two consecutive reports containing link quality measurements which of the two overall BEP candidates are to be reported for a particular carrier. Also, in some examples, the measurement intervals for the link quality measurements may change when Approach #4 for Technique #2 is activated for measurement reporting. For example, the measurement intervals may be increased to extend over two or more reporting periods because different overall BEP candidates for a particular carrier are reported via only every other reporting message As such, in some examples the measurement period for a particular modulation may extend back to the previous time when an overall BEP for the particular modulation was sent, which may be before the most recent packet downlink ack/nack message 300 or 400 was sent. Also, because the reporting messages for different overall BEP candidates for a particular carrier are staggered across consecutive reporting periods, the measurement intervals for each overall BEP candidate for the particular carrier may be staggered accordingly. Any appropriate technique can be used to select the modulation to report when one or more modulations are changed within the set of two candidate modulations for which overall BEP is to be reported.

Under Approach #5 for Technique #2, when all of the relevant per slot measurement values cannot all be included in the polled EGPRS PACKET DOWNLINK ACK/NACK message 300 or EGPRS PACKET DOWNLINK ACK/NACK TYPE 2 message 400, the mobile station is allowed to report only a subset of the available per slot measurement values. Approach #5 would limit link quality measurement reporting to the maximum measurement numbers indicated in Table 6 and Table 9 and the associated description, depending on which measurements types are requested by the network. In some examples, the network requesting the measurements is aware that the requested measurements cannot all be included (e.g. due to the number of timeslots assigned to the MS on each carrier) and is to take this restriction into account when using these measurements. In some examples, selection of which timeslots to report by the mobile station when all per slot measurements cannot be included could be left to be implementation dependent, or could be enforced by specification. Examples of the latter include, but are not limited to, specifying that the timeslots for which the highest number of blocks have been received are to be selected for reporting, specifying the lowest or highest numbered timeslots to be reported, specifying that the timeslots to be reported are to be alternated such that all timeslots would be covered in two consecutive messages, etc.

In some examples, one or more of the approaches for implementing Technique #2 can be combined. For example, combining Approach #1 and Approach #5 for implementing Technique #2 can enable reporting either 6 per slot mean BEP values and 1 overall BEP value (via Approach #1), or up to 6 interference measurements and 2 overall BEP values for the secondary carrier (via Approach #1), with Approach #5 covering the case where more than 6 per slot values cannot be included. As another example, combining Approach #1 and Approach #2 for implementing Technique #2 can enable reporting either 8 per slot mean BEP values and no overall BEP (via Approach #1) or up to 8 interference measurements and 1 overall BEP (via Approach #2) for the secondary carrier. In this latter example, Approach #5 is not needed.

In some examples, the application of a particular approach for implementing Technique #2 could be restricted to cases where a set of candidate link quality measurements would not fit in the message used for the report. This can occur, for example, (i) when more than 4 or 6 per timeslot measurement values are to be reported on the secondary carrier (EGPRS); (ii) when more than 9 per slot mean BEP values or more than 13 interference measurements are to be reported (EGPRS2); (iii) for Approaches #1 and #4, when two different modulations have been used during the reporting period, which could occur either during transition periods between different modulations, or if the link quality was significantly different between different timeslots of the same carrier; etc.

With the foregoing description of Technique #2 in mind, the process 1100 of FIG. 11 begins execution at block 1105 at which the reporting prioritizer 515 determines which per slot link quality measurements have been requested by the network. At block 1110, the reporting prioritizer 515 determines whether all requested per slot measurements will fit in the reporting message (e.g., the packet downlink ack/nack messages 300 or 400). If all requested per slot measurements will fit in the reporting message, then at block 1115 the reporting prioritizer 515 includes all of the requested per slot measurements and the overall BEP measurements specified by the GSM specification in the packet downlink ack/nack messages 300 or 400 for reporting to the network. However, if all requested per slot measurements will not fit in the reporting message, then at block 1120 the reporting prioritizer 515 reports a subset of the requested per slot measurements and specified overall BEP measurements in accordance with one or more of the Approaches #1-#5 for implementing Technique #2.

Figure 12:
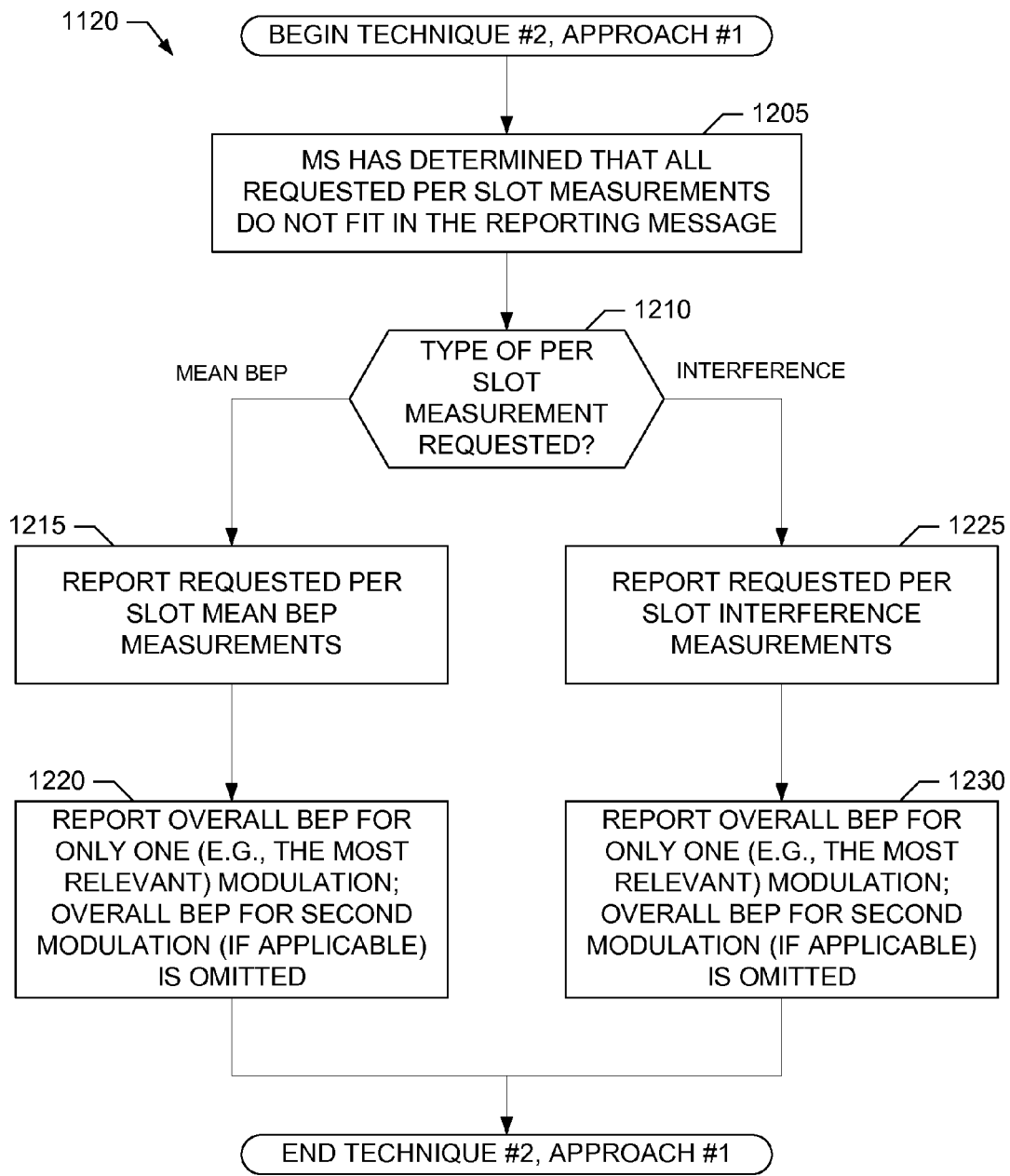
FIG. 12 is a flowchart representative of an example process to implement a first example approach for measurement prioritization that may be used to implement the process of FIG. 11.

A first example process 1120 that may be used to implement the processing at block 1120 of FIG. 11 is illustrated in FIG. 12. The example process 1120 of FIG. 12 implements Approach #1 for Technique #2 and, thus, at block 1205 the reporting prioritizer 515 has determined that all requested per slot measurements do not fit in the reporting message. At block 1210, the reporting prioritizer 515 determines the type of per slot measurements that have been requested. If per slot mean BEP measurements have been requested, processing proceeds to blocks 1215 and 1220. Otherwise per slot interference measurements have been requested, and processing proceeds to blocks 1225 and 1230.

At block 1215, the reporting prioritizer 515 reports the requested per slot mean BEP measurements (e.g., up to 6 timeslots on the secondary carrier for EGPRS, or up to 11 timeslots in total over both of the dual carriers for EGPRS2). At block 1220, the reporting prioritizer 515 reports the overall BEP measurement for only one (e.g., the most relevant) modulation scheme, whereas the overall BEP for the other candidate modulation scheme is omitted. At block 1225, the reporting prioritizer 515 reports the requested per slot interference measurements (e.g., up to 8 timeslots on the secondary carrier for EGPRS, or up to 16 timeslots in total over both of the dual carriers for EGPRS). At block 1230, the reporting prioritizer 515 reports the overall BEP measurement for only one (e.g., the most relevant) modulation scheme, whereas the overall BEP for the other candidate modulation scheme is omitted.

Figure 13:
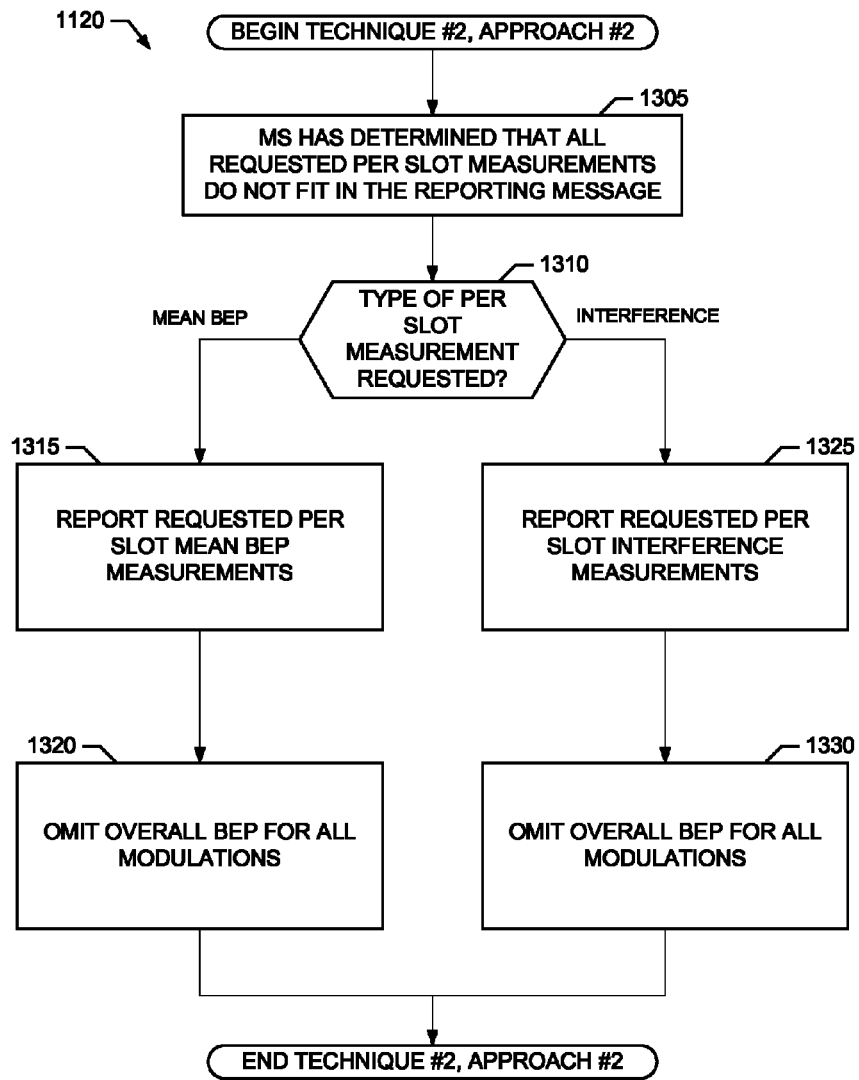
FIG. 13 is a flowchart representative of an example process to implement a second example approach for measurement prioritization that may be used to implement the process of FIG. 11.

A second example process 1120 that may be used to implement the processing at block 1120 of FIG. 11 is illustrated in FIG. 13. The example process 1120 of FIG. 13 implements Approach #2 for Technique #2 and, thus, at block 1305 the reporting prioritizer 515 has determined that all requested per slot measurements do not fit in the reporting message. At block 1310, the reporting prioritizer 515 determines the type of per slot measurements that have been requested. If per slot mean BEP measurements have been requested, processing proceeds to blocks 1315 and 1320. Otherwise per slot interference measurements have been requested, and processing proceeds to blocks 1325 and 1330.

At block 1315, the reporting prioritizer 515 reports the requested per slot mean BEP measurements (e.g., up to 8 timeslots on the secondary carrier for EGPRS, or up to 14 timeslots in total over both of the dual carriers for EGPRS). At block 1320, the reporting prioritizer 515 omits the overall BEP measurements for all (e.g., both) modulation schemes. At block 1325, the reporting prioritizer 515 reports the requested per slot interference measurements (e.g., up to 8 timeslots on the secondary carrier for EGPRS, or up to 16 timeslots in total over both of the dual carriers for EGPRS). At block 1330, the reporting prioritizer 515 omits the overall BEP measurements for all (e.g., both) modulation schemes.

Figure 14:
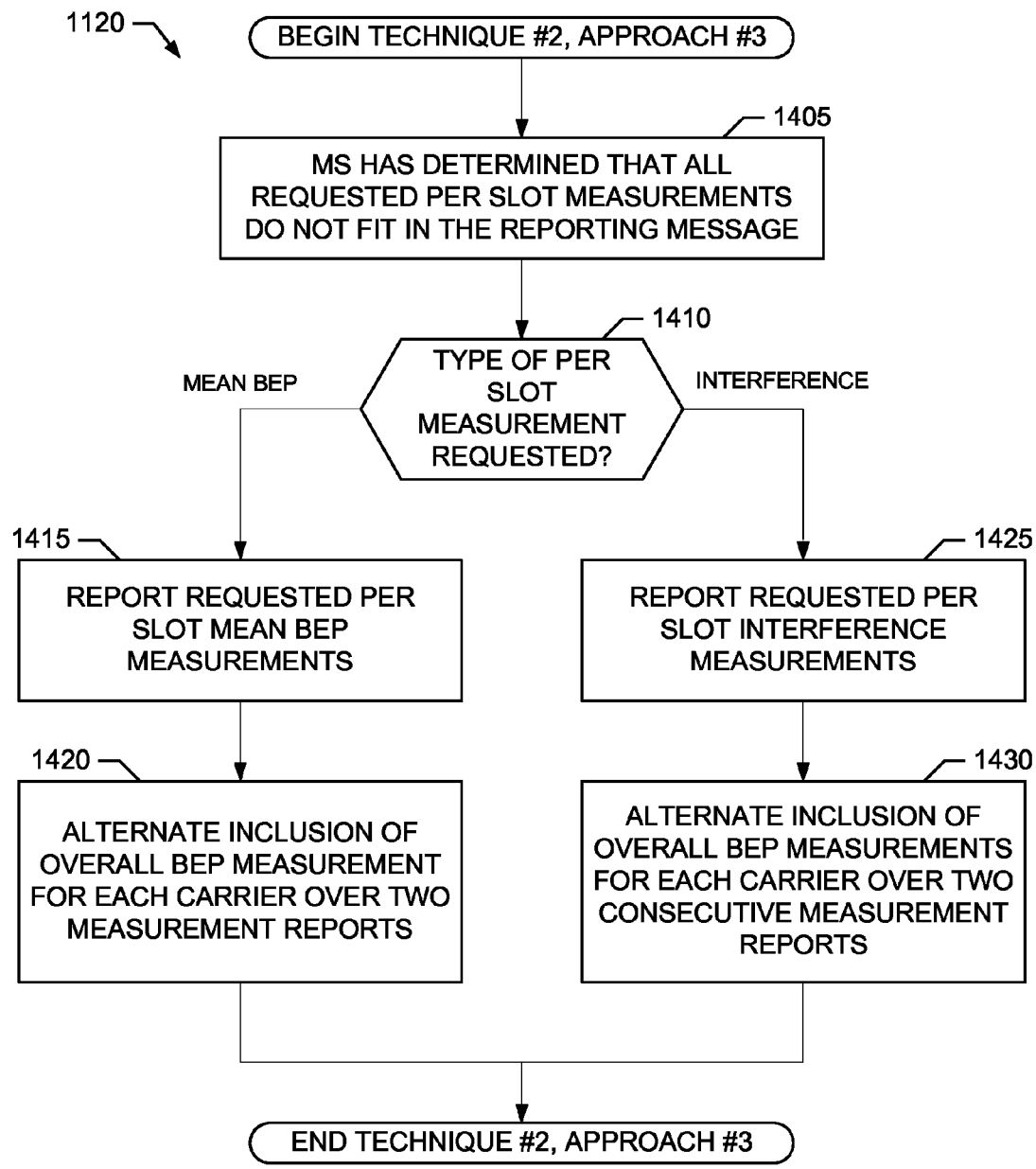
FIG. 14 is a flowchart representative of an example process to implement a third example approach for measurement prioritization that may be used to implement the process of FIG. 11.

A third example process 1120 that may be used to implement the processing at block 1120 of FIG. 11 is illustrated in FIG. 14. The example process 1120 of FIG. 14 implements Approach #3 for Technique #2 and, thus, at block 1405 the reporting prioritizer 515 has determined that all requested per slot measurements do not fit in the reporting message. At block 1410, the reporting prioritizer 515 determines the type of per slot measurements that have been requested. If per slot mean BEP measurements have been requested, processing proceeds to blocks 1415 and 1420. Otherwise per slot interference measurements have been requested, at processing proceeds to blocks 1425 and 1430.

At block 1415, the reporting prioritizer 515 reports the requested per slot mean BEP measurements. At block 1420, the reporting prioritizer 515 alternates inclusion of the overall BEP measurements for each carrier over two consecutive reports provided by two consecutive packet downlink ack/nack messages, where each packet downlink ack/nack message includes the overall BEP measurements for just one of the carriers. At block 1425, the reporting prioritizer 515 reports the requested per slot interference measurements. At block 1430, the reporting prioritizer 515 alternates inclusion of the overall BEP measurements for each carrier over two consecutive reports provided by two consecutive packed downlink ack/nack messages, where each packet downlink ack/nack message includes the overall BEP measurements for just one of the carriers.

Figure 15:
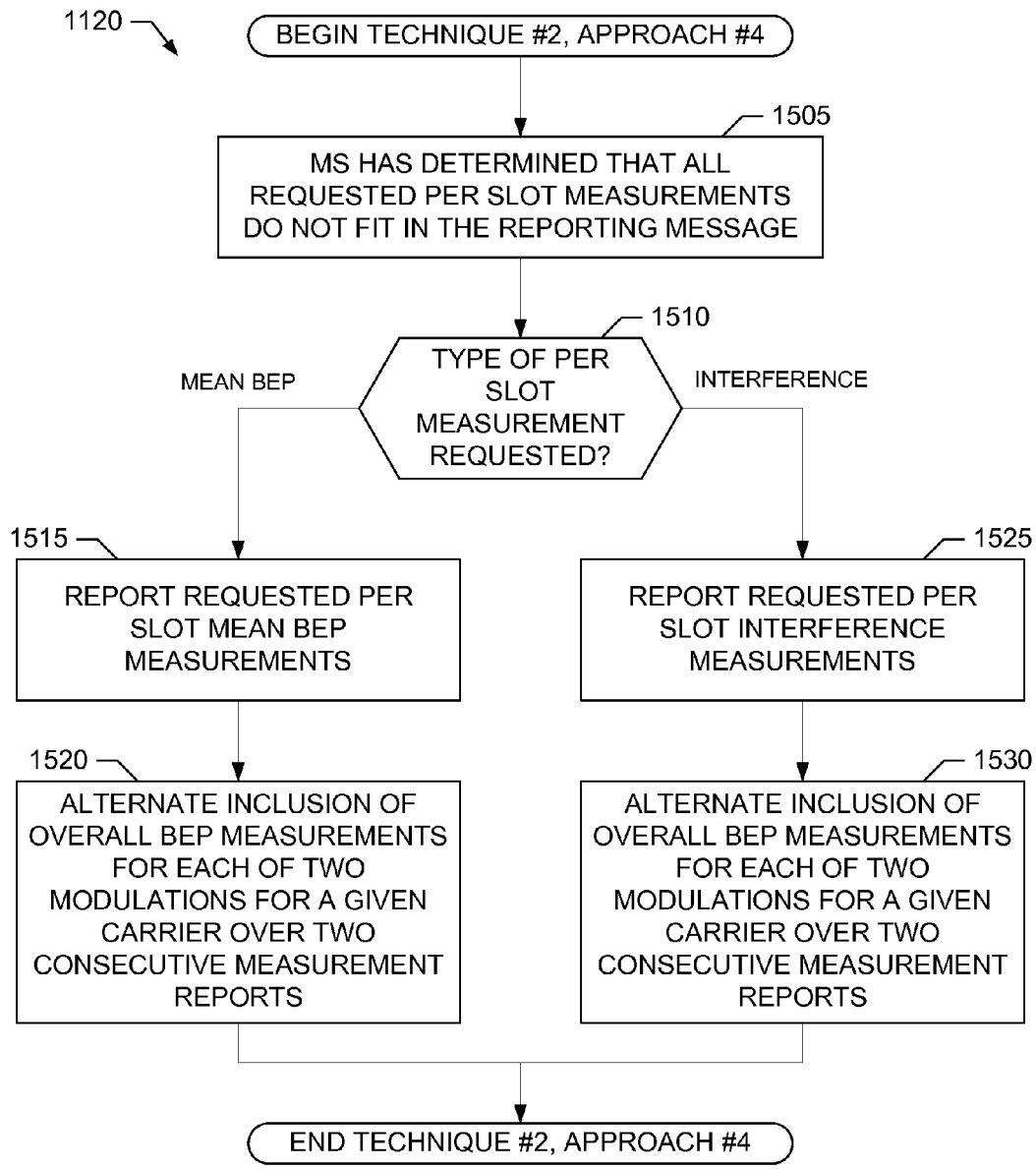
FIG. 15 is a flowchart representative of an example process to implement a fourth example approach for measurement prioritization that may be used to implement the process of FIG. 11.

A fourth example process 1120 that may be used to implement the processing at block 1120 of FIG. 11 is illustrated in FIG. 15. The example process 1120 of FIG. 15 implements Approach #4 for Technique #2 and, thus, at block 1505 the reporting prioritizer 515 has determined that all requested per slot measurements do not fit in the reporting message. At block 1510, the reporting prioritizer 515 determines the type of per slot measurements that have been requested. If per slot mean BEP measurements have been requested, processing proceeds to blocks 1515 and 1520. Otherwise per slot interference measurements have been requested, and processing proceeds to blocks 1525 and 1530.

Figure 16:
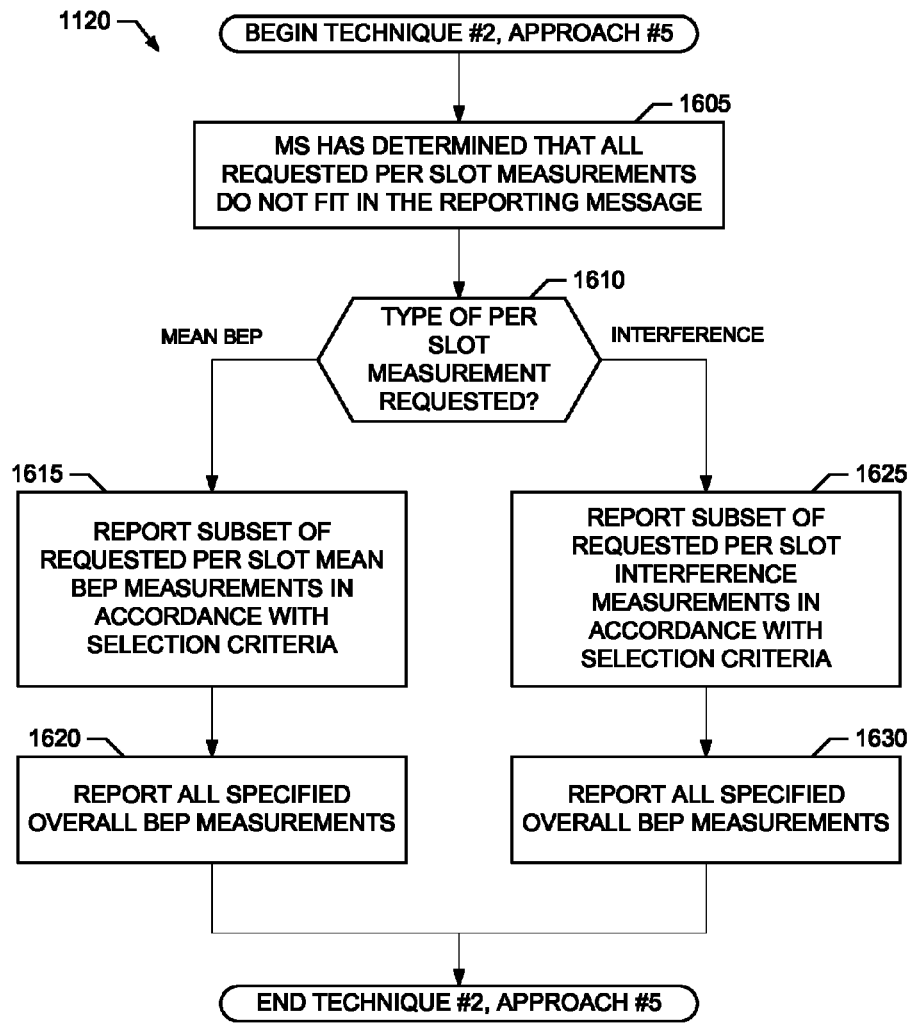
FIG. 16 is a flowchart representative of an example process to implement a fifth example approach for measurement prioritization that may be used to implement the process of FIG. 11.

At block 1515, the reporting prioritizer 515 reports the requested per slot mean BEP measurements. At block 1520, the reporting prioritizer 515 alternates inclusion of the overall BEP measurements for each of two candidates modulations on a particular carrier over two consecutive reports provided by two consecutive packet downlink ack/nack messages, where each packet downlink ack/nack message includes just overall BEP for a single candidate modulation for each of the carriers. At block 1525, the reporting prioritizer 515 reports the requested per slot interference measurements. At block 1430, the reporting prioritizer 515 alternates inclusion of the overall BEP measurements for each of two modulations on a particular carrier over two consecutive reports provided by two consecutive packet downlink ack/nack messages, where each packet downlink ack/nack message includes just one overall BEP for a single candidate modulation for each of the carriers A fifth example process 1120 that may be used to implement the processing at block 1120 of FIG. 11 is illustrated in FIG. 16. The example process 1120 of FIG. 16 implements Approach #5 for Technique #2 and, thus, at block 1605 the reporting prioritizer 515 has determined that all requested per slot measurements do not fit in the reporting message. At block 1610, the reporting prioritizer 515 determines the type of per slot measurements that have been requested. If per slot mean BEP measurements have been requested, processing proceeds to blocks 1615 and 1620. Otherwise per slot interference measurements have been requested, and processing proceeds to blocks 1625 and 1630.

At block 1615, the reporting prioritizer 515 reports a subset of the requested per slot mean BEP measurements per a selection criteria (as described above). At block 1620, the reporting prioritizer 515 reports all overall BEP measurements for both carriers of the dual carrier configuration as per the GSM specifications. At block 1625, the reporting prioritizer 515 reports a subset of the requested per slot interference measurements per a selection criteria (as described above). At block 1630, the reporting prioritizer 515 reports all overall BEP measurements for both carriers of the dual carrier configuration as per the GSM specifications.

In some examples, the measurement processor 620 receives link quality measurements reported in accordance with the prioritization employed by the example processes 1100 and/or 1120 described above.

Figure 17:
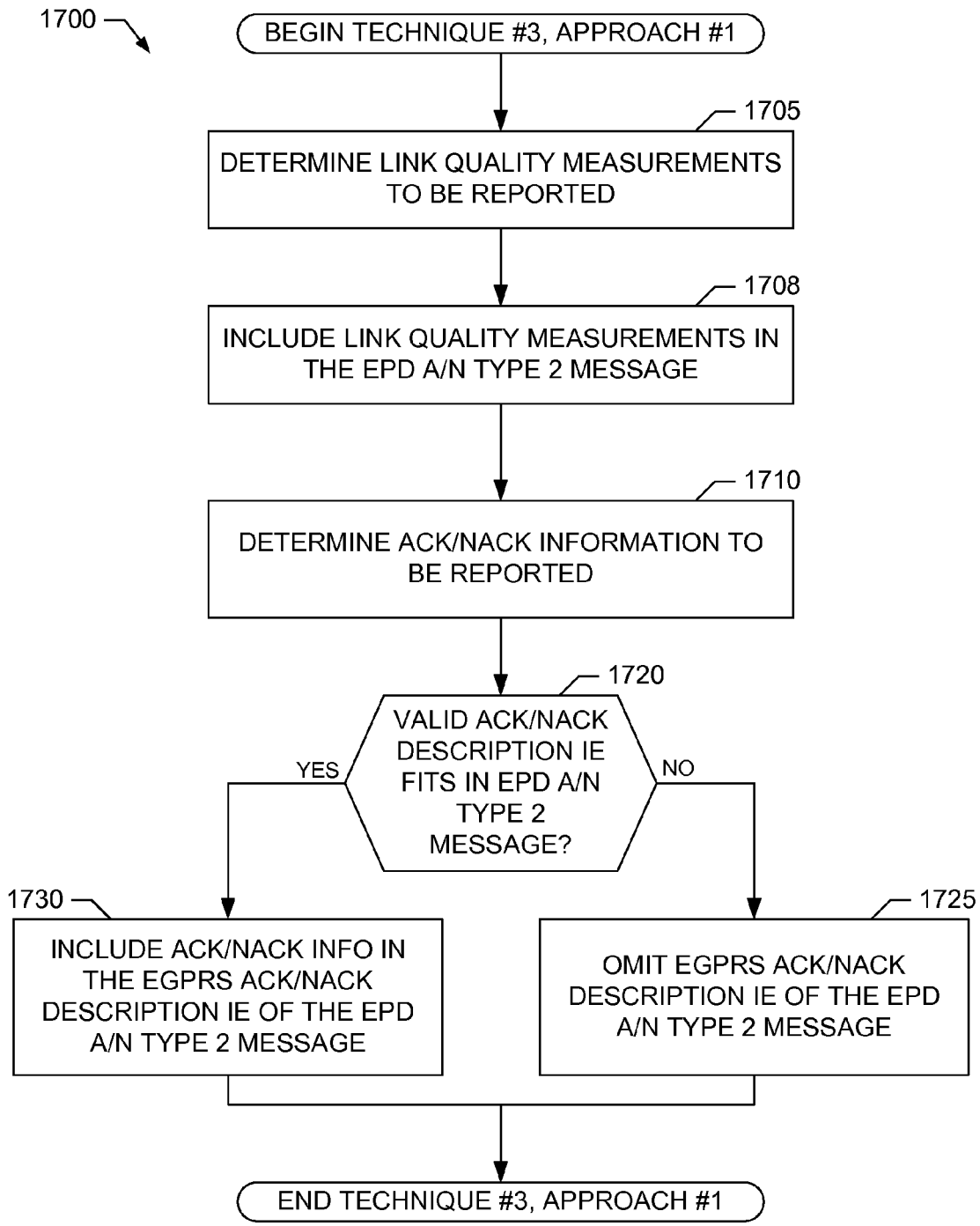
FIG. 17 is a flowchart representative of an example process to implement a first example approach of a third example technique, which involves modifying contents of an uplink message, that may be used to perform link quality measurement reporting for downlink dual carrier operation.

An example process 1700 that may be executed to implement example Technique #3 for link quality measurement reporting disclosed herein is illustrated in FIG. 17. Some or all of the example process 1700 can be performed by the type 2 message encoder 520 and/or the type 2 message decoder 615. As mentioned above, Technique #3 involves enhancing the EGPRS PACKET DOWNLINK ACK/NACK TYPE 2 message 400. As observed in Table 12 and the associated description, there is an overhead (of at least 16 bits) for encoding the EGPRS Ack/Nack Description IE 410, which cannot be omitted according to the current GSM specifications even if no ack/nack information is to be reported. A first example approach for implementing Technique #3 (referred to as Approach #1 for Technique #3) omits or truncates the EGPRS Ack/Nack Description IE 410 when appropriate to allow the inclusion of additional measurement information. The maximum number of per slot measurements for dual carrier reporting that can be supported by an EGPRS PACKET DOWNLINK ACK/NACK TYPE 2 message 400 when not including the EGPRS Ack/Nack Description IE 410 per Approach #1 for Technique #3 is illustrated in Table 16. Table 16 illustrates that under Approach #1 for Technique #3, up to 11 per slot BEP reports could be included in the enhanced EGPRS PACKET DOWNLINK ACK/NACK TYPE 2 message 400 (e.g., restrictions on the number of link quality measurements capable of being reported would now only remain for multislot classes 40-45) and up to 16 interference measurements enhanced EGPRS PACKET DOWNLINK ACK/NACK TYPE 2 message 400 (thereby lifting the restrictions for any existing multislot classes). The values listed in Table 16 are exemplary and may change under different assumptions and/or depending upon the ways in which the values are estimated.

TABLE 16

|  | 4 overall BEP reported | 3 overall BEP reported | 2 overall BEP reported | 1 overall BEP reported | No overall BEP reported |
|---|---|---|---|---|---|
| Only per slot mean BEP reports | 11 | 13 | 14 | 15 | 16 |
| Only per slot interference meas. reports | 16 | 16 | 16 | 16 | 16 |

Additionally or alternatively, as observed in Table 10 and Table 11 and the associated description, a number of fields were included in the EPD A/N Extension Info Type 2 IE 425 while the EGPRS PACKET DOWNLINK ACK/NACK TYPE 2 message 400 was being defined in Release 7 of the GSM specifications. However, the EPD A/N Extension Info Type 2 IE 425 need not have been used in this release, because the associated fields could have been included in the main body part of the EGPRS PACKET DOWNLINK ACK/NACK TYPE 2 message 400. The use of the EPD A/N Extension Info Type 2 IE 425 consumes a number of overhead bits (e.g., the 8 bits of the EPD A/N Extension Type 2 length field 430) that, otherwise, could have been saved until a later release when the use of the extension would have been required. This overhead is pre-empting space that could be used for both measurements reporting and ack/nack reporting. Accordingly, a second example approach for implementing Technique #3 (referred to as Approach #2 for Technique #3) moves the current contents of the EPD A/N Extension Info Type 2 IE 425 (which are listed in Table 10 and Table 11) to the main body portion of the EGPRS PACKET DOWNLINK ACK/NACK TYPE 2 message 400, and includes an single bit extension field indicator to indicate whether an extension field is included in the message (e.g., to support future extensions of the message).

The gains in terms of additional measurement information that can be included in the EGPRS PACKET DOWNLINK ACK/NACK TYPE 2 message 400 when enhanced by combining Approach #1 and Approach #2 to implement Technique #3 are shown in Table 17. In particular, the maximum number of per slot measurements for dual carrier reporting that can be supported by an EGPRS PACKET DOWNLINK ACK/NACK TYPE 2 message 400 when not including the EGPRS Ack/Nack Description IE 410 per Approach #1 and not including the EPD A/N Extension Info Type 2 IE 425 per Approach #2 for Technique #3 is illustrated in Table 17. The values listed in Table 17 are exemplary and may change under different assumptions and/or depending upon the ways in which the values are estimated.

TABLE 17

|  | 4 overall BEP reported | 3 overall BEP reported | 2 overall BEP reported | 1 overall BEP reported | No overall BEP reported |
|---|---|---|---|---|---|
| Only per slot mean BEP reports | 13 | 14 | 15 | 16 | 16 |
| Only per slot interference meas. reports | 16 | 16 | 16 | 16 | 16 |

A third approach for implementing Technique #3 (referred to as Approach #3 for Technique #3) is to implement Approach #1 and/or Approach #2 by specifying a new message type, such as an EGPRS PACKET DOWNLINK ACK/NACK TYPE 3 message. In some examples of Approach #3 the EGPRS PACKET DOWNLINK ACK/NACK TYPE 2 message 400 would still be applicable to situations in which the current GSM specification requirements are sufficient (e.g., when fewer than 9 per slot BEP values have to be reported as shown in Table 12), whereas the new message would be used otherwise.

In some examples, whereas Approaches #1 and #2 for Technique #3 described above could be used to modify Release 7 GSM specifications, thereby becoming mandatory for mobile stations and networks supporting EGPRS2 (which is a Release 7 feature), Approach #3 could be introduced in a later release. Also, in some examples, if one or more of Approaches #1-#3 are introduced in a way that the possibility exists for networks to implement either the existing EGPRS PACKET DOWNLINK ACK/NACK TYPE 2 message 400 or a modified EGPRS PACKET DOWNLINK ACK/NACK TYPE 2 message 400 enhanced in accordance with one or more of Approaches #1-#3, then the network would signal the support of the new message (or enhanced message format) to the mobile station.

An example way to implement a combination of both Approaches #1 & #2 for Technique #3 is to modify Table 11.2.6e.1 of 3GPP TS 44.060, version 7.22.0, to specify the contents of the EGPRS PACKET DOWNLINK ACK/NACK TYPE 2 message 400 as listed in Table 18.

TABLE 18

< EGPRS Packet Downlink Ack/Nack Type 2 message content > ::=
    < DOWNLINK_TFI : bit (5) >
    < MS OUT OF MEMORY : bit(1)>

TABLE 18-continued

```
    { 0 | 1 < EGPRS Channel Quality Report Type 2 : < EGPRS Channel Quality Report Type 2
IE > >}
    { 0 | 1 < Channel Request Description : < Channel Request Description IE > >}
    { 0 | 1 < PFI : bit(7) > }
    { 0 | 1 < Extended Channel Request Description : < Extended Channel Request Description
IE > > }
    < EARLY_TBF_ESTABLISHMENT : bit (1) >
    { 0 | 1 < Secondary Dual Carrier Channel Report : < EGPRS Channel Quality Report Type 2
IE > }
    { 0 | 1 < Extension Bits : Extension Bits IE > }           -- sub-clause 12.26
    { < EGPRS Ack/Nack Description : < EGPRS Ack/Nack Description IE >> } //
        -- Truncation is effective when the available space in the message
        -- Does not allow the inclusion of the structure, i.e. is less than 16 bits.
    <padding bits > } ;
```

With the foregoing description of Technique #3 in mind, the process 1700 of FIG. 17 implements Approach #1 for Technique #3 and begins execution at block 1705 at which the type 2 message encoder 520 determines which link quality measurements are to be reported. At block 1708, the type 2 message encoder 520 includes the link quality measurements in the EGPRS PACKET DOWNLINK ACK/NACK TYPE 2 message 400. At block 1710, the type 2 message encoder 520 determines the ack/nack information to be reported. At block 1720 the type 2 message encoder 520 determines whether a valid form of the EGPRS Ack/Nack Description IE 410 can fit into the EGPRS PACKET DOWNLINK ACK/NACK TYPE 2 message 400 when the link quality measurements determined at block 1705 are included (e.g., to prioritize measurement reporting over ack/nack reporting). If no valid form of the EGPRS Ack/Nack Description IE 410 does fit into the message, at block 1725 the type 2 message encoder 520 omits or truncates the EGPRS Ack/Nack Description IE 410 of EGPRS PACKET DOWNLINK ACK/NACK TYPE 2 message 400. However, if a valid form of the EGPRS Ack/Nack Description IE 410 can fit in the message, at block 1730 the type 2 message encoder 520 includes the EGPRS Ack/Nack Description IE 410 in the EGPRS PACKET DOWNLINK ACK/NACK TYPE 2 message 400.

Figure 18:
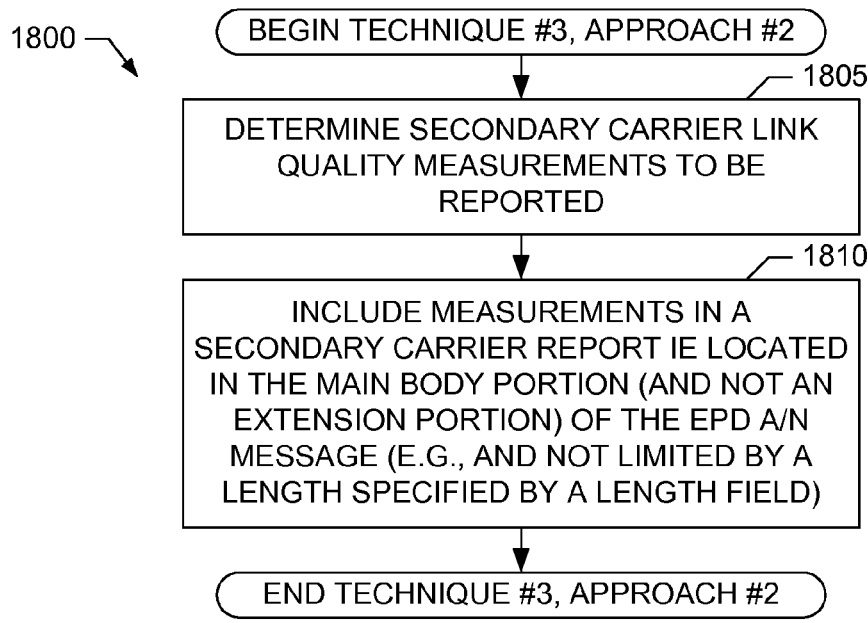
FIG. 18 is a flowchart representative of an example process to implement a second example approach of a third example technique, which involves modifying contents of an uplink message, that may be used to perform link quality measurement reporting for downlink dual carrier operation.

An example process 1800 that can be executed to perform Approach #2 for Technique #3 is illustrated in FIG. 18. The process 1800 begins at block 1805 at which the type 2 message encoder 520 determines which link quality measurements are to be reported for the secondary carrier of a dual carrier configuration. At block 1810, the type 2 message encoder 520 includes the link quality measurements for the secondary carrier in a Secondary Dual Carrier Channel Report IE 420 now located in the main body portion of the EGPRS PACKET DOWNLINK ACK/NACK TYPE 2 message 400 (instead of in the EPD A/N Extension Info Type 2 IE 425). As such, the Secondary Dual Carrier Channel Report IE 420 is not limited to the length of the EPD A/N Extension Info Type 2 IE, but is instead limited by the overall size of the EGPRS PACKET DOWNLINK ACK/NACK TYPE 2 message 400, and, in addition, the message overhead is reduced by not including the EPD A/N Extension Info Type 2 IE 425.

In some examples, the type 2 message decoder 615 decodes the EGPRS PACKET DOWNLINK ACK/NACK TYPE 2 message 400 as enhanced in accordance with the encoding employed by the example processes 1700 and/or 1800 described above.

Figure 19:
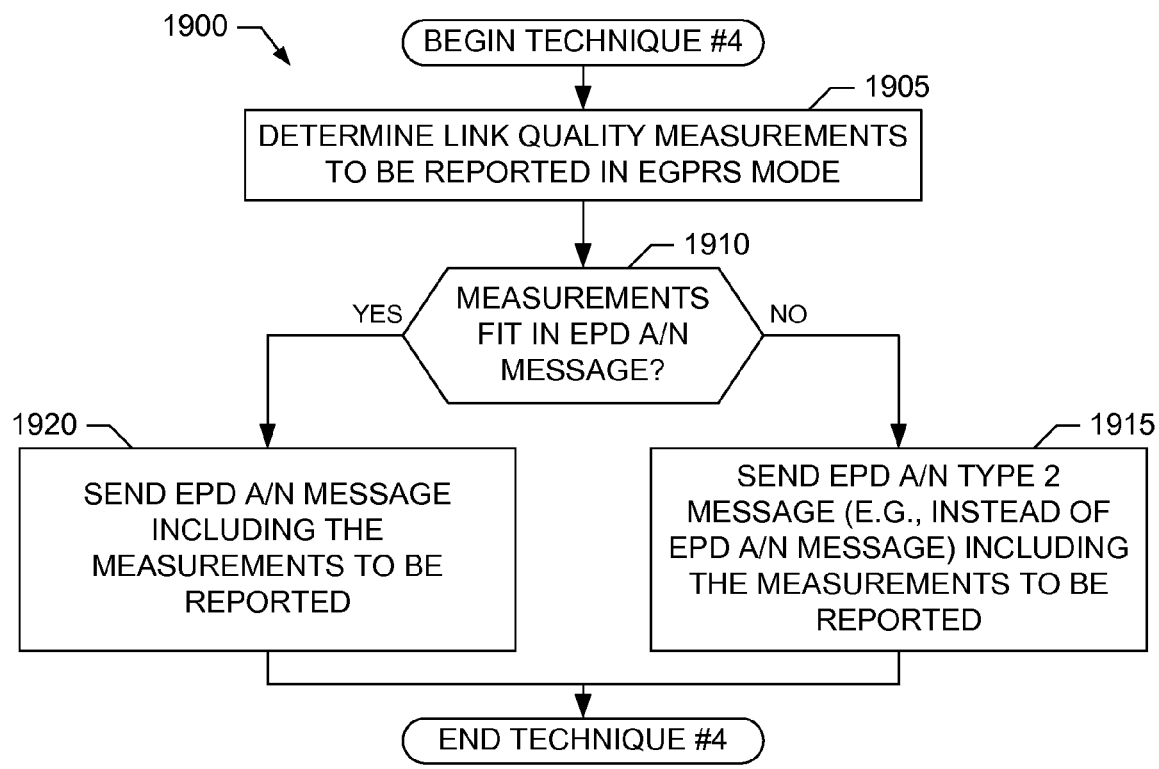
FIG. 19 is a flowchart representative of an example process to implement a fourth example technique, which involves selecting between different uplink messages, that may be used to perform link quality measurement reporting for downlink dual carrier operation.

An example process 1900 that may be executed to implement example Technique #4 for link quality measurement reporting disclosed herein is illustrated in FIG. 19. Some or all of the example process 1900 can be performed by the type 2 message selector 525 and/or the measurement processor 620. As mentioned above, Technique #4 involves allowing the usage of the EGPRS PACKET DOWNLINK ACK/NACK TYPE 2 message 400 for downlink EGPRS TBFs not using EGPRS2, such as when the requested measurement information cannot fit into the EGPRS PACKET DOWNLINK ACK/NACK message 300. As observed in Table 12 and the associated description, the EGPRS PACKET DOWNLINK ACK/NACK TYPE 2 message 400 can include, for example, up to 9 per slot mean BEP measurements in total over both carriers of a dual carrier configuration when both GMSK and 8PSK overall BEP measurements are reported for each carrier, without additional measurement restrictions related to the secondary carrier. Using the EGPRS PACKET DOWNLINK ACK/NACK TYPE 2 message 400 for EGPRS TBFs not using EGPRS2 could resolve some situations where more than 4 per slot mean BEP measurements are to be reported on the secondary carrier, which an existing EGPRS PACKET DOWNLINK ACK/NACK message 300 does not support (see Table 6 above).

In some examples, Technique #4 can be combined with Approach #1 for Technique #2 described above, in which overall BEP reports are omitted to permit reporting of more per slot mean BEP values or more per slot interference values. For example, up to 8 per slot interference values could be reported for the secondary carrier using the EGPRS PACKET DOWNLINK ACK/NACK TYPE 2 message 400 as compared to 6 per slot interference measurements with the (unmodified) EGPRS PACKET DOWNLINK ACK/NACK message 300. Additionally or alternatively, in some examples Technique #4 can be combined with one or more of the approaches described above for implementing Technique #3 to enable reporting of more per slot measurements (e.g. up to 11 or up to 13 per slot mean BEP values) for the same conditions.

With the foregoing description of Technique #4 in mind, the process 1900 of FIG. 19 begins execution at block 1905 at which the type 2 message selector 525 determines which link quality measurements are to be reported for one or more EGPRS TBFs not using EGPRS2. At block 1910, the type 2 message selector 525 determines whether the measurements will fit in the EGPRS PACKET DOWNLINK ACK/NACK message 300. If the measurements do not fit in the EGPRS PACKET DOWNLINK ACK/NACK message 300, at block 1915 the type 2 message selector 525 includes the link quality measurements for the one or more EGPRS TBFs not using EGPRS2 in an EGPRS PACKET DOWNLINK ACK/NACK TYPE 2 message 400 (instead of an EGPRS PACKET DOWNLINK ACK/NACK message 300). However, if the measurements do fit in the EGPRS PACKET DOWNLINK ACK/NACK message 300, at block 1920 the type 2 message selector 525 includes the link quality measurements for the one or more EGPRS TBFs not using EGPRS2 in an EGPRS PACKET DOWNLINK ACK/NACK message 300.

In some examples, the measurement processor 620 receives link quality measurements for one or more EGPRS TBFs not using EGPRS2, where the link quality measurements are included in EGPRS PACKET DOWNLINK ACK/NACK messages 300 and/or EGPRS PACKET DOWNLINK ACK/NACK TYPE 2 messages 400 in accordance with the example process 1900 described above.

Figure 20:
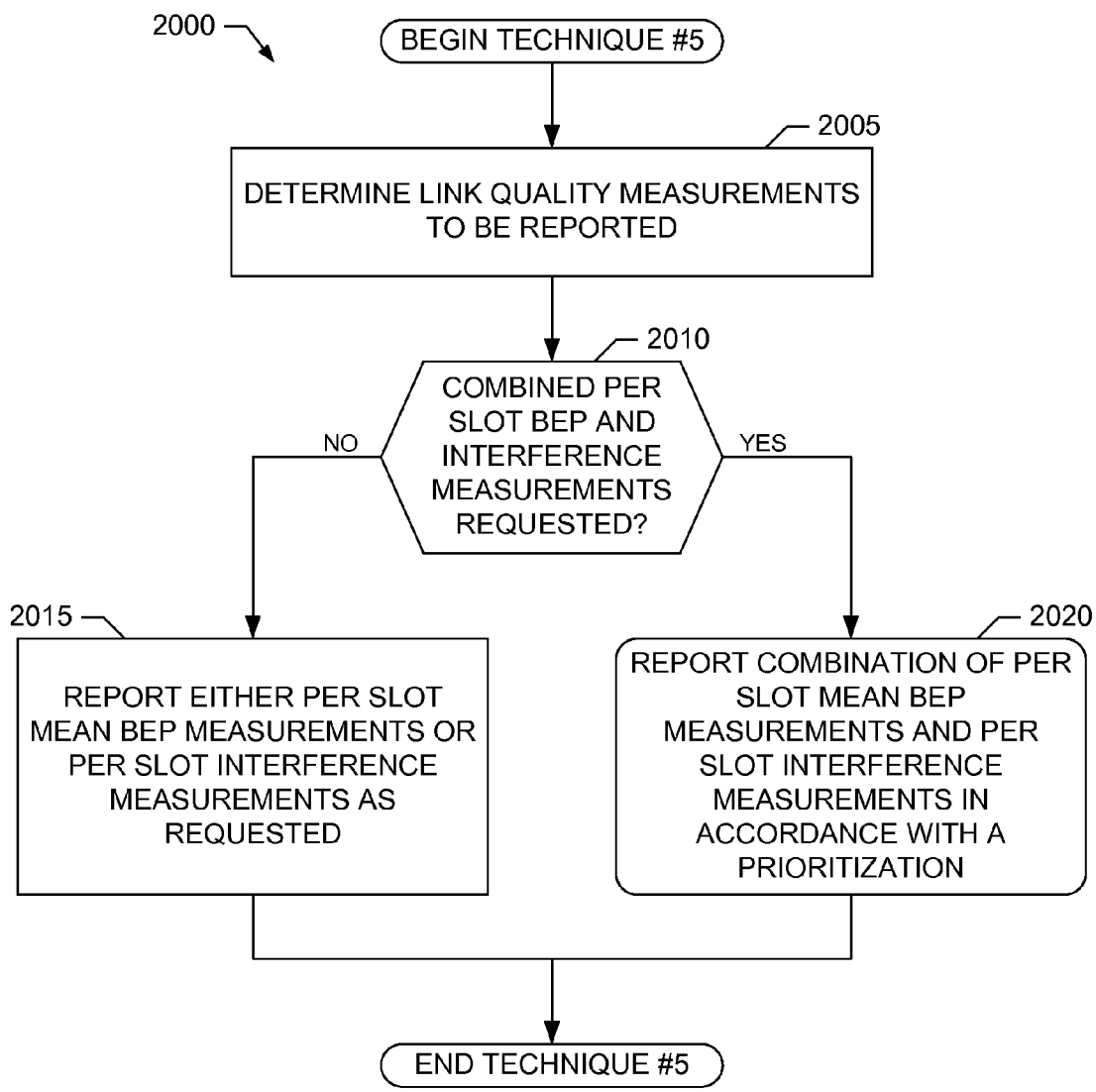
FIG. 20 is a flowchart representative of an example process to implement a fifth example technique, which involves prioritizing a combination of measurements to be reported for both carriers supporting dual carrier operation, that may be used to perform link quality measurement reporting for downlink dual carrier operation.

An example process 2000 that may be executed to implement example Technique #5 for link quality measurement reporting disclosed herein is illustrated in FIG. 20. Some or all of the example process 2000 can be performed by the combined measurement reporting prioritizer 530 and/or the measurement processor 620. As mentioned above, Technique #5 involves implementing a prioritization scheme for combined link quality measurement reporting when the requested measurement information cannot fit into the EGPRS PACKET DOWNLINK ACK/NACK message 300 or EGPRS PACKET DOWNLINK ACK/NACK TYPE 2 message 400 used for message reporting. Several example approaches for implementing Technique #5 are described in greater detail below. The basis of two of the approaches is to consider the interference measurements as having a lower priority than per slot mean BEP measurements, and either transmit the interference measurements not fitting in the reporting message in one or more subsequent instances of the packet downlink ack/nack message 300 or 400 (referred to as Approach #1 for Technique #5), or omitting reporting of any interference measurements (referred to as Approach #2 for Technique #5). Other example approaches are for the mobile station to alternate in consecutive reporting messages either between per slot mean BEP measurements and interference measurements reporting (referred to as Approach #3 for Technique #5), or between per slot link quality measurements for the primary and secondary carriers of a dual carrier configuration (referred to as Approach #4 for Technique #5).

Under Approach #1 for implementing Technique #5, per slot mean BEP measurements are to have priority for inclusion in the packet downlink ack/nack message 300 or 400 used for measurement reporting. If not all the required interference measurements (e.g., up to four per carrier) can fit in the message after all the requested per slot mean BEP values for both carriers have been included, the mobile station is to omit those interference measurements that do not fit in the particular instance of the packet downlink ack/nack message 300 or 400. In some examples, the selection of the timeslots for which interference measurements are included in each message instance of the packet downlink ack/nack message 300 or 400 is implementation dependent. In some examples, interference measurements for each timeslot on each carrier (unless not available) are included in packet downlink ack/nack messages 300 or 400 at least once every M consecutive reports, with M being, for example, the minimum number of message instances needed for reporting at least one measurement for all the relevant timeslots on the considered carrier. In some examples, if, for a particular carrier, no interference measurements can fit in the message instance after all the requested per slot mean BEP values for both carriers in a dual carrier configuration have been included, the mobile station shall report only per slot mean BEP values and omit per slot interference measurements for the particular carrier.

Another example way to implement Approach #1 for Technique #2 is to modify Table 11.2.7.2 of 3GPP TS 44.060, version 7.22.0, to specify the meaning of the LINK_QUALITY_MEASUREMENT_MODE field as listed in Table 19.

TABLE 19

LINK_QUALITY_MEASUREMENT_MODE (2 bit field)
This field determines the measurements to be included within the EGPRS Timeslot Link Quality Measurements IE or EGPRS Timeslot Link Quality Measurements Type 2 IE. In case the assignment results in a dual carrier configuration, the value of the LINK_QUALITY_MEASUREMENT_MODE field shall apply to both carriers.

| bit | | |
|---|---|---|
| 2 | 1 | |
| 0 | 0 | The mobile station shall not report either interference measurements ($\gamma$ values) or per slot BEP measurements. |
| 0 | 1 | The mobile station shall report available interference measurements ($\gamma$ values) for timeslots 0 through 7. The $\gamma$ value is defined in 3GPP TS 45.008. No per slot mean BEP measurements shall be reported. |
| 1 | 0 | The mobile station shall report the mean BEP on each assigned time slot. In case of EGPRS, the mobile station shall report the mean BEP measurement corresponding to the modulation for which it has received a larger number of blocks since the previous report. In case of EGPRS2, the mobile station shall report both MEAN_BEP_TNx and REPORTED_MODULATION (see the section 12.5a.3). The mobile station shall make BEP measurements only on Radio Blocks intended for it. No interference measurements ($\gamma$ values) shall be reported. |
| 1 | 1 | The mobile station shall report the mean BEP on each assigned time slot. In case of EGPRS, the mobile station shall report the mean BEP measurement corresponding to the modulation for which it has received a larger number of blocks since the previous report. In case of EGPRS2, the mobile station shall report both MEAN_BEP_TNx and REPORTED_MODULATION (see the section 12.5a.3). The mobile station shall make BEP measurements only on radio blocks intended to it. In addition to mean BEP, the mobile station shall report interference measurements ($\gamma$ values) for no more than four time slots for a given carrier within a single message instance. If the MS has interference measurements for more than four timeslots to report for a given carrier, the selection of timeslots for which interference measurements are included in each message instance is implementation specific, subject to the requirement that a measurement for each time slot on each carrier, unless not available (see 3GPP TS 45.008), is included in at least every other report.<br>In a dual carrier configuration, if not all the required interference measurements can fit within a single message instance after all the required per slot mean BEP values for both carriers have been included, the mobile station shall omit these interference measurements that do not fit in the message instance. The selection of timeslots for which interference measurements are included in each message instance is implementation specific, subject to the requirement that |

TABLE 19-continued

LINK_QUALITY_MEASUREMENT_MODE (2 bit field)
This field determines the measurements to be included within the EGPRS Timeslot Link
Quality Measurements IE or EGPRS Timeslot Link Quality Measurements Type 2 IE. In
case the assignment results in a dual carrier configuration, the value of the
LINK_QUALITY_MEASUREMENT_MODE field shall apply to both carriers.

| bit | |
|---|---|
| 2 | 1 | measurements for each timeslot on each carrier, unless not available (see 3GPP TS 45.008), are included at least once every M consecutive reports, M being the minimum number of message instances needed for reporting at least one measurement for all the relevant timeslots on the considered carrier. If, for a given carrier, no interference measurement can fit in the message instance after all the required per slot mean BEP values for both carriers have been included, the mobile station shall only report per slot mean BEP values and omit interference measurements for the considered carrier.

Under Approach #2 for implementing Technique #5, per slot mean BEP measurements have priority for inclusion in the packet downlink ack/nack message 300 or 400 used for measurement reporting. If not all the requested interference measurements for a given carrier (in general, up to four per carrier) can fit in the message after all the requested per slot mean BEP values for both carriers have been included, the mobile station (such as the mobile stations 110 or 115) is to omit all interference measurements for the corresponding carrier. However, if interference measurements can be included for a single carrier, the selection of the carrier for which interference measurements are included in the message is implementation dependent.

Under Approach #3 for implementing Technique #5, if all the requested per slot mean BEP measurements and interference measurements for both carriers cannot fit in a single instance of the packet downlink ack/nack message 300 or 400 used for measurement reporting, the mobile station shall alternate between mean BEP measurements and interference measurements in consecutive reporting message instances.

Under Approach #4 for implementing Technique #5, if all the requested per slot mean BEP measurements and interference measurements for both carriers cannot fit in a single instance of the packet downlink ack/nack message 300 or 400 used for measurement reporting, the mobile station shall alternate between the two carriers in consecutive reporting message instances.

In some examples, one or more of the approaches for implementing Technique #5 can be combined with one or more of the Techniques #1-#4 described above, such as when the requested number of per slot mean BEP measurements cannot fit in a single instance of the packet downlink ack/nack message 300 or 400 used for measurement reporting.

With the foregoing description of Technique #5 in mind, the process 2000 of FIG. 20 begins execution at block 2005 at which the combined measurement reporting prioritizer 530 determines which link quality measurements are to be reported. At block 2010, the combined measurement reporting prioritizer 530 determines whether a combination of per slot BEP and per slot interference measurements have been requested by the network. If combined per slot BEP and interference measurements have not been requested, at block 2015 the combined measurement reporting prioritizer 530 reports either the requested per slot BEP measurements or the requested per slot interference measurements using any appropriate existing technique or one or more of Techniques #1-#4 described above. However, if combined per slot BEP and interference measurements have been requested, at block 2020 the combined measurement reporting prioritizer 530 reports a combination of the per slot BEP and per slot interference measurements in accordance with one or more of the Approaches #1-#4 for implementing Technique #5.

Figure 21:
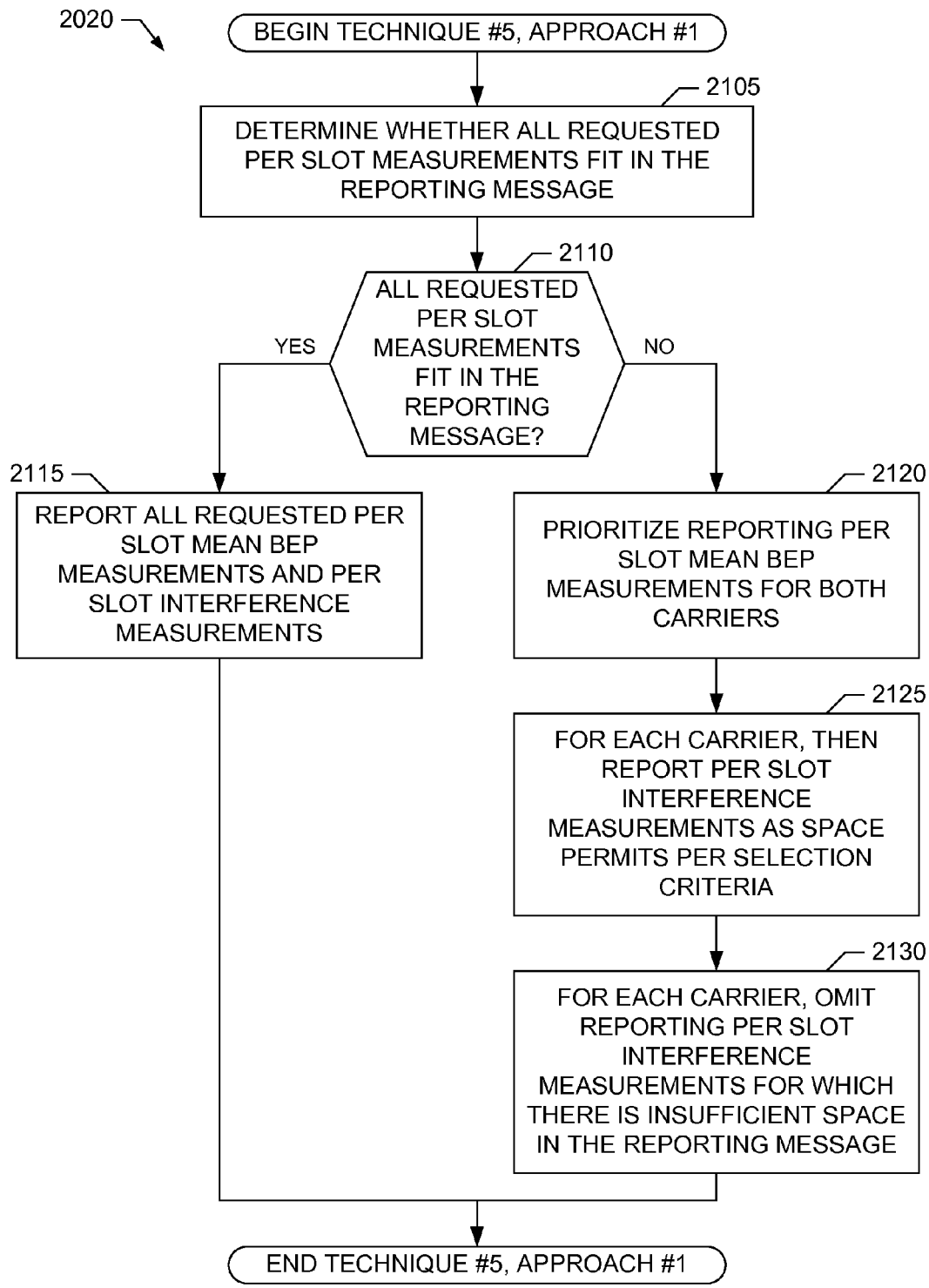
FIG. 21 is a flowchart representative of an example process to implement a first example approach for measurement prioritization that may be used to implement the process of FIG. 20.

A first example process 2020 that may be used to implement the processing at block 2020 of FIG. 20 is illustrated in FIG. 21. The example process 2020 of FIG. 21 implements Approach #1 for Technique #5 and, thus, at block 2105 the combined measurement reporting prioritizer 530 determines whether all the requested per slot BEP and interference link quality measurements can fit in the packet downlink ack/nack message 300 or 400 used for measurement reporting. If all the requested measurements can fit in the reporting message (see block 2110), then at block 2115 the combined measurement reporting prioritizer 530 includes all of the requested per slot BEP and interference link quality measurements in the packet downlink ack/nack message 300 or 400 for reporting to the network.

However, if all the requested measurements cannot fit in the reporting message (see block 2110), then at block 2120 the combined measurement reporting prioritizer 530 prioritizes including the requested per slot BEP measurements (e.g., for both carriers in a dual carrier configuration) in the packet downlink ack/nack message 300 or 400 used for measurement reporting. At block 2125, the combined measurement reporting prioritizer 530 then includes per slot interference measurements for each carrier (e.g., in a dual carrier configuration) in accordance with any appropriate selection criteria. At block 2130, the combined measurement reporting prioritizer 530 omits inclusion of those per slot interference measurements for which there is insufficient space in the packet downlink ack/nack message 300 or 400 used for measurement reporting.

Figure 22:
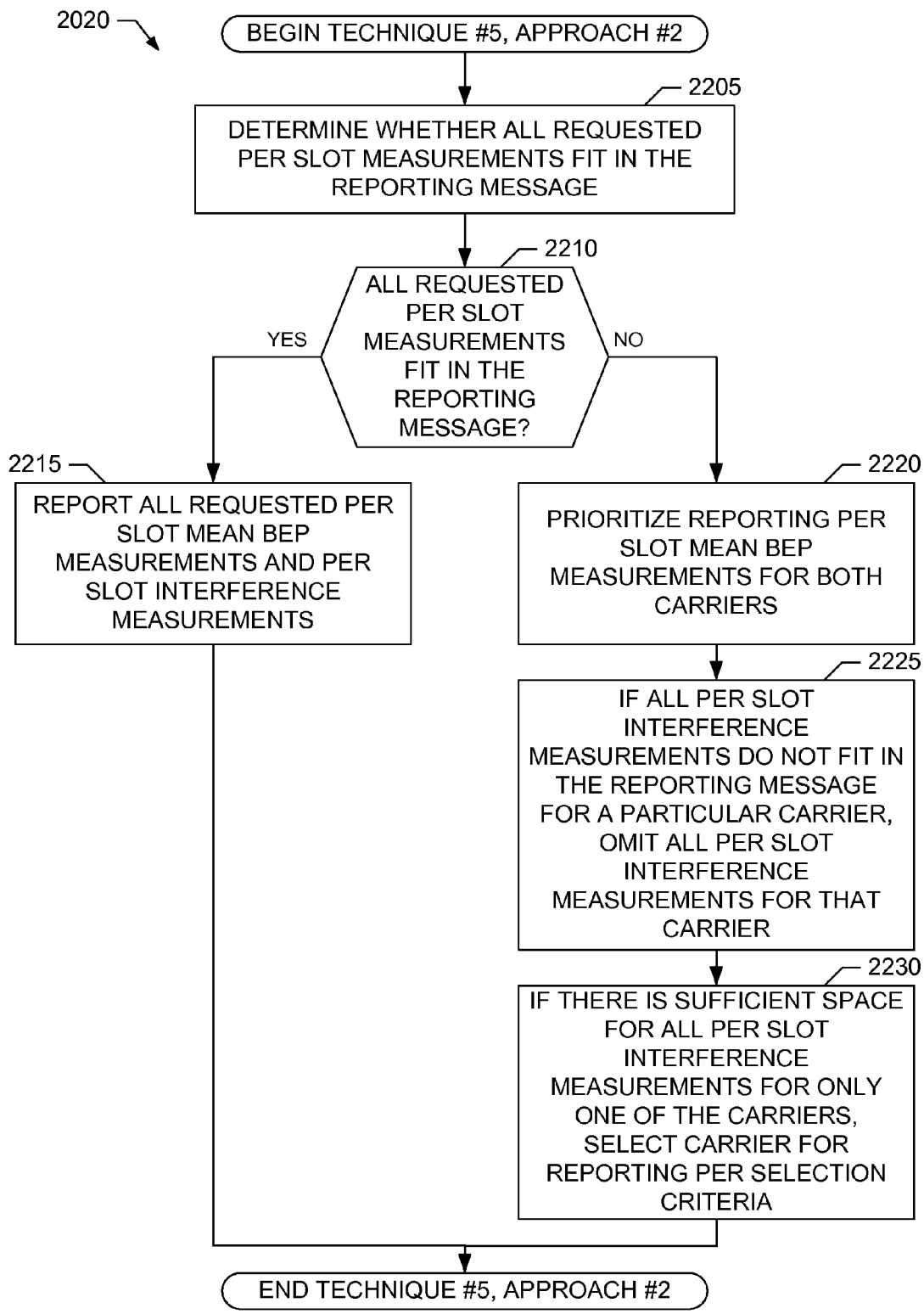
FIG. 22 is a flowchart representative of an example process to implement a second example approach for measurement prioritization that may be used to implement the process of FIG. 20.

A second example process 2020 that may be used to implement the processing at block 2020 of FIG. 20 is illustrated in FIG. 22. The example process 2020 of FIG. 22 implements Approach #2 for Technique #5 and, thus, at block 2205 the combined measurement reporting prioritizer 530 determines whether all the requested per slot BEP and interference link quality measurements can fit in the packet downlink ack/nack message 300 or 400 used for measurement reporting. If all the requested measurements can fit in the reporting message (see block 2210), then at block 2215 the combined measurement reporting prioritizer 530 includes all of the requested per slot BEP and interference link quality measurements in the packet downlink ack/nack message 300 or 400 for reporting to the network.

However, if all the requested measurements cannot fit in the reporting message (see block 2210), then at block 2220 the combined measurement reporting prioritizer 530 prioritizes including the requested per slot BEP measurements (e.g., for both carriers in a dual carrier configuration) in the packet downlink ack/nack message 300 or 400 used for measurement reporting. At block 2225, the combined measurement reporting prioritizer 530 omits all per slot interference measurements for a particular carrier if all per slot interference measurements for that carrier cannot fit in the packet downlink ack/nack message 300 or 400 used for measurement reporting. At block 2230, if there is sufficient space in the packet downlink ack/nack message 300 or 400 used for measurement reporting for all per slot interference measurements for only one of the carriers of a dual carrier configuration, the combined measurement reporting prioritizer 530 selects the particular carrier (e.g., the primary carrier or the secondary carrier) for which interference measurements are to be included using any appropriate selection criteria.

Figure 23:
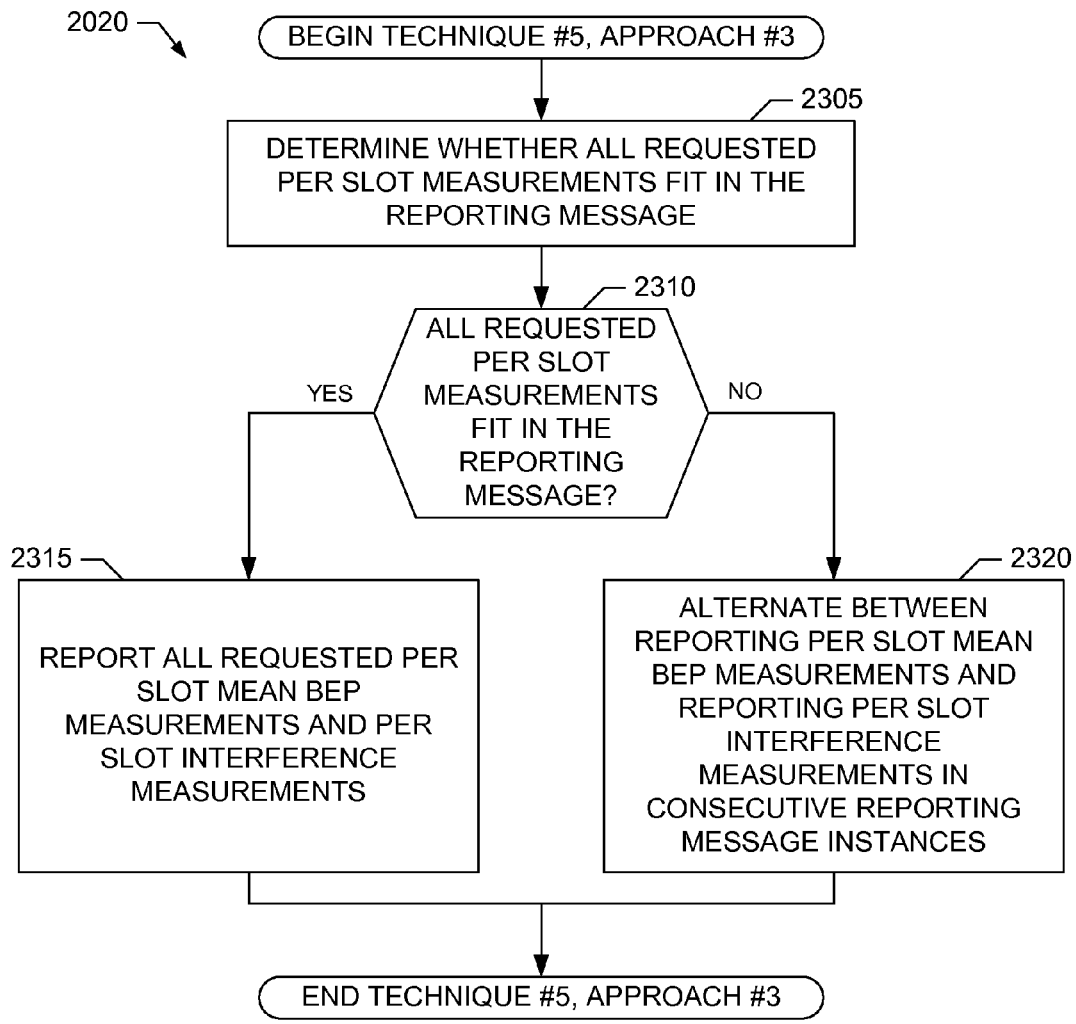
FIG. 23 is a flowchart representative of an example process to implement a third example approach for measurement prioritization that may be used to implement the process of FIG. 20.

A third example process 2020 that may be used to implement the processing at block 2020 of FIG. 20 is illustrated in FIG. 23. The example process 2020 of FIG. 23 implements Approach #3 for Technique #5 and, thus, at block 2305 the combined measurement reporting prioritizer 530 determines whether all the requested per slot BEP and interference link quality measurements can fit in the packet downlink ack/nack message 300 or 400 used for measurement reporting. If all the requested measurements can fit in the reporting message (see block 2310), then at block 2315 the combined measurement reporting prioritizer 530 includes all of the requested per slot BEP and interference link quality measurements in the packet downlink ack/nack message 300 or 400 for reporting to the network. However, if all the requested measurements cannot fit in the reporting message (see block 2310), then at block 2320 the combined measurement reporting prioritizer 530 alternates between reporting per slot BEP measurements and per slot interference measurements in consecutive instances of the packet downlink ack/nack message 300 or 400 used for measurement reporting.

Figure 24:
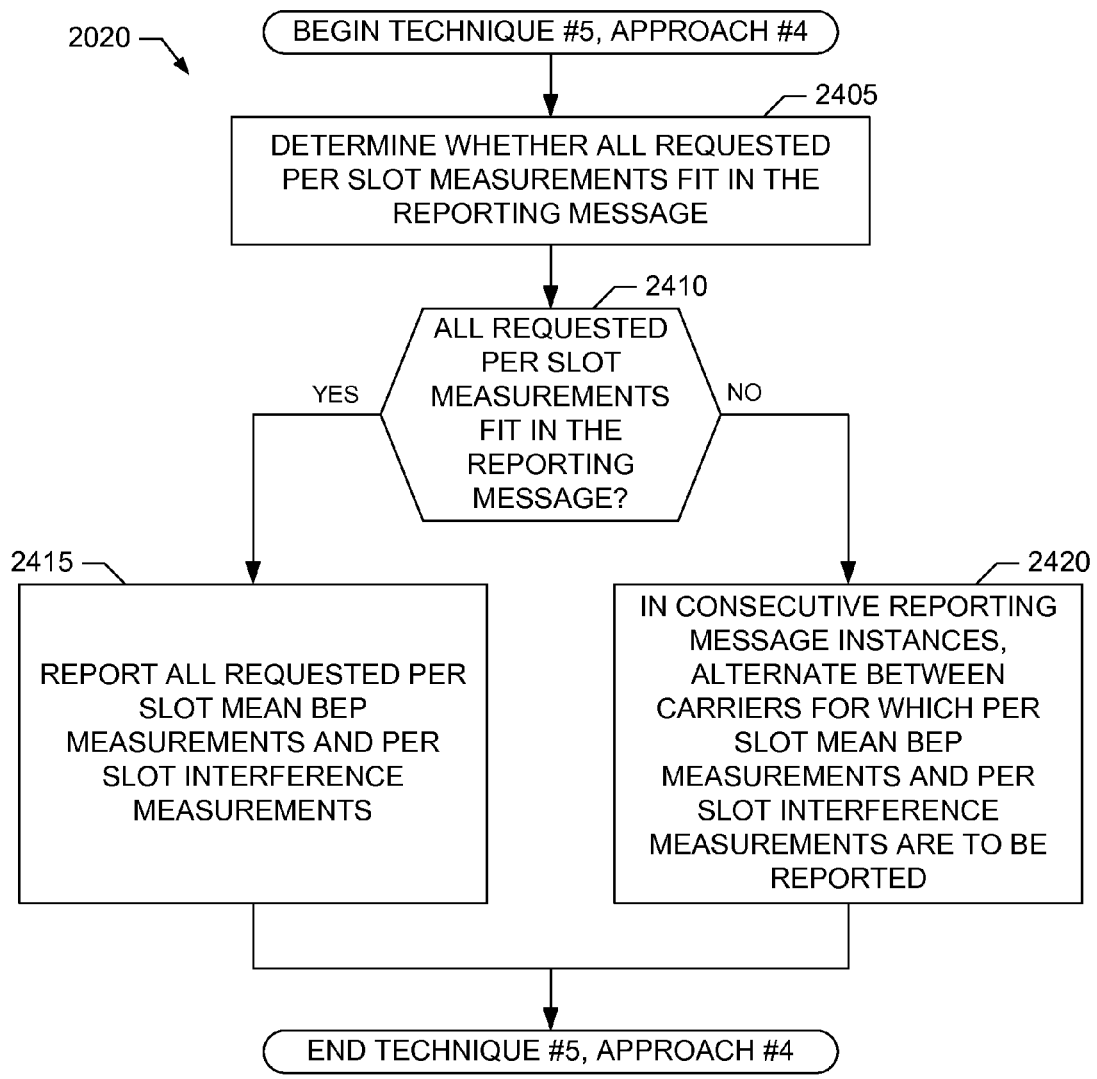
FIG. 24 is a flowchart representative of an example process to implement a fourth example approach for measurement prioritization that may be used to implement the process of FIG. 20.

A fourth example process 2020 that may be used to implement the processing at block 2020 of FIG. 20 is illustrated in FIG. 24. The example process 2020 of FIG. 24 implements Approach #4 for Technique #5 and, thus, at block 2405 the combined measurement reporting prioritizer 530 determines whether all the requested per slot BEP and interference link quality measurements can fit in the packet downlink ack/nack message 300 or 400 used for measurement reporting. If all the requested measurements can fit in the reporting message (see block 2410), then at block 2415 the combined measurement reporting prioritizer 530 includes all of the requested per slot BEP and interference link quality measurements in the packet downlink ack/nack message 300 or 400 for reporting to the network. However, if all the requested measurements cannot fit in the reporting message (see block 2410), then at block 2420 the combined measurement reporting prioritizer 530 alternates, in consecutive instances of the packet downlink ack/nack message 300 or 400 used for measurement reporting, between the carriers (e.g., between the primary carrier and the secondary carrier of a dual carrier configuration) for which per slot BEP and per slot interference measurements are to included.

In some examples, the measurement processor 620 receives link quality measurements reported in accordance with the prioritization employed by the example processes 2000 and/or 2120 described above.

Based on the foregoing, example techniques to report link quality measurements for dual carrier operation have been disclosed. A first example technique (Technique #1) is to extend the maximum size of the EPD A/N Extension Info IE 325 in the EGPRS PACKET DOWNLINK ACK/NACK message 300 beyond 64 bits, which would allow inclusion of more per slot mean BEP or interference measurements reports for the secondary carrier (e.g., a size of 80 bits would permit reporting of up to 8 per slot mean BEP values, whereas a size of 72 bits would permit reporting up to 8 interference measurements). Several example approaches for implementing this technique have been described above.

A second example technique (Technique #2) is to introduce link quality measurement reporting prioritization and alternating schemes to cover scenarios in which not all of the candidate measurement values can be included in the reporting message. Approach #1 for implementing Technique #2 involves sending the overall BEP measurements only for the most relevant modulation. Approach #2 for implementing Technique #2 involves omitting one or both overall BEP measurements to be reported. Approach #3 for implementing Technique #2 involves alternating the overall BEP measurements for each carrier within two consecutive reports. Approach #4 for implementing Technique #2 involves alternating the overall BEP measurements between the two most relevant modulations within two consecutive reports. Approach #5 for implementing Technique #2 involves reporting only a subset of the requested per slot mean BEP or interference measurement measurements(s).

A third example technique (Technique #3) is to enhance the EGPRS PACKET DOWNLINK ACK/NACK TYPE 2 message 400. Approach #1 for implementing Technique #3 involves making inclusion of the EGPRS Ack/Nack Description IE 410 optional in the message when measurements are reported. Approach #2 for implementing Technique #3 involves restructuring the EGPRS PACKET DOWNLINK ACK/NACK TYPE 2 message 400 such that the EPD A/N Extension Info Type 2 IE 425 would not be used for Release 7 information. Approach #2 for implementing Technique #3 involves implementing Approach #1 and/or Approach #2 in a new message type (e.g., an EGPRS PACKET DOWNLINK ACK/NACK TYPE 3 message).

A fourth example technique (Technique #4) is to allow usage of the EGPRS PACKET DOWNLINK ACK/NACK TYPE 2 message 400 for EGPRS TBFs not using EGPRS2.

A fifth example technique (Technique #5) is to introduce link quality measurement reporting prioritization and alternating schemes to cover combined link quality measurement reporting when the requested measurement information cannot fit into a single message instance. Several example approaches for implementing this technique have been described above.

In some examples, use of one or more of the aforementioned Techniques #1-#5 could be limited to terminals (such as the mobile stations 110 and/or 115) that are downlink dual carrier capable and assigned a downlink dual carrier configuration, so that terminals or networks not supporting downlink dual carrier operation are not affected.

In some examples, one or more of the aforementioned Techniques #1-#5 could benefit one or more multislot classes relevant to downlink dual carrier operations (e.g., such as multislot classes 8, 10 . . . 12, 30 . . . 45, and 19 . . . 29 for EFTA). In some examples, one or more of the aforementioned Techniques #1-#5 could be specified for use with certain multislot configurations where the number of downlink slots assigned to the mobile station exceeds a given value.

Also, although at least some of the example techniques for link quality measurement reporting disclosed herein have been described as being able to increase the number of reported per slot link quality measurements, the example techniques disclosed herein are not limited thereto. For example, instead of being used to report more per slot link quality measurements, at least some of the example techniques could use their available measurement reporting capacity to report overall BEP measurements. Additionally or alternatively, at least some of the example techniques disclosed herein could use their available measurement reporting capacity to report other types of measurements and/or any other type of information.

Example per slot BEP reporting enhancements that can be achieved using various combinations of the aforementioned techniques to report link quality measurements for EGPRS TBFs not using EGPRS2 are illustrated in Table 20. The values listed in Table 20 are exemplary and may change under different assumptions and/or depending upon the ways in which the values are estimated.

TABLE 20

| | Max. number of per slot mean BEP reports | Notes |
|---|---|---|
| Technique #1 (70 bits extension) | previously 4 min. → now 6 min. ($2^{nd}$ carrier) | Note #1: A limit of up to 6 per slot BEP values on the $2^{nd}$ carrier and 12 per slot BEP values overall may still exist (e.g., for EFTA classes 24..29); can combine, for example, with Technique #2 for these classes. |
| Technique #1 (80 bits extension) | previously 4 min. →now 8 ($2^{nd}$ carrier) | Note #2: A limit of up to 12 per slot BEP values overall may still exist (e.g., for EFTA classes 24..29) => can combine with, for example, Technique #2 for these classes. |
| Technique #2/ Approaches #1 or #2 | previously 4 min. → now 6 min. (Approach #1) or → now 8 (Approach #2) ($2^{nd}$ carrier) | See Notes #1 and #2 above. Note #3: Less information is provided to the network. |
| Technique #2/ Approach #5 | 4 min. unchanged ($2^{nd}$ carrier) | See Note #3 Note #4: Can also be used to concretely specify reporting requirements in existing systems without changing message formats |
| Technique #3 | applicable if combined with Technique #4 | |
| Technique #4 (isolated) | previously 4 min. ($2^{nd}$ carrier) → now 9 min. (total over both carriers) | Note #5: Can combine with, for example, Technique #3. Note #6: Can combine with, for example, Technique #2. |
| Technique #4 combined with Technique #3/ Approach #1 | previously 4 min. ($2^{nd}$ carrier) → now 11 min. (total over both carriers) | Note #7: A limit of up to 11 per slot BEP values may still exist (e.g., for classes 40..45 and EFTA 19..29; can combine with, for example, Technique #2 for these classes. |
| Technique #4 combined with Technique #3/ Approaches #1 & #2 | previously 4 min. ($2^{nd}$ carrier) → now 13 min. (total over both carriers) | Note #8: A limit of up to 13 per slot BEP values may still exist (e.g., for classes EFTA 24..29); can combine with Technique #2 for these classes. |

Example per slot BEP reporting enhancements that can be achieved using various combinations of the aforementioned techniques to report link quality measurements for TBFs using EGPRS2 are illustrated in Table 21. The values listed in Table 21 are exemplary and may change under different assumptions and/or depending upon the ways in which the values are estimated.

TABLE 21

| | Max. number of per slot mean BEP reports | Notes |
|---|---|---|
| Technique #3/ Approach #1 | previously 9 min. → now 11 min. (total over both carriers) | Note #1: A limit of up to 11 per slot BEP values may still exist (e.g., for classes 40..45 and EFTA 19..29); can combine with Technique #2 for these classes. |
| Technique #3/ Approaches #1 & #2 | previously 9 min. → now 13 min. (total over both carriers) | Note #2: A limit of up to 13 per slot BEP values may still exist (e.g., for classes EFTA 24..29); can combine with Technique #2 for these classes |
| Technique #3/ Approach #3 | previously 9 min. → now 11..13 (total over both carriers) | Same as for Approaches #1 and/or #2 |
| Technique #3/ Approaches #1 & #2 combined with Technique #2 | previously 9 min. → now 15..16 (total over both carriers) | Note #3: Less information is provided to the network. |

Example per slot interference reporting enhancements that can be achieved using various combinations of the aforementioned techniques to report link quality measurements for EGPRS TBFs not using EGPRS2 are illustrated in Table 22. The values listed in Table 22 are exemplary and may change under different assumptions and/or depending upon the ways in which the values are estimated.

TABLE 22

| | Max. number of interference meas. reports | Notes |
|---|---|---|
| Technique #1 (72 bits extension) | previously 6 min. → now 8 ($2^{nd}$ carrier) | |
| Technique #2/ Approach #1 | previously 6 min. → now 8 ($2^{nd}$ carrier) | |
| Technique #2/ Approach #5 | 6 min. unchanged ($2^{nd}$ carrier) | Note #1: Can also be used to concretely specify reporting requirements in existing systems without changing message formats. |
| Technique #3 | applicable if combined with Technique #4 | |
| Technique #4 (isolated) | previously 6 min. ($2^{nd}$ carrier) → now 13 min. (total over both carriers) | Note #2: Can be combined with, for example, Technique #3. |
| Technique #4 combined with Technique #3/ Approach #1 | previously 6 min. → now 8 ($2^{nd}$ carrier) | |
| Technique #5 | Unchanged | Note #3: Can also be used to concretely specify reporting requirements in existing systems without changing message formats.. |

Example per slot interference reporting enhancements that can be achieved using various combinations of the aforementioned techniques to report link quality measurements for TBFs using EGPRS2 are illustrated in Table 23. The values listed in Table 23 are exemplary and may change under different assumptions and/or depending upon the ways in which the values are estimated.

TABLE 23

| | Max. number of per slot interference meas. reports | Notes |
|---|---|---|
| Technique #3/ Approaches #1, #2 or #3 | previously 13 min. → now 16 (total over both carriers) | |
| Technique #5 | Unchanged | Note #1: Can also be used to concretely specify reporting requirements in existing systems without changing message formats. |

Figure 25:
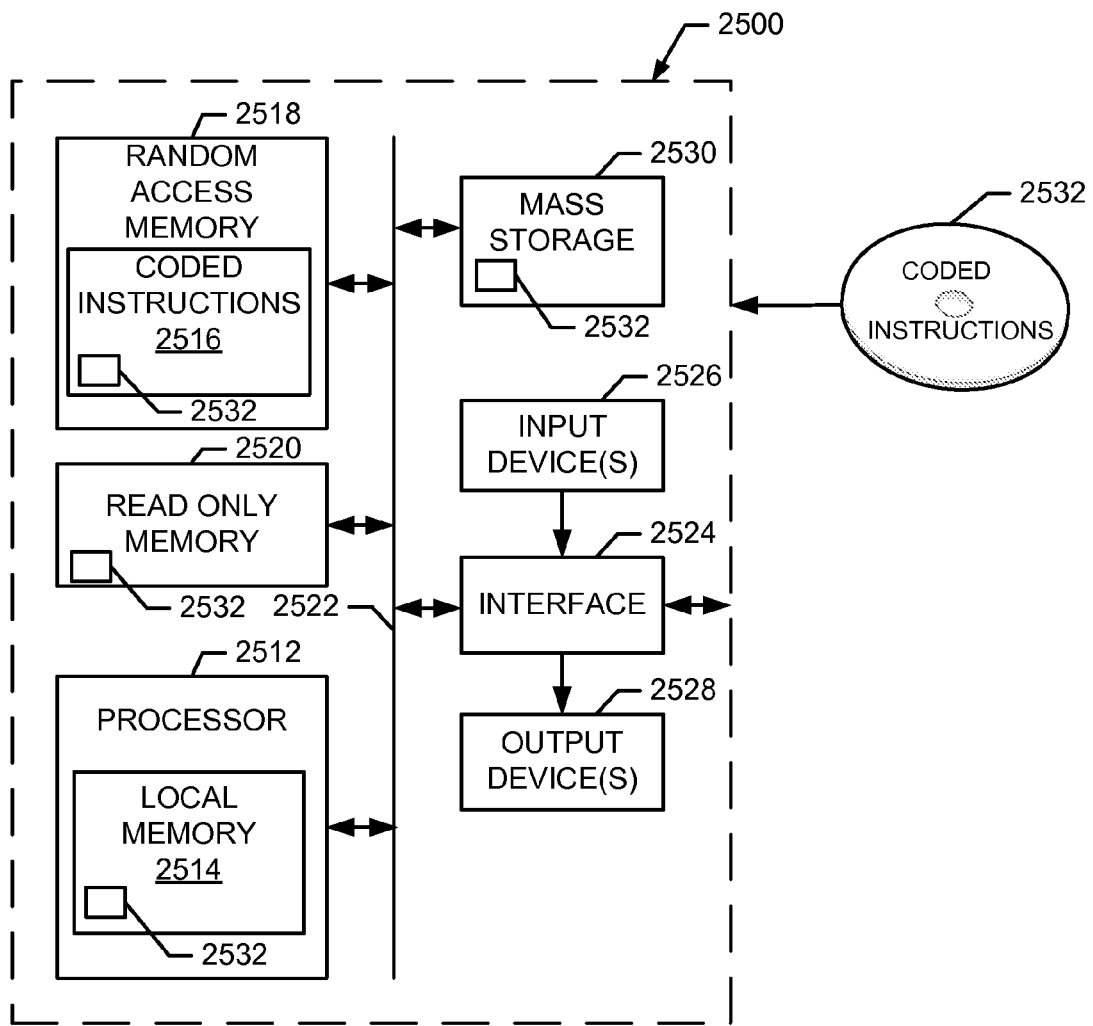
FIG. 25 is a block diagram of an example processing system that may execute example machine readable instructions used to implement some or all of the processes of FIGS. 6-23 and/or 24 to implement the example measurement reporting processors of FIGS. 5 and/or 6.

FIG. 25 is a block diagram of an example processing system 2500 capable of implementing the apparatus and methods disclosed herein. The processing system 2500 can be, for example, a server, a personal computer, a personal digital assistant (PDA), an Internet appliance, or any other type of computing device.

The system 2500 of the instant example includes a processor 2512 such as a general purpose programmable processor. The processor 2512 includes a local memory 2514, and executes coded instructions 2516 present in the local memory 2514 and/or in another memory device. The processor 2512 may execute, among other things, machine readable instructions to implement the processes represented in FIGS. 7-24. The processor 2512 may be any type of processing unit, such as one or more microprocessors from any microprocessor family or families, one or more microcontrollers from any microcontroller family or families, etc., or any combination thereof.

The processor 2512 is in communication with a main memory including a volatile memory 2518 and a non-volatile memory 2520 via a bus 2522. The volatile memory 2518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2520 may be implemented by flash memory and/or any other desired type of memory device. Access to the main memory 2518, 2520 is typically controlled by a memory controller (not shown).

The processing system 2500 also includes an interface circuit 2524. The interface circuit 2524 may be implemented by any type of interface standard, such as an Ethernet interface, a universal serial bus (USB), and/or a third generation input/output (3GIO) interface.

One or more input devices 2526 are connected to the interface circuit 2524. The input device(s) 2526 permit a user to enter data and commands into the processor 2512. The input device(s) can be implemented by, for example, a keyboard, a mouse, a touchscreen, a track-pad, a trackball, an isopoint and/or a voice recognition system.

One or more output devices 2528 are also connected to the interface circuit 2524. The output devices 2528 can be implemented, for example, by display devices (e.g., a liquid crystal display, a cathode ray tube display (CRT)), by a printer and/or by speakers. The interface circuit 2524, thus, typically includes a graphics driver card.

The interface circuit 2524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2500 also includes one or more mass storage devices 2530 for storing machine readable instructions and data. Examples of such mass storage devices 2530 include floppy disk drives, hard drive disks, compact disk drives and digital versatile disk (DVD) drives.

The coded instructions 2532 of FIGS. 7-24 may be stored in the mass storage device 2530, in the volatile memory 2518, in the non-volatile memory 2520, in the local memory 2514 and/or on a removable storage medium, such as a CD or DVD 2532.

As an alternative to implementing the methods and/or apparatus described herein in a system such as the processing system of FIG. 25, the methods and or apparatus described herein may be embedded in a structure such as a processor and/or an ASIC (application specific integrated circuit).

It is noted that this patent claims priority from European Patent Application Serial Number EP 11305174, which was filed on Feb. 18, 2011, and is hereby incorporated by reference in its entirety.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to report link quality measurements for downlink dual carrier operation, the method comprising:
    determining, by a mobile station, a number of per slot link quality measurements that can be included in a reporting message;
    determining, by a mobile station independent of an associated network node, whether all valid per slot link quality measurements can be included in the reporting message based on the determined number of per slot link quality measurements;
    in response to determining that all of the valid per slot link quality measurements cannot be included in the reporting message, including, by the mobile station, in the reporting message a subset of a set of link quality measurements corresponding to (i) the valid per slot link quality measurements and (ii) average link quality measurements over multiple slots, the subset of the set of link quality measurements being included in the reporting message in accordance with a prioritization scheme; and
    transmitting, using a transmitter, the reporting message to the associated network node.

2. A method as defined in claim 1 wherein including in the reporting message the subset of the set of link quality measurements in accordance with the prioritization scheme based on the number of per slot link quality measurements that can be included in the reporting message, comprises:
    including in the reporting message all of the valid per slot link quality measurements for a carrier; and
    when the average link quality measurements over multiple slots for the carrier include a plurality of average bit error probability measurements over multiple slots corresponding respectively to a plurality of different modulation types, including in the reporting message the average bit error probability measurements over multiple slots for only one of the plurality of different modulation types for the carrier.

3. A method as defined in claim 1 wherein including in the reporting message the subset of the set of link quality measurements in accordance with the prioritization scheme comprises:
    including in the reporting message all of the valid per slot link quality measurements; and
    when the average link quality measurements over multiple slots for a carrier include one or more average bit error probability measurements over multiple slots corresponding respectively to different modulation types, omitting all of the one or more average bit error probability measurements over multiple slots for the carrier from the reporting message.

4. A method as defined in claim 1 wherein including in the reporting message the subset of the set of link quality measurements in accordance with the prioritization scheme comprises:
    including in the reporting message all of the valid per slot link quality measurements; and
    alternating, over consecutive reporting messages, reporting of average bit error probability measurements over multiple slots for respective ones of a plurality of carriers, the average bit error probability measurements over multiple slots for a particular carrier corresponding to different modulation types used on the particular carrier.

5. A method as defined in claim 1 wherein including in the reporting message the subset of the set of link quality measurements in accordance with the prioritization scheme comprises:
    including in the reporting message all of the valid per slot link quality measurements; and
    alternating over consecutive reporting messages inclusion of average bit error probability measurements over multiple slots for each of a plurality of modulation types used on a particular carrier.

6. A method as defined in claim 1 wherein including in the reporting message the subset of the set of link quality measurements in accordance with the prioritization scheme comprises:
    including in the reporting message one or more average bit error probability measurements over multiple slots for a first carrier and a second carrier, the one or more average bit error probability measurements over multiple slots for a particular carrier corresponding to different modulation types used on the particular carrier; and
    including in the reporting message a subset of the valid per slot link quality measurements.

7. A method as defined in claim 1 wherein the reporting message is a packet downlink ack/nack message.

8. A method to report link quality measurements for downlink dual carrier operation, the method comprising:
    determining, by a mobile station, whether link quality measurements to be reported for downlink dual carrier operation include valid per slot bit error probability measurements and valid per slot interference measurements;
    in response to determining that the link quality measurements to be reported include valid per slot bit error probability measurements and valid per slot interference measurements, determining, by the mobile station independent of an associated network node, a number of per slot bit error probability measurements and a number of per slot interference measurements that can be included in a reporting message;
    determining, by the mobile station, whether all valid per slot bit error probability measurements and a maximum number of valid per slot interference measurements can be included in the reporting message based on the determined number of per slot bit error probability measurements and the determined number of per slot interference measurements;
    in response to determining that all of the valid per slot bit error probability measurements and the maximum number of valid per slot interference measurements cannot be included in the reporting message, including, by the mobile station, in the reporting message a combination of the valid per slot bit error probability measurements and the valid per slot interference measurements in accordance with a prioritization scheme; and transmitting, using a transmitter, the reporting message to the associated network node.

9. A method as defined in claim 8 wherein including in the reporting message the combination of the valid per slot bit error probability measurements and the valid per slot interference measurements in accordance with a prioritization scheme based on the number of per slot link quality measurements that can be included in the reporting message, comprises:

including the valid per slot bit error probability measurements in the reporting message;

when available space remains in the reporting message, including one or more valid per slot interference measurements able to fit in the available space; and when available space does not remain in the reporting message, omitting reporting of one or more valid per slot interference measurements.

10. A method as defined in claim 8 wherein including in the reporting message the combination of the valid per slot bit error probability measurements and the valid per slot interference measurements in accordance with a prioritization scheme comprises:

including the valid per slot bit error probability measurements in the reporting message; and when all valid per slot interference measurements for a particular carrier supporting dual carrier operation do not fit in available space of the reporting message, omitting reporting of the valid pet slot interference measurements for the particular carrier.

11. A method as defined in claim 8 wherein including in the reporting message the combination of the valid per slot bit error probability measurements and the valid per slot interference measurements in accordance with a prioritization scheme comprises alternating between including the valid per slot bit error probability measurements and including the valid per slot interference measurements in consecutive reporting messages.

12. A method as defined in claim 8 wherein including in the reporting message the combination of the valid per slot bit error probability measurements and the valid per slot interference measurements in accordance with a prioritization scheme comprises alternating, over consecutive reporting messages, inclusion of the valid per slot bit error probability measurements and valid per slot interference measurements for different carriers.

13. A method as defined in claim 8 wherein the reporting message is a packet downlink ack/nack message.

14. A non-transitory machine readable medium comprising machine readable instructions which, when executed, cause a mobile station to at least:

determine a number of per slot link quality measurements that can be included in a reporting message that is to report link quality measurements for downlink dual carrier operation;

determine, independent of an associated network node, whether all valid per slot link quality measurements can be included in the reporting message based on the determined number of per slot link quality measurements;

in response to determining that all of the valid per slot link quality measurements cannot be included in the reporting message, include in the reporting message a subset of a set of link quality measurements corresponding to (i) the valid per slot link quality measurements and (ii) average link quality measurements over multiple slots, the subset of the set of link quality measurements being included in the reporting message in accordance with a prioritization scheme; and transmit, using a transmitter, the reporting message to the associated network node.

15. An apparatus comprising:

memory comprising machine readable instructions; and a processor to execute the instructions to at least:

determine a number of per slot link quality measurements that can be included in a reporting message that is to report link quality measurements for downlink dual carrier operation;

determine, independent of an associated network node, whether all valid per slot link quality measurements can be included in the reporting message based on the determined number of per slot link quality measurements;

in response to determining that all of the valid per slot link quality measurements cannot be included in the reporting message, include in the reporting message a subset of a set of link quality measurements corresponding to (i) the valid per slot link quality measurements and (ii) average link quality measurements over multiple slots, the subset of the set of link quality measurements being included in the reporting message in accordance with a prioritization scheme; and transmit, using a transmitter, the reporting message to the associated network node.

16. An apparatus as defined in claim 15 wherein the processor is further to:

include in the reporting message all of the valid per slot link quality measurements for a carrier; and when the average link quality measurements over multiple slots for the carrier include a plurality of average bit error probability measurements over multiple slots corresponding respectively to a plurality of different modulation types, include in the reporting message the average bit error probability measurements over multiple slots for only one of the plurality of different modulation types for the carrier.

17. An apparatus as defined in claim 15 wherein the processor is further to:

include in the reporting message all of the valid per slot link quality measurements; and when the average link quality measurements over multiple slots for a carrier include one or more average bit error probability measurements over multiple slots corresponding respectively to different modulation types, omit all of the one or more average bit error probability measurements over multiple slots for the carrier from the reporting message.

18. An apparatus as defined in claim 15 wherein the processor is further to:

include in the reporting message all of the valid per slot link quality measurements; and alternate, over consecutive reporting messages, reporting of average bit error probability measurements over multiple slots for respective ones of a plurality of carriers, the average bit error probability measurements over multiple slots for a particular carrier corresponding to different modulation types used on the particular carrier.

19. An apparatus as defined in claim 15 wherein the processor is further to:

include in the reporting message all of the valid per slot link quality measurements; and alternate over consecutive reporting messages inclusion of average bit error probability measurements over multiple slots for each of a plurality of modulation types used on a particular carrier.

20. An apparatus as defined in claim 15 wherein the processor is further to:
include in the reporting message one or more average bit error probabilities over multiple slots for a first carrier and a second carrier, the one or more average bit error probability measurements over multiple slots for a particular carrier corresponding to different modulation types used on the particular carrier; and
including in the reporting message a subset of the valid per slot link quality measurements.

21. An apparatus as defined in claim 15 wherein the reporting message is a packet downlink ack/nack message.

* * * * *